(12) United States Patent
Chen

(10) Patent No.: US 8,478,581 B2
(45) Date of Patent: Jul. 2, 2013

(54) INTERLINGUA, INTERLINGUA ENGINE, AND INTERLINGUA MACHINE TRANSLATION SYSTEM

(76) Inventor: Chung-ching Chen, Woodside, NY (US)

( * ) Notice: Subject to any disclaimer, the term of this patent is extended or adjusted under 35 U.S.C. 154(b) by 830 days.

(21) Appl. No.: 12/692,667

(22) Filed: Jan. 25, 2010

(65) Prior Publication Data

US 2011/0184718 A1  Jul. 28, 2011

(51) Int. Cl.
*G06F 17/28* (2006.01)

(52) U.S. Cl.
USPC ........... 704/9; 704/3; 704/4; 704/5; 704/7; 704/8; 704/2

(58) Field of Classification Search
USPC .................................................. 704/2–9
See application file for complete search history.

(56) References Cited

U.S. PATENT DOCUMENTS

| | | | |
|---|---|---|---|
| 5,349,368 A | | 9/1994 | Takeda |
| 5,351,189 A | | 9/1994 | Doi |
| 5,426,583 A | * | 6/1995 | Uribe-Echebarria Diaz De Mendibil ............ 704/2 |
| 5,510,981 A | * | 4/1996 | Berger et al. .......... 704/2 |
| 5,677,835 A | * | 10/1997 | Carbonell et al. ......... 704/8 |
| 5,715,468 A | * | 2/1998 | Budzinski ............. 704/9 |
| 5,768,603 A | * | 6/1998 | Brown et al. ............ 704/9 |
| 5,794,050 A | * | 8/1998 | Dahlgren et al. ......... 717/144 |
| 6,275,789 B1 | | 8/2001 | Moser |
| 6,463,404 B1 | * | 10/2002 | Appleby ............... 704/9 |
| 6,556,964 B2 | * | 4/2003 | Haug et al. ............ 704/9 |
| 6,622,123 B1 | * | 9/2003 | Chanod et al. ........... 704/277 |
| 7,475,015 B2 | * | 1/2009 | Epstein et al. .......... 704/257 |
| 7,739,102 B2 | * | 6/2010 | Bender ............... 704/9 |
| 8,078,450 B2 | * | 12/2011 | Anisimovich et al. ....... 704/9 |
| 8,195,447 B2 | * | 6/2012 | Anismovich et al. ....... 704/4 |
| 8,214,199 B2 | * | 7/2012 | Anismovich et al. ....... 704/4 |

OTHER PUBLICATIONS

Hutchins, Machine Trnalsation: Past,Present, Future, Ellis Horwood, Ltc., Chichester, UK, 1986.*
Mitamura, T et al. "An Efficiemt Interlingua Translation System for Multi-lingual Document Production" (1991). Institute for Software Research. Paper 451.*
Dorr, Bonnie J. "Large-Scale Dictionary Construction for Foreign Language Tutoring and Interlingual Machine Translation." Machine Translation 12: 271-322, 1997.*

* cited by examiner

*Primary Examiner* — Talivaldis Ivars Smits
*Assistant Examiner* — Shaun Roberts

(57) ABSTRACT

An embodiment provides (a) a method and system for representing natural languages in a common machine-readable form, including the thorough design of the lexicon and grammar, the resulting representation called interlingua, (b) a method and system for using a computer to convert a text of a natural language into and out of a coded text of said interlingua representation, including a programming framework which is independent of other languages, said system is called interlingua engine, and (c) a method and system of machine translation using said interlingua engine, said system called interlingua machine translation system. Alternative embodiments are described.

18 Claims, 16 Drawing Sheets

```
Word
    ├──Content Word
    │       ├──noun
    │       ├──adjective
    │       ├──verb
    │       └──adverb
    ├──Functional Word
    │       ├──major functional word
    │       │       ├──preposition
    │       │       ├──conjunction
    │       │       └──pronoun
    │       └──minor functional word    //many language specific
    │               ├──article
    │               ├──PRO-word(other than pronoun)
    │               └──other language specific ones
    └──Supplemental Word
            ├──interjection
            ├──exclamation
            ├──sound-simulation word
            ├──courtesy word
            ├──borrowed word
            └──language-specific word
```

Fig 2

```
1M adverb
    2A ADJECTIVE-ADVERB   //see [1411]
    2B degree or grade: 'very, almost'
    2C range: 'all, approximately'
    2D speed: 'fast, slow'
    2E frequency: 'often, seldom'
    2F manner: //excluding human's 'psychological' adjective manner
    2G mood //manifested language-specifically, hence use features
    2H time: 'just, lately' //many share with the TIME feature
    2I space(direction/location) //many share with the SPACE feature
    2J sentence adverb: 'incidentally, admittedly'
```

Fig. 3D 1N noun
    2A concrete noun //see Fig4A for more
    2B abstract noun
        3A event noun
            4A single event noun
                5A VERB-NOUN(GERUND)[1513]: 'eating, running, attacking'
                5B VERB-NOUN(GENERIC)[1513]: 'action, comparison'
            4B collective event noun[1513]: 'story, war, game'
                //5A personal event; 5B family event; 5C social/national event;
                //5D international/diplomatic event; 5E military/historical event; ....
        3B property noun---property of concrete object // see Fig4B for more
        3C ADJECTIVE-NOUN(ABSTRACT)[1161]: 'beauty2'
        3D ADJECTIVE-NOUN(SPECIFIC)[1541]: 'beautifulness'
        3E concept noun
            4A DERIVED-PROPERTY-NOUN [1552]: 'motherhood'
            4B defined noun in general use: 'society, calculus'
            4C difined noun in professional dictionaries [1551]
    2C ontological noun
        3A space noun
            4A direction noun:
                5A absolute direction: 'east, west, south, north'
                5B relative direction: 'up, down, left, right'
            4B location noun
                5A general location: 'field, side, corner, middle, center'
                5B specific location noun:
                      6A landscape: //cross reference to node NAABAB
                      6B building and construction: //cross reference to node NAABBC
        3B time noun
            4A time point: 'May 5th, Monday'
            4B time period: 'May, Spring, morning'
            4C time unit: 'month, week, day, hour, minute'
        3C ontological noun in general: 'universe, earth, world, sky'
            //some cross reference to node NAABAA
        3D ontological property noun //list here for consistencey
            4A position/location:
                //its property value is generally expressed by location noun
            4B distance: 'far, near'
            4C quantity: 'full/empty', 'many/less'
            4D 'whole/part, individual'; 'sparse/dense'; 'real/virtual'; ...

Fig. 3A (continued)

3B two-argument dynamic clause/verb //S must be agentive
          (All have syntactic classification features, such as:
          Forward/Backward, Action/Cause-effect, Bare/Packed.)
          4A operation clause/verb: //O is concrete object
              5A Tool as human body part
              5B Tool as not human body part
              5C No definite tool involved
          4B social clause/verb: //Both S and O are human, can be reciprocal.
          4C communication clause/verb: //S is human and human organization;
              //O is abstract noun, mostly event; and dative argument O' is human.
          4D activity clause/verb: //S is human and human organization.
              //O is abstract noun, event or property. Verb is generally packed.
              //'implement': "He implemented the plan."
              //'adopt': "He adopted new measures."
              //'maintain': "He maintained silence/order/dignity/posture."
          4E sense clause/verb: 'see, hear, smell, feel1, taste1'
              //S is human and animal, O is general noun, concrete or abstract.
          4F mental clause/verb: 'think, understand'
              //S is human, O is abstract noun.
          4G psyche clause/verb: 'love, fear, need'
              //S is human and animal, O is general noun, concrete or abstract.
  2D event clause/verb
  2E special clause/verb
  2F ABSTRACT-NOUN-VERB [1621]
  2G CONCRETE-NOUN-VERB [1621]

Fig. 3C /2

1J adjective:
    2A value of intrinsic property = intrinsic adjective
        3A value of property of concrete object in general
        3B value of property of living thing in general
        3C value of property of human //see Fig 5A for more
    2B value of attached property
    2C value of property of event
    2D NOUN-ADJECTIVE [1161]: 'wooden, naval, muddy'
    2E VERB-ADJECTIVE [1244] : //state property

Fig. 3B 1V clause/verb
    2A property/state clause/verb
        3A property clause/verb // = one-argument static clause/verb
        3B state clause/verb
    2B relation clause/verb // = two-argument static clause/verb
        //relations of: PART-WHOLE; SUPERORDINATE-SUBORDINATE;
        //DIRECTION; LOCATION; TIME; POSSESSION; INCLUSION;
        //CONTAINER; COMPARISON; CAUSE-EFFECT; DEDUCTION;
        //CONDITION; LISTING; JUDGMENT; MATHEMATICAL; ...
    2C dynamic clause/verb
        3A one-argument dynamic clause/verb
            4A change of property clause/verb
            4B change of state clause/verb
            4C self-action clause/verb //argument S must be agentive
                5A movement clause/verb
                    6A movement in general: 'go, move, walk, run, crawl, fly, swim'
                    6B with location: 'arrive, depart, return, pass'
                    6C with direction: 'advance, turn, fall, climb, jump, dive'
                    6D with mood: 'dance1, parade, sneak'
                    6E with gait: 'gallop, scamper, tramp'
                5B body-action clause/verb
                    6A face: 'laugh, cry, shout, breathe, cough'
                    6B limb: 'wave1, kick'
                    6C body: 'sleep, sit, stand, lie, kneel, shake1, get up, meditate'
                5C movement-of-body-part clause/verb: 'blink, nod, stretch, wave2'
                5D self-activity clause/verb
                    6A life activity: 'born, die, grow, wilt'
                    6B living activity: 'bathe, exercise, dress1'
                    6C social activity: 'dine, dance2'

1N Noun/2A Concrete Noun
    3A denotation of concrete object
        4A whole object
            5A living Thing
                6A human
                6B animal
                    7A domestic animal
                    7B wild animal: 8A mammal; 8B bird; 8C fish; …
                    7C animal in unreal world: 'phoenix, dragon' //language-specific
                6C plant
                    7A cultivated plant
                    7B plant in general: 8A tree; 8B grass; …
                    7C plant in unreal world  //language-specific
                6D microbe/micro-organism
            5B non-living thing
                6A natural object
                    7A object in outer space: 'star, sun, moon'
                    7B landscape
                        8A land mass: 'plain, highland, basin, hill, desert, island'
                        8B water mass: 'river, lake, pond, ocean'
                    7C object from natural phenomenon: 'lava, mud, wind'
                    7D material or substance
                        8A natural: //9A solid; 9B liquid; 9C gas; …
                        8B processed
                    7E secreta and excreta: 'sweat, tear, urine, milk'
                    7F objects with temporary existence: 'crack, shadow'
                6B man-made object  //a large category
                    7A manufactured object
                    7B non-manufactured object: 'book, poem, letter'
                6C object in imagination //language-specific
        4B part object //This branch is in meronomy code, shown here for illustration
            5A parts of living thing //outer parts, inner parts
                6A human parts
                6B animal parts //mostly inherited from human parts
                6C plant parts
            5B part of non-living thing
    3B other collective concrete noun of mixed category (language-specific)
    3C ADJECTIVE-NOUN-CONCRETE [1128]: 'beauty' //a large group
    3D VERB-NOUN-CONCRETE [1128]: 'killer' //a large group
    3E ATTACHED-PROPERTY-NOUN(CONCRETE) [1163]: 'American, nurse'
        //a large group

Fig. 4A 1N noun/2B abstract noun/3B property noun
    4A intrinsic property noun
        5A property noun of concrete object in general
            6A measurable physical property noun=attribute
                //7A dimension: //8A length; 8B width; 8C height/depth; ...
                //7B size: //8A area; 8B volume; ...
                //7C [solid]shape1: 'square,retangular,circular,triangular,irregular'
                //7D weight; 7E temperature; 7G color;
                //7H combinational physical property: 8A density; ...
                ....
            6B unmeasurable physical property noun(with human propensity)
                7A smell
                7B [edible object/food]taste
                7C [solid]appearance1: //8A shape2 :'beautiful, ugly'; ...
                7D [landscape]appearance2: 'beautiful, splendour'
                ...
        5B property noun of living thing in general:
            //6A age; 6B gender; 6C behavior1, habit1: 'vitality';
            //6D [animal]behavior2, habit2;
            ...
        5C property noun of human ---> see Fig 5A for more detail
    4B attached property noun
        5A proper noun used as attached property //all values are in special databases
            6A proper noun for place: 'Beijin, Paris'   //label for place
            6B proper noun of brand name for manufactured object;
        5B attached property noun in general
            6A human's attached property noun---> see Fig 5B for more
            6B attached property to concrete object in general
            6C attached property to living thing in general
    4C property noun of event
        5A intrinsic property noun of event //most are only property values:
            'easy/hard, simple/complicate, wrong/correct, early/late'
        5B process/structure: 'beginning, climax, sequel, end, scenario, outline'
        5C cause/effect: 'cause, reason, theory, symptom, effect, result, clue'
        5D situation/condition: 'situation, state, condition, tendency'
        5E rule/method/means
        5F advantage/fault
        5G time/space //cross-reference to ontological noun node NC
        ...

Fig. 4B 1N noun/2B abstract noun/3B property noun/4A intrinsic property noun/
5C human property noun
    6A direct property   //related to human self
        7A physical property // = human's attribute
            8A appearance, look
                9A for whole body //some inherited from concrete object in general.
                9B for part of the body
            8B other physical property: //9A posture/pose; //9B expression; ....
        7B physiological property   //some inherited from node NBBAB.
            8A property of organs
                9A sense organ: 'vision, hearing, smell, taste, touch'
                9B head/mind/brain: 'consciousness, hallucination, illusion'
                9C other organ: 'blood pressure, pulse, breath'
            8B property of body: 'health, disease, illness'
        7C psychological property
            //8A sentiment/emotion: 'happy/angry/sad';   //8B desire/greed;
            //8C mood, frame of mind; ....
        7D cognitive property
            8A conate, inborn
                //9A character/personality/behavior1 ---> see Fig 5C for more
                //9B talent; ....
            8B acquired
                //9A thought/view/viewpoint; //9B memory/imagination
                //9C heart1/attitude/manner/style1; //9D austerity/frugality; ....
    6B indirect property //associated with outside world, many time-related
        7A social property //related with outside world
            //8A plight/fate/future; //8B profession/duty/job/career;
            //8C relationship/friendship/enmity/trust; //8D morality/justice
            //8E social position: 'fame, credit, prestige, reverence'; ....
        7B dynamic property //from human's self activity
            8A over the whole dynamic period
                //9A mood/drive/diligence/responsibility; //9B interest/hobby; ....
            8B sometime with the dynamic period
                9A before: 'expectation, ideal, ambition, intention, motivation, desire'
                9B during: 'will, volition, perseverance, courage, determination'
                9C after: 'experience, performance, deed, achievement, feat, crime'
            8C with specific activity
                //9A manner of talk/walk/work; //9B expression2 of face/eye/body; ....

Fig. 5A 1N noun/2B abstract noun/3B property noun/4B attached property noun/
5C attached property noun in general/6A attached property noun of human
    7A personal info: 'name, birth date/place, nationality'
    7B relative name //related to someone in the family(extended family also)
        8A common: 'father/mother, son/daughter, brother/sister'
        8B extended family
    7C profession and professional name
        8A public servant: 'officer, judge, general, soldier'
        8B industry: 'worker, miner, manager, factory chief'
        8C agriculture: 'farmer, rancher, cowboy, fisher, fisherman'
        8D business and service industry: 'manager, accountant, secretary, lawyer'
        8E media and religion: 'journalist, reporter, anchorman, clergy'
        8F other profession: 'dancer, singer, artist, carpenter, chef, coach'
    7D title and position
        8A government/religion: 'Minister, President, Senator, Governor, Mayor'
        8B business/civil organization: 'CEO, Chairman, Chief, Director'
        8C military/international: 'General, Major, Minister'
        8D other title and position
    7E folk name: //some are cultural-specific
        8A name about social relation
            9A symmetric: 'friend, neighbor'
            9B non-symmetric: 'boss/employee, landlord/tenant'
        8B nickname //with feature{+=complimentary, -=derogatory, 0=neutral}
            9A related to a person's physical property: 'deaf=0, dwarf=-, giant=+'
            9B related to a person's capability: 'genius=+, scholar=+, master1=+'
            9C related to a person's character: 'madman=-, gentleman=+'
            9D related to a person's deed: 'hero=+, martyr=+, coward=-, criminal=-'
            9E related to a person's living: 'richman/poor, villager, beggar'
            9F related to a person's social condition/etc.: 'nobleman, muslim, monk'
            9G other nickname
        8C name related to a person's temporary role: 'bride/groom, hostage, pedestrian'
        8D other folk name: 'boy, girl, baby, child, mother'
    7F other attached human property noun

Fig. 5B 1N noun/2B abstract noun/3B property noun/4A intrinsic property noun/
5C human property noun/6A direct property/7D cognitive property/
8A conate, inborn/9A character/personality/behavior1
- 10A Appealing/Unappealing: 11A Appealing, Elegant, Neat, Rich, or Fancy
  - 11B Unappealing, Shabby, Messy, Poor, or Clumsy
- 10B Warm/Cold: 11A Warm, Friendly, Sensitive, or Loving
  - 11B Cold, Unfriendly, Irritable, or Cruel
- 10C Extroverted/Introverted: 11A Extroverted, Outgoing, Outspoken, or Dramatic
  - 11B Introverted, Reserved, Isolated, or Mysterious
- 10D Dominant/Submissive: 11A Dominant, Stubborn, Proud, or Confident
  - 11B Submissive, Uncertain, or Tentative
- 10E Strong/Weak: 11A Strong, Bold, or Tough
  - 11B Weak, Fearful, or Anxious
- 10F Active/Inert: 11A Active, Lively, Awake, or Limber
  - 11B Inert, Lazy, Tired, or Insensate
- 10G Happy/Sad: 11A Happy, Playful, Optimistic, or Elated
  - 11B Sad, Serious, Pessimistic, or Discontented
- 10H Calm/Angry: 11A Calm, Gentle, or Easygoing
  - 11B Angry, Emotional, Aggressive, or Passionate
- 10I Moderate/Excessive: 11A Moderate, Sane, Conservative, or Old-Fashioned
  - 11B Excessive, Mad, Insane, or Radical
- 10J Proper/Vulgar: 11A Proper, Courteous, Refined, or Puritanical
  - 11B Vulgar, Rude, Degenerate, or Wild
- 10K Intelligent/Stupid: 11A Intelligent, Informed, Clever, or Articulate
  - 11B Stupid, Ignorant, or Confused
- 10L Special/Ordinary: 11A Special, Bright, Skillful, or Unusual
  - 11B Ordinary, Dull, Plain, or Banal
- 10M Wise/Foolish: 11A Wise, Mature, or Experienced
  - 11B Foolish, Immature, Bigoted, or Trivial
- 10N Good/Bad: 11A Good, Sincere, Honest, or Just
  - 11B Bad, False, Evil, Insincere, or Dishonest
- 10O Giving/Demanding: 11A Giving, Trusting, Innocent, or Generous
  - 11B Demanding, Critical, Calculating, or Selfish
- 10P Helpful/Troublesome: 11A Helpful, Positive, Responsible, or Nice
  - 11B Troublesome, Negative, Irresponsible, or Unpleasant

Fig. 5C

//In the following, proto is short for prototypical;
//meta is short for metaphorical Group 1 of Prototypical Two-argument Dynamic Clause/Verb,
    when the prototypical argument O is concrete noun:
    including forward operation clause/verb and social clause/verb 1100    If argument S is agentive(so S is also concrete)
    1110    If O is concrete
        1111    If both S and O collocate with verb V, then clause is proto, verb is proto
        1112    Else If S collocates with verb V, but O does not
            then clause is proto, verb is in derived sense or meta
        1113    Else If O collocates with verb V, but S does not
            then clause is meta, verb is proto
        1114    Else both S and O do not collocate with verb V,
            then clause is meta, verb is in derived sense or meta
    1120    Else O is abstract, then clause is meta, verb is meta
1200    Else If S is not agentive but concrete
    1210    If O is concrete
        then clause is variational, and S is tool/instrument/material
    1220    Else O is abstract, then clause is variational and meta,
        verb V is meta, and S is tool/instrument/material
1300    Else S is abstract    //then clause is variational
    1310    If O is concrete //then S is cause or method or manner
        1311    If O collocates with verb V
            then clause is variational, S is cause or method or manner
        1312    Else O doesn't collocate with verb V, then clause is variational
            and meta, and verb is in derived sense or meta
    1320    Else O is abstract, and
        clause is a metaphorical cause-effect relation clause

Fig. 6/1

Group 2 of Prototypical Two-argument Dynamic Clause/Verb,
    when the prototypical argument O is abstract noun:
    including forward communication clause/verb and activity clause/verb
    and backward mental clause/verb
    //In the following, the 'IF THEN' directive is omitted for simplification 2100 S is agentive and human, hence always collocates with verb V
2110    O is concrete---O is not proto, clause is meta but rare
2120    O is abstract
2121       O collocates with verb V---clause is proto
2122       O does not collocate with verb V---clause is meta but rare
2200 S is not human but concrete
2210    O is concrete---O is not proto, clause is very rare
2220    O is abstract------clause is variational and meta, but rare
2300 S is abstract---clause is variational
2310    O is concrete---O is not proto, clause is meta but rare
2320    O is abstract---a metaphorical cause-effect relation clause
2321       O collocates with verb V---clause is variational, S is method/manner
2322       O does not collocate with verb V---clause is meta but rare If all the above rare cases are deleted, then the rules become 2100 S is agentive and human, hence always collocates with verb V
2121    O is abstract and collocates with verb V---clause is proto
2321 S is abstract, O is abstract and collocates with verb V
    - a meta cause-effect relation clause and clause is variational, S is method/manner Group 3 of Backward Psyche Clause/Verb of Prototypical Two-argument Dynamic
    Clause/Verb 3100 S is agentive(human and, in less degree, animal), O is general noun Group 4 of Prototypical One-argument Dynamic Clause/Verb 4100    S is agentive
4110       S collocates with V---clause is proto, verb is proto
4120       S does not collocate with V---clause is meta,
                verb is in derived sense or meta
4200    S is not agentive but concrete---clause is meta or pragmatic
4300    S is abstract ---clause is meta

Fig. 6/2

INTERLINGUA, INTERLINGUA ENGINE, AND INTERLINGUA MACHINE TRANSLATION SYSTEM

CROSS-REFERENCE TO RELATED APPLICATION

Not Applicable

FEDERALLY SPONSORED RESEARCH

Not Applicable

SEQUENCE LISTING OR PROGRAM

Not Applicable

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

Embodiments of the invention generally relate to a machine readable common representation of natural languages, called Interlingua, a system for using computer to convert texts between natural languages and the Interlingua, called Interlingua Engine, and a machine translation system for using computer to do translation between and among natural languages via such representation as an intermediate, called interlingua machine translation system.

2. Prior Art

Natural language (NL) and its use are daily matters for every human being. Linguistics, the study of NL, is a well established discipline. Machine translation (MT), the use of computer to translate texts between NLs, has been researched on for over six decades soon after the birth of computer. For a brief discussion of MT and its history, reference is made to U.S. Pat. No. 6,275,789 to Moser, et al. (Aug. 14, 2001), entitled "Method and apparatus for performing full bidirectional translation between a source language and a linked alternative language".

Translation between NLs is a very old profession. It developed soon after two peoples speaking different languages met to communicate. It has always been both labor and knowledge intensive. More than that, even for skilled translators, in the current state of the art, the results of translation generally were not satisfactory. In the age of globalization, when cultural, technical, and encyclopedic knowledge is heavily involved in translation and the amount of the need grows exponentially, human translation could no longer meet the demand. Hence MT is urgently needed. Fortunately, computer hardware and software and linguistics all have advanced so rapidly that condition is ripe for the MT use.

Over the last six decades, a long series of MT systems have been proposed and many have been implemented on computers of increasing sophistication. However, these systems can be more or less characterized as an extended bilingual look-up table (with the exception of statistical method), sort of an electronic dictionary, supplemented with conventional grammars of source and target languages. Hence they are not patented systems. These systems or methods of MT are generally called direct transfer (DT) MT which will be explained later. Among the patented systems, such as U.S. Pat. No. 5,349,368 to Takeda, et al. (Sep. 20, 1994), entitled "Machine translation method and apparatus" and U.S. Pat. No. 5,351,189 to Doi, et al. (Sep. 27, 1994), entitled "Machine translation system including separated side-by-side display of original and corresponding translated sentences", most do not provide an actual method or the construction of the translation part of the system for a skilled person in the art of programming and linguistics to follow. That is, in simple terms, no actual parser or parsing method is provided.

Right after the start of MT research, proposal and discussion were made for an interlingua method (IM) of MT. That is, if the program to translate language A into language B is called an AB module, which is what the DT method is doing, but for IM, the translation of A into B is done in two steps: the first step is to translate from A into a 'common language' I (generally called interlingua)—the corresponding system is called the input module of language A, i.e. the AI module; and the second step is to translate from I into B—the corresponding system is called the output module of language B, i.e. the IB module. The advantage of IM was thought to be the following numerical superiority: for n languages to be translated among each other, the traditional DT methods need n (n−1) modules, but the IM needs only 2n modules. In fact, the real advantage is much more than that, including the standardization of the construction of modules for every NLs to be included in an IM translation system, which in turn will lead to an unified programming environment for MT.

However, not only the IM of MT has not been commercially realized, but even the exact definition of interlingua is not clear, let alone a design of interlingua suitable for MT. Some think it should be a 'formal' formulation, such as the one shown in "The Lexical Semantics of a Machine Translation Interlingua" written by Rick Morneau (reference is made to the web site www.eskimo.com); some theorize it as language universals; some argue for an Esperanto-like language; some treat an unified multi-language MT system as an interlingua MT system; etc. At the core of the problem is that, despite the great advance of linguistics over last half century, a lexicon and a grammar applicable for all NLs have not been found.

Among MT-related patents, the U.S. Pat. No. 6,275,789 cited above does a half way part for the IM, in the sense that its 'linked alternative language' (LAL) is an especially designed language form into which to transform the source language so as to allow targeted populations to comprehend and use it more efficiently than the source language itself. In other words, each source language has its particular LAL. No interlingua is involved, although a 'pivot-language' is discussed which could be considered as a 'half interlingua' in the sense that it is a one-way interlingua to target languages, not the other way around. But note that the LAL is not unique, hence it is not a true interlingua.

Another major drawback of U.S. Pat. No. 6,275,789 is that it does not teach how to construct a particular LAL. More particularly, no linguistic system (commonly known as grammar) is indicated, hence no parsing method or algorithm is proposed. In fact, whether by DT method or by IM, any solution for MT has to deal with the two issues of lexicon and grammar. For the lexicon, the central problem is many-to-many correspondence, i.e., any word of any NL has multiple senses. For the issue of grammar, the central problem is ambiguity, not just the ambiguity caused by the multiple senses of words, but also the ambiguity caused by the combinations of any linguistic unit (LU), i.e., from combinations at word level all the way to those at sentence level and beyond. Hidden behind these problems is the fundamental problem of how to use limited resources (words, phrases, and the like) to deal with the infinite possibilities (objects, phenomena, concepts, expressions, etc.) of the world. Therefore, to any proposed solution of MT, the test is to see whether it provides a practical lexicon and grammar so that it can be used by a person skilled in the art of linguistics and programming to build such a MT system.

An additional fault of LAL is that it proposes to modify or standardize its source language. This violates one of the principles of NL in that NL is created by popular acceptance through usage over time. Imposing a modification or standard without popular usage and acceptance beforehand just won't work. On the contrary, people want variety, and constantly seek new ways of expression, therefore make more ambiguities possible.

On the linguistics side, great strides have been made since the ALPAC report (the report was mentioned in the above referenced U.S. Pat. No. 6,275,789). One is the advance outside of the traditional syntactic ground to the semantic and even pragmatic grounds. Now it is generally agreed that a viable MT needs to be built on these three levels of grounds. Interesting works in word semantics have also appeared on the internet, which often went as a group or mass effort such as the CYC project which stopped in 1995 and the WORDNET project (and later the FrameNet project) which has a worldwide following with many language versions. However, these works have not been successfully and visibly used in MT so far.

Advantages

Thus advantages of one or more aspects of Interlingua approach are well-known and sought after for solving MT problems. Other advantages of one or more aspects will become apparent from a consideration of the ensuing description and accompanying figures.

SUMMARY

In accordance with one embodiment, a lexicon and a grammar are specifically and completely designed for the Interlingua approach, so that a person skilled in the art of linguistics and programming can follow to compile the Interlingua lexicon and grammar, and to compile the matching lexicons and grammar of respective NLs. Then a programming framework is designed for using the Interlingua lexicon and grammar to do machine translation in an Interlingua manner, so that the skilled person can follow to construct the Interlingua MT system.

DRAWINGS

Legend

[xxxx], where x is a numeral, refers to paragraph [xxxx] in the description.

Nodes in all capital letters mean virtual nodes.

If a branch is expanded out, its node path from the very root is written out at the top line.

Words after '//' are for added explanation or comment.

Nodes after '//' are for sample listing, they are not exhaustive.

Words in single quotation are sample words in English.

DRAWINGS

Figures

FIG. 2 shows the overall configuration of the general lexicon of the Interlingua lexicon.

FIG. 3A shows noun classification at higher levels of the noun tree.

FIG. 3B shows adjective classification at higher levels of the adjective tree.

FIG. 3C is in two pages, FIG. 3C/1 and FIG. 3C/2, showing verb/clause classification at higher levels.

FIG. 3D shows adverb classification at top level of the adverb tree.

FIG. 4A shows further levels of the concrete noun classification tree.

FIG. 4B shows further levels of the property noun classification tree.

FIG. 5A shows human's property noun classification tree at the node NBBAC.

FIG. 5B shows human's attached property noun classification tree at the node NBBBD.

FIG. 5C shows a sample of synonymous groups of English property words (labeled with adjectives) of human personality and behavior at the node NBBACADAA.

FIG. 6 is in two pages, FIG. 6/1 and FIG. 6/2, showing the semantic rule of structure of the simple sentence (clause).

DETAILED DESCRIPTION

First Embodiment

The embodiment has two parts: construction of the Interlingua, and providing for the programming of the computer processing of NLs using the Interlingua, called the Interlingua Engine (IE), which is presented in Parts II and III. The construction of the Interlingua also has two parts: the Interlingua Lexicon (IL) and the Interlingua Grammar (IG), which are presented in Part I.

Figure 1:
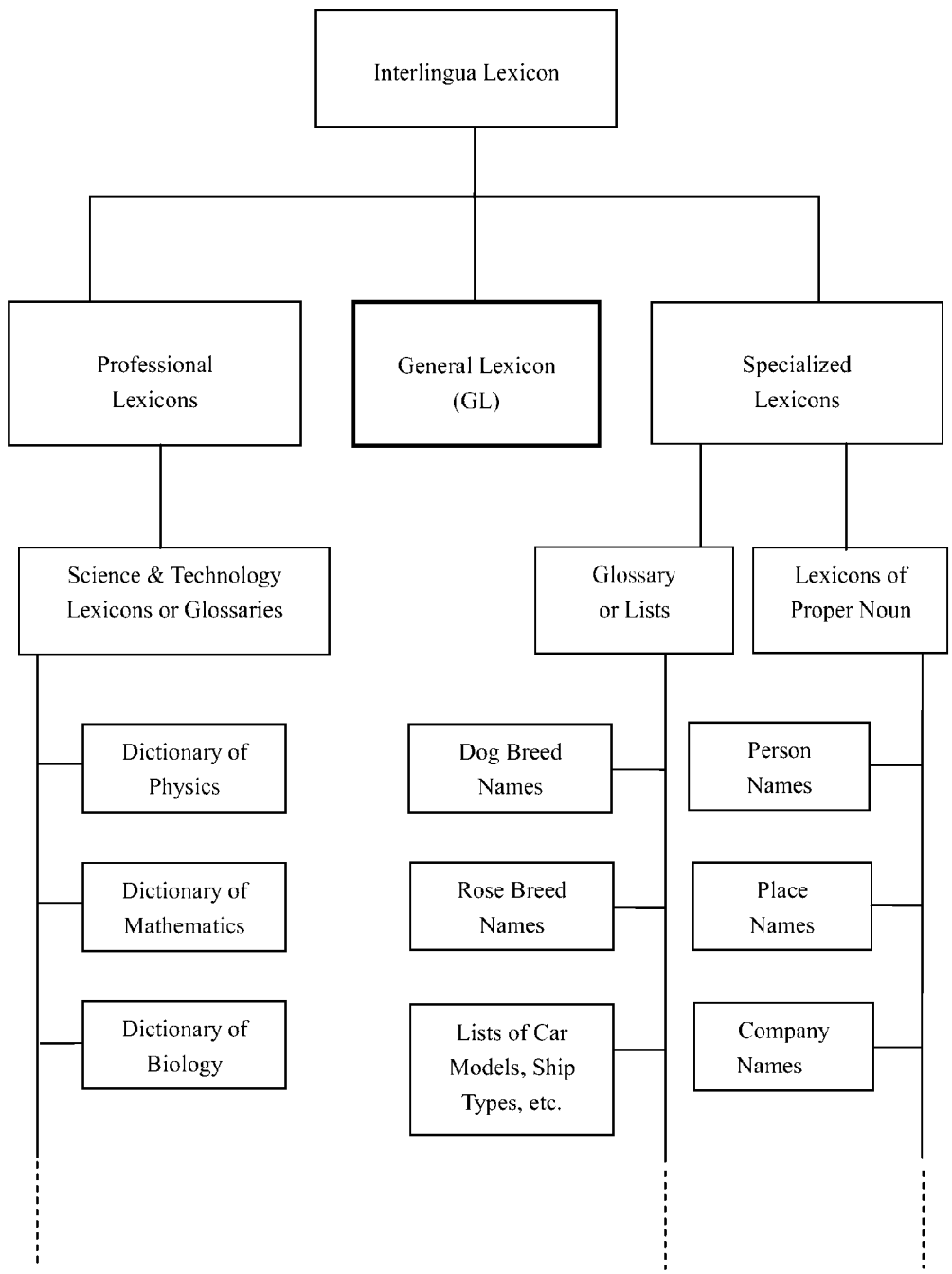
FIG. 1 shows the organization of the system of the Interlingua lexicon.

One embodiment of the IL is shown in FIGS. 1 to 5. FIG. 1 shows the organization of the system of the IL. It has three main divisions: (a) the general lexicon (GL), (b) the professional lexicons for every professional discipline or field, many are usually just called glossary or terminology, and (c) the specialized lexicons for every category of proper nouns (such as person names, geographic names, company names, etc.) and nouns of special areas (such as dog breed names), hence they can be simply listed in databases. 'Words' in these lexicons are in machine readable codes. The range of 'words' in the GL corresponds roughly to the usual printed dictionary of each NL. It is at the core of the IL. Virtually all the other divisions are mainly collections of nouns. Hence for the IL the following presentation concentrates on the GL.

A corresponding lexicon system LL of any NL L included in an IM MT System has three main differences between the IL and LL. The first is that, corresponding to a 'word' in the IL, there are often multiple words in LL, each with an additional code, called feature code—these are synonymous words in LL. The second difference is in the reverse correspondence which is much more complicated. A word, as a symbol, in the IL is unique, i.e. one word one symbol. But in LL, one symbol of L can corresponds to many words in LL, and a word of LL can have many senses. Hence for a symbol in L, in finding its corresponding 'word' in the IL, one first has to determine which word it represents in LL, then to determine which sense it takes in LL. This is one of the core design of the embodiments of the present invention, in fact it is one of the core problems of all MT programs, i.e., how to deal with the problem of many-to-many correspondence between the lexicons of NLs. The third difference is that, in the GL of the IL, only prototypical words are defined and assigned classification codes. Derived words generally are not assigned classification codes, instead they are linked by virtual nodes (codes) of each respective type with corresponding words in the GL of respective NL. These virtual nodes are indicated by all capital words in the tree figures. This is one of the innovations of the present embodiment and presented in detail in the Operation Section. There is also another minor difference between the IL and LL, i.e., in its professional division and specialized division of lexicons of LL, mostly in the later, some lexicons are language specific, e.g., lexicons of proper names. All these will be presented in detail in the Operation Section.

FIG. 2 shows the overall configuration of the GL, for Interlingua and for NLs. This is a tree-like classification. That is, starting from its root, labeled 'word', it keeps branching out into more and more sub-branches. Each node in LL corresponds to a word or a group of synonymous words; but in the IL, it corresponds to its classification code and then, for purpose of the presentation, it is labeled in English so as to describe to English readers. The construction of GLs of IL and any NL L works like this: The IL is first constructed with the knowledge of any particular NL L, producing the classification codes together with a description for each node in L (for modeling the first embodiment, two NLs, English and Chinese, are consulted). After the Interlingua system is completed, all the descriptions are converted into the Interlingua representation (codes). Then, in compiling the lexicon of a newly included NL, with the aid of a software compiling tool, the IL trees are presented on the computer screen showing nodes with the description in an already compiled language which the language worker is familiar with. By clicking on the correct corresponding node, each word of that NL is associated (assigned) with the code of the node. So the construction of the IL needs to be made only once, as exemplified in this embodiment, then the construction of the lexicon of each individual NL, when it is being included in the IM MT System, is simply assigning the IL code.

Content Word. Note that FIG. 2 shows the four branches for the four part-of-speech (POS) types of noun, adjective, verb, and adverb, respectively. They are called content words and are the main parts of the GL of any NL. They are also most numerous, running from several thousands to several hundreds of thousands for each type. Each type of them has special characteristics and hence they are classified differently, as presented in detail later. The remaining non-content words are divided into functional word group and supplementary word group. The functional word group can be further divided into major functional word group, such as preposition, conjunction, and pronoun, which are generally language-universal, and minor functional word group, such as article and PRO-word (other than pronoun), etc. which are generally language-specific. The supplementary word group, for words such as interjection, courtesy word, sound-word, etc., is generally language-specific and play a minor role in NLs. Words in the functional word group are generally numbered less than a hundred for each type and hence their representation in the GL is easily done, for example by simple listing; but they are intimately involved in the programming of the language modules. Hence functional words are not extensively presented in the following.

Alphabetic Code for the Presentation. Note that the trees are generally drawn from top to bottom, but the upward terminology is still used in the presentation since it is more figurative and commonly used (if there is any confusion, intuition should give the guide). Later, when design the content words of the GL, each node is labeled alphabetically, which is used as the classification code of the node for the presentation (see the figures). That is, the code of a node is the string of these alphabets of its successive hypernym nodes, ending at its own alphabet. For the root nodes, let the alphabetic code also reflects their POS type, so that N for noun, J for adjective, V for verb, and M for adverb. Thus for the noun classification, the 'noun' node has the code N, and the 'concrete noun' node has the code NA, the 'abstract noun' has NB, and so on. Note again that this alphabetic code is for the embodiment, the actual code is subject to programming consideration. Also note that, to facilitate the reading of the classification tree, numbers showing the node-levels are added; in actual code, these numerals are redundant. Since tree graph is a common tool to provide a vivid perception for this kind of classification, its terminology is freely used in the following presentation, even when no tree graph is shown. Thus, for example, the branch starting at the 'noun' node is called 'noun branch' or, more conveniently, simply called a 'noun tree' at (or of) node N. And the end or terminal point of a branch is called a leaf node, naturally. Also, nodes closer to the root node of the branch are called higher level nodes, as in common practice.

FIGS. 3A to 3D show the respective 'noun', 'adjective', 'verb', and 'adverb' trees at their respective higher levels of the GL trees. They are described separately and extensively in the Operation Section so as to teach detailed construction of the lexicon and to show how this construction follows human language's natural formation process.

The abstract noun branch in FIG. 3A is very interesting and is one of the innovations of the present embodiment. Its third level branches—the property noun, the event noun and the concept noun—give a clear perception of what an abstract noun means. Operation Section gives details.

FIG. 3B shows the adjective classification at its higher levels. Prototypical adjective is the value of the property of an entity, mainly concrete object. Hence adjective classification is in a triad form: object-property-adjective. Therefore, the adjective tree is, in large part, grafted from the property noun tree shown in FIG. 4B, but much simplified in lower branches. Also, the words 'adjective', 'property' and 'property value' are used interchangeably in the presentation, so there is not shown a more detailed classification tree for adjectives.

FIG. 3C shows the verb classification at its higher levels, which is also one of the innovations of the present embodiment, especially for the two-argument dynamic verb. Subsections 2 and 3 of the Operation Section give a detailed explanation of the design.

FIG. 3D briefly shows the adverb classification.

FIGS. 4A and 4B give more detailed classification of the noun, 4A is for concrete noun and 4B is for property noun. Note that FIG. 4A shows mainly the WHOLE part of the concrete noun classification, since the PART part is straightforward. But note that, by inheritance, for the WHOLE tree, parts of a hypernym node are generally inherited by its hyponym nodes. By taking account of this fact, meronomy codes (and nodes) can be made more efficient. For example, all animals have head, body, and limbs (in general sense); and head has eye, nose, mouth, etc; and so on. By listing this meronomy sub-tree only once in a node at a level as high as possible, and let a particular animal overrides the names of some particular parts—called polymorphism in C++ programming language (such as wing for limb of bird and fin for limb of fish), the meronomy code can be made compact and semantic rich.

As shown in FIG. 4B, words related to human are in major proportion, especially in human properties. Among human properties, there are a large variety of types which the present embodiment considers as labels on the prototypical noun 'human' and hence a kind of attached property—one of the important innovations of the present embodiment (see subsection 1.6 for detail). FIGS. 5A to 5C then give further detailed classification of the human part of the noun words. FIG. 5A gives more detailed classification of the human property, FIG. 5C further gives a sample of synonymous groups of English property words of human personality and behavior (all shown as adjectives) at the node NBBACADAA (see [1153]), and FIG. 5B gives more detailed classification of the human attached property.

FIG. 6 shows the semantic rule of structure of clause (see subsection 9.4 of Part I). This rule is one of the major innovations of the embodiment. It forms the main semantic part of IG.

Figure 7:
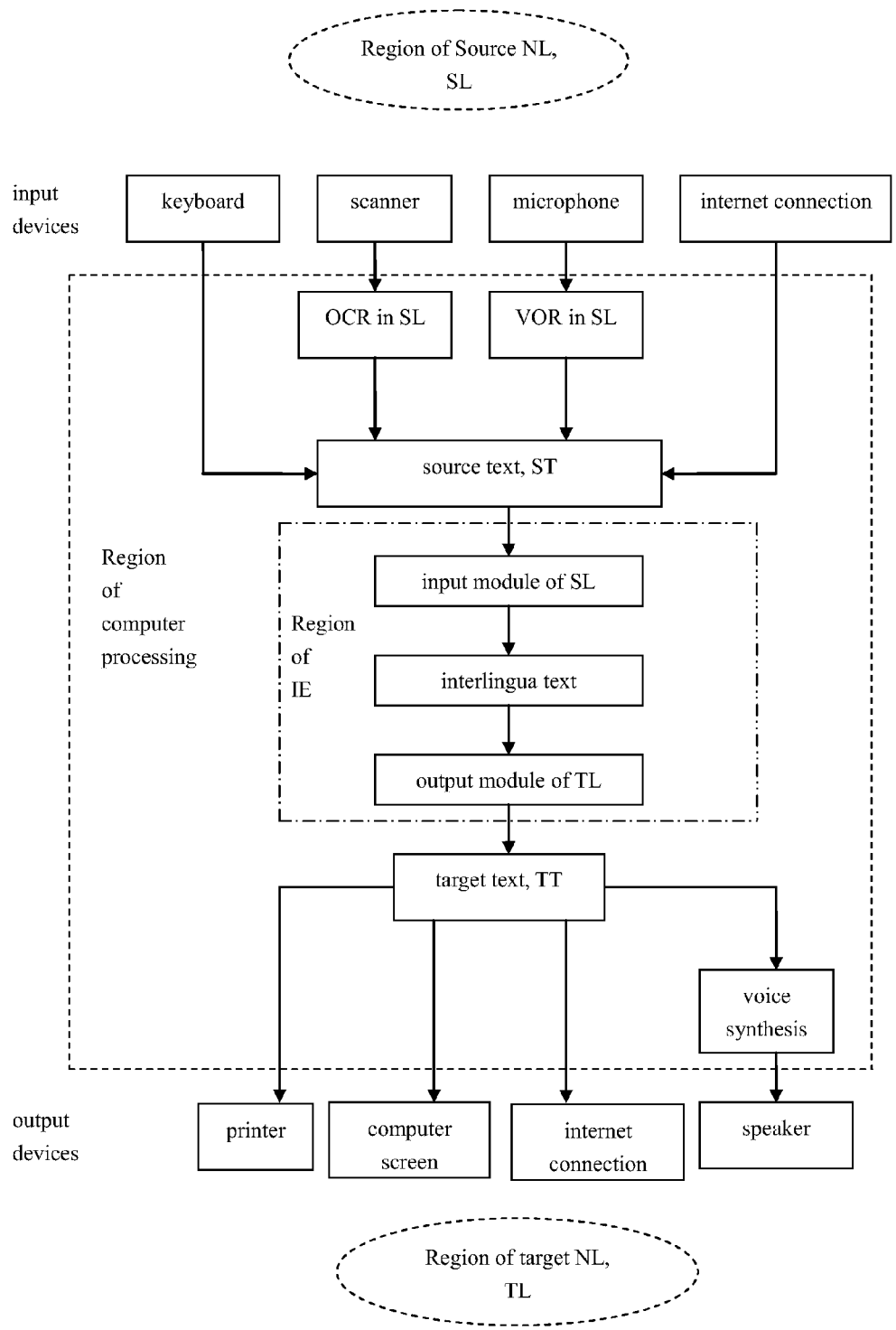
FIG. 7 shows a schematic drawing of the interlingua machine translation system.

FIG. 7 is a schematic diagram showing the interlingua machine translation system. It starts from a text or speech in the source language (SL) environment to be translated. The text or speech first passes through a suitable input device (or means) so as to be inputted into the computer as a source text ST. The four input devices shown are the most common situations nowadays. As technology advances, there bound to appear more options, such as wireless input. ST is then processed by the interlingua engine of the present embodiment and results in the target text TT. Again the TT has to pass through appropriate output devices to be useful by human in the target language (TL) environment, shown are also the four most common situations nowadays.

Figure 8:
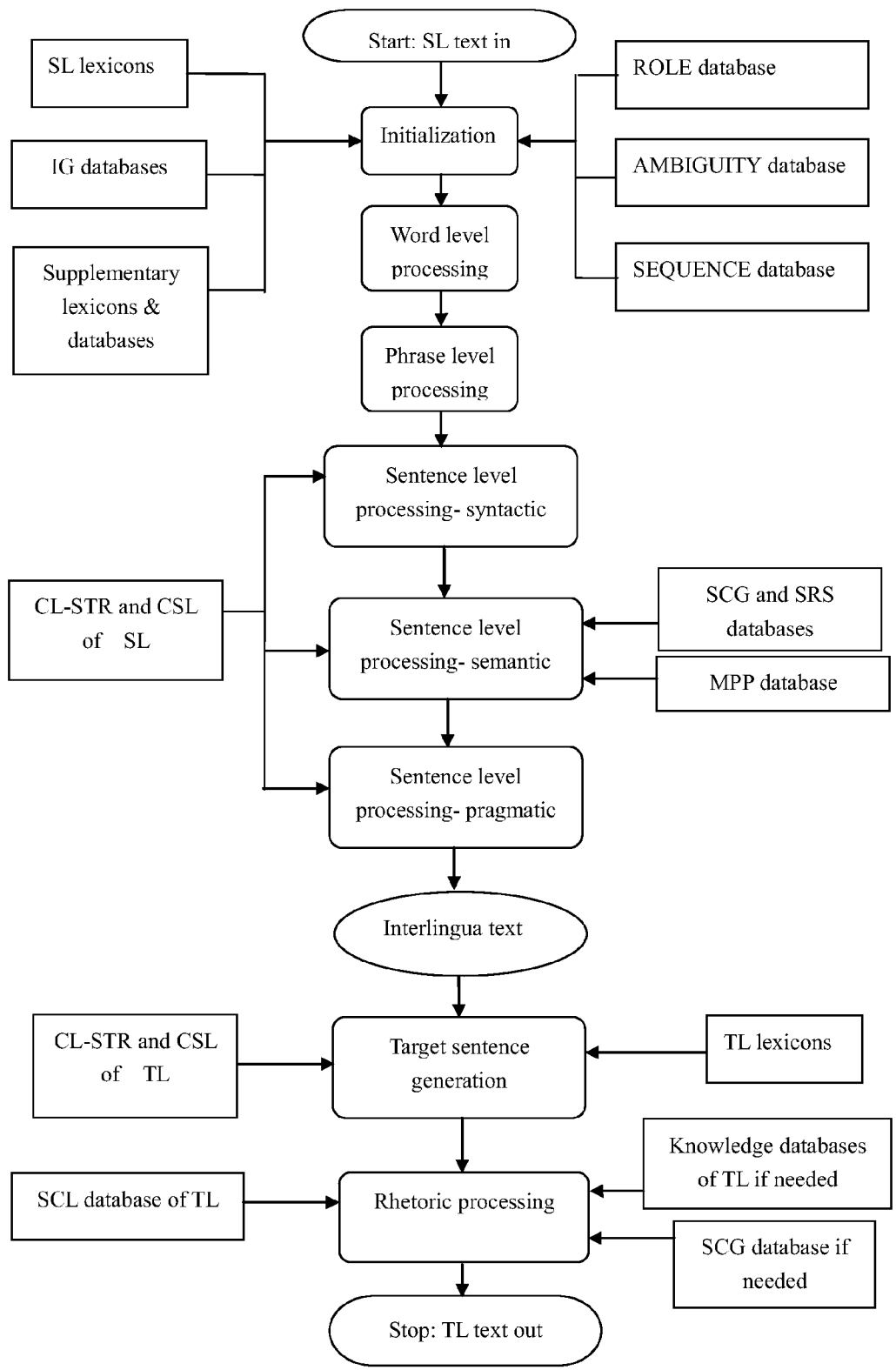
FIG. 8 is a schematic flow chart showing the general framework of the Interlingua engine.

FIG. 8 is a schematic flow chart showing the general framework of the Interlingua engine, see Part III for detailed presentation.

Figure 9:
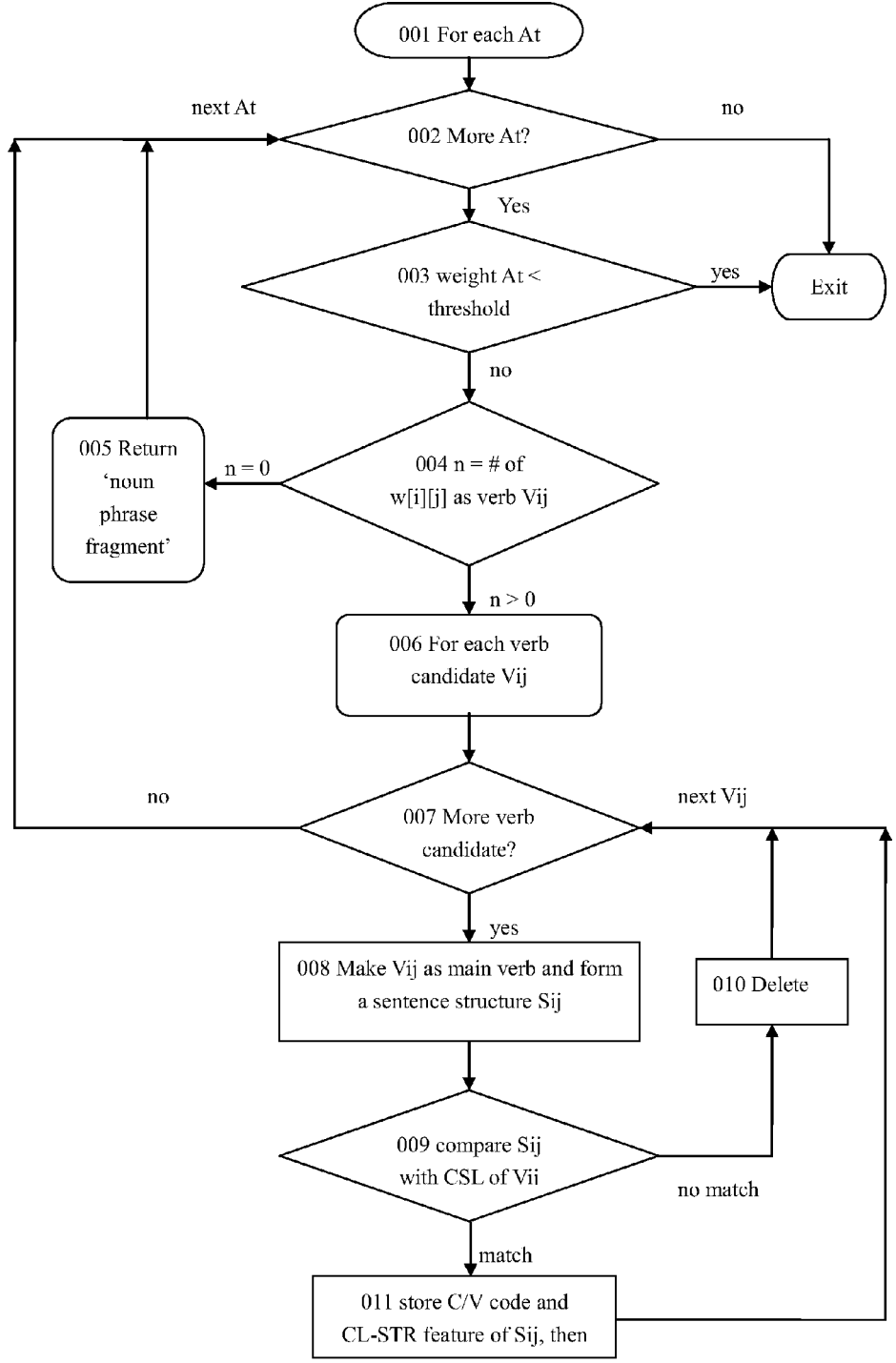
FIG. 9 is a flow chart showing the syntactic processing of the clause.

FIG. 9 is a flow chart showing the algorithm of the syntactic processing of simple sentence (clause) as presented in subsection 3.4 of Part III.

Figure 10:
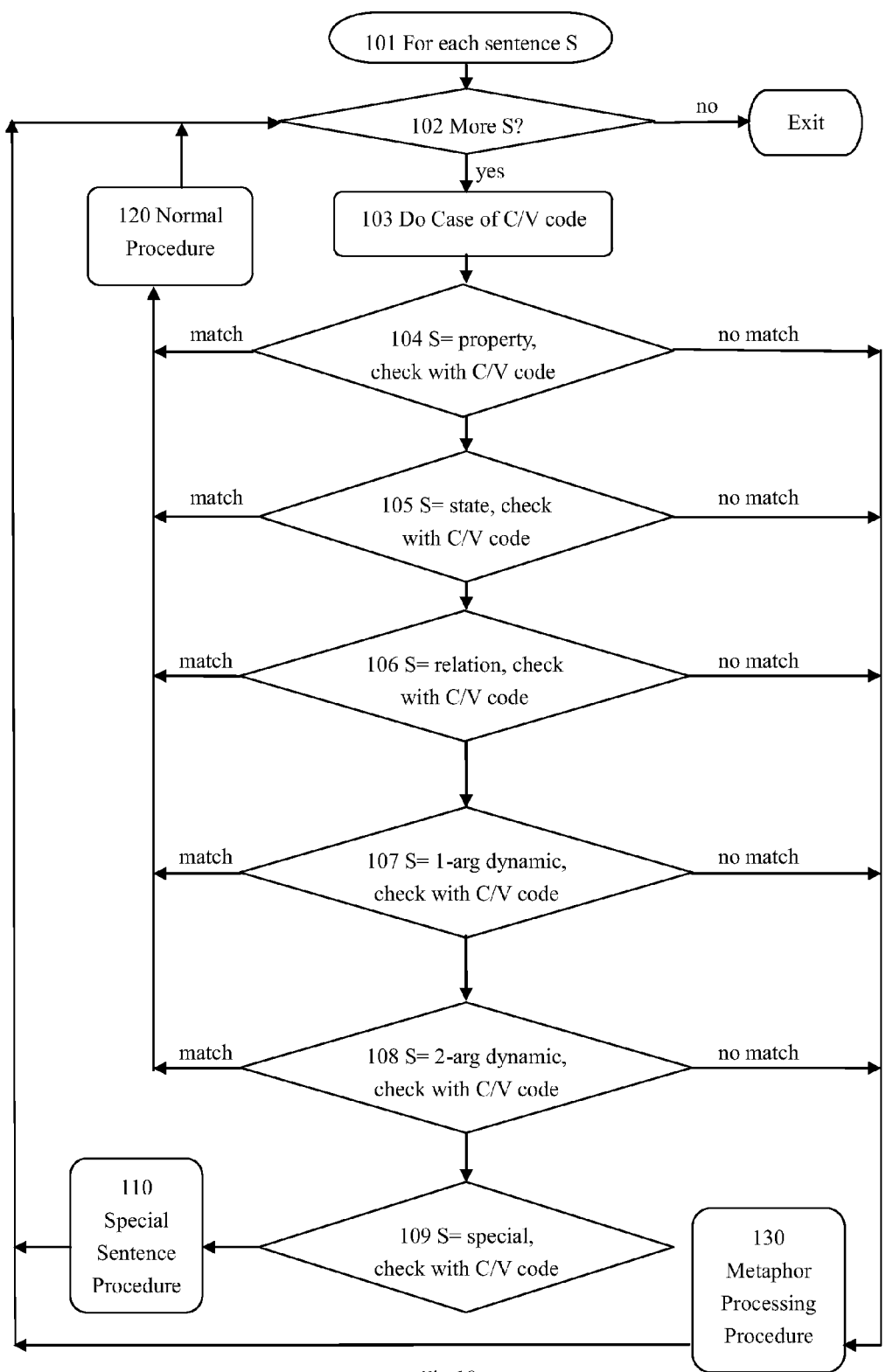
FIG. 10 is a flow chart showing the semantic processing of the clause.

FIG. 10 is a flow chart showing the algorithm of the semantic processing of simple sentence (clause) as presented in subsection 3.5 of Part III.

Operation

Part I Interlingua

0 Seven Causes of Ambiguity

To translate from a source language SL to a target language TL, two main tasks are to be solved: one is to analyze and determine the correct sentence structures of the source text ST, and the other one is to find the correct matching words of the target text TT. The first task mainly belongs to the second Part, the Interlingua Engine, and the second task belongs to this Part, the Interlingua. What makes these two tasks so difficult is the fact that NLs are full of ambiguities. Listed below are the major sources causing ambiguities. They mainly tell of the all-pervasive irregularities and idiosyncrasies in NLs that the design of Interlingua takes account of and makes every effort to deal with, since they are the reasons why MT is so intractable. In other words, NLs are developed naturally under the influence of forces embodied by the following major causes of ambiguity. Therefore, designing the Interlingua needs to navigate carefully and properly through these forces.

The first cause is the linearity of NLs: words are written (spoken) one by one, i.e. in a linear stream or in one dimension. However, Interlingua is a representation, not intended for use in speech (or writing) directly. Hence the first thing Interlingua does is to break off this linearity shackle. This is achieved by amply and thoroughly using 'codes' on words, arguments, phrases, sentences, etc. and using 'feature/parameter set' to supplement the 'codes'. As it is implemented in the computer, this becomes a very easy and ready task.

The second one is the paucity of symbols (words): words are basic symbols of NLs and for any NL their number is not only finite but actually very limited. The limitation comes from both phonetic and memory grounds. Again, Interlingua does not care about speech, and computer doesn't bother with memory problem. Hence IL is not bound by this limitation. The present embodiment uses classification codes which are virtually unlimited to represent words and even sentences.

The third one is the multiple-use of words: all words in NLs, as symbols, are used multiplely, not only in multiple senses but also in multiple parts-of-speech (POS). And in multiple senses, it can be across category or in meaning extension. And in meaning extension, it can be a straightforward extension or a metaphoric one. Multiple-use in meaning extension is one way that NL uses to deal with the paucity problem. However, it also becomes the first level cause of ambiguity in NLs. Disambiguation is the major task in MT and it starts at the word level or even at the morphological level. The important thing is, as indicated in the second cause of paucity, IL represents words in an unique way as distinct 'codes', no multiple-use is allowed.

The fourth one is vagueness in NLs: Every NL is discrete but the environment it is used and the content it wants to express are continuous in many dimensions. That means NL can only take discrete prototypical points in the world continuums to make expressions. 'Point in the continuum' is the prominent metaphor of NL reality, and prototype is the concept and tool used in dealing with this reality by the embodiment. When one views/understands a word or an expression, one often may not be able or need not to detect the exact 'location' of a particular prototypical point in its continuum. Therefore it gives an impression of vagueness. In a familiar environment, this vagueness remains in people's sub-consciousness and doesn't affect understanding. When asked specifically, people will often pause to point out the exact 'location', i.e., precise meaning. To use a metaphor, people always want to say someone 'looks like' someone's particular relative, but often have difficulty to point out the specifics of the 'likeness'. Philosopher and linguist Wittgenstein formulates this phenomenon in a theory of 'family resemblance'. However, computer doesn't have such 'sub-consciousness', so Interlingua must help it to 'calculate' the proper location, whether it is in the noun continuum, verb continuum, or even sentence continuum, etc., so as to correctly process the source text. The main method the present embodiment takes to deal with 'family resemblance' is 'weighted feature/parameter', as will be seen throughout the presentation.

The 'Point in the continuum' is not only a metaphor, but also an important consideration in the design of the GL of IL. The embodiment uses classification codes to represent prototypical words and sentences. What the classification does is in essence to divide the continuums into ever finer regions, which, for the case of word meaning, is called word's meaning field. If there are divisions, there will be boundaries between regions. In another words, there will be cases that fall between divisions. The problem is how to treat the boundary cases. There are in general two ways used in the embodiment: one is to treat as special cases, such as cases in section 3.5; another way is to choose one side of boundary in IL and let all other NL follow suit—if later found the other side is better, the correction needs to be done only once in IL, such cases are abundant as in [1172], [1217], [1233], [1513], [1532], [1622], [1702], [1952], etc.

The fifth one is the ambiguity of linguistic unit (LU): It is the result of two LUs happen to have the same form or the same use, the simplest example is the multiple use of a word; and it can take any form and happen at any level—i.e., for any LU. This phenomenon has been studied extensively in linguistics, but so far has not been dealt with satisfactorily. Note that, elsewhere in the presentation, unless specifically referred to this cause, the word 'ambiguity' takes a broad meaning, i.e. includes ambiguities caused by all the above sources.

The sixth one is the compactness of expression: humans tend to use language efficiently. One important consequence is the prolific use of anaphora, or PRO-words. Another is the omission of words, ellipsis, that are implicit in the context. These problems will mainly be dealt with by IE since it often occurs at the pragmatic level, but Interlingua will provide it the necessary means.

The seventh one is the exception of rules: as the saying "every grammar rule has exceptions" indicates, exception permeates all over the language use. This does not and should not make one in despair in MT, but instead should serve as a caution not to make absolute rules, such as the rewrite rules in the DT method of MT. That is, the Interlingua and the IE should be made flexible, always keeping room for exceptions. In DT method of MT, the source language (SL) grammar and the target language (TL) grammar are compared and matched side by side—called 're-write rules'—which is already a difficult task in view of the many unsettled grammar problems in linguistics. With so many exceptions intertwining, no wonder DT method fails. As is shown in the following, the IM can handle exceptions in an orderly way since only one NL at a time is involved.

From these causes of ambiguity it can be seen what a daunting task a computer is facing in trying to parse a sentence: The computer first has to determine the correct sense of each word. Then or simultaneously, it has to determine what relationship a word forms with its neighboring words, that is, what correct LU a word forms with its neighboring words. A LU can form with other LUs into more complex LUs. The process goes on until the sentence itself. Since each word has multiple senses, the number of possibilities of forming LU grows exponentially with the complexity of a LU. A parser's job is to reduce the possibilities to one, or to a manageable few. Then the computer has to make sure the candidate sentence, and hence all its component LUs, is meaningful and readable, i.e. to do semantic and pragmatic analysis—two tasks that generally have not been seriously addressed in practice. This invention takes the approach to design the Interlingua first, which lays the foundation of IL and IG, whereupon the semantic rule of sentence structure (see subsection 9.4) is designed and a general framework for a syntactic-semantic-pragmatic sentence parser is provided and incorporated in IE (see Part III).

0.1 Interlingua Text

With the above causes of ambiguity in mind, it can be seen that the fundamental drawback of the traditional DT method for MT is its inability to cope with the realities of ambiguity in NLs, which boils down to its lack of an unified programming environment, i.e., lacking a specification for the MT program: what the program is to achieve? The seemingly straightforward answer, i.e., to achieve the translation of a given SL text into a corresponding TL text, not only hides the ambiguities of NL reality, but also doesn't specify what precisely a corresponding text of TL is. The answer often cited so far is a 'high quality' text in TL—a vague and indirect answer. That the 'corresponding text', or the translated text, can't be well-defined is at the heart of the problem, or more precisely the failure, of the DT method. For the IM of MT, the 'translated text' is the 'Interlingua text' resulting from processing SL text by the IE, and the 'corresponding text' of TL is generated from the Interlingua text (note that the Interlingua text is generally in the form of computer code). Therefore, a well-defined Interlingua gives a clear and direct answer to this question.

For the DT method, since there are always two NLs involved in programming, the SL part and the TL part are mixed so that the two NLs are intimately involved in the process, hence the complexities are multiplied. For the IM, only one NL is involved at a time. Best of all, for a new NL to be included in the interlingua MT system, it is always programmed into a standard representative language, the Interlingua. In other words, the SL part programming, or the input module (to a lesser importance also the output module), is under an unified programming environment, independent of any other NLs. This means that the programming of the input module is an affair of its own language. Even better, a standardized programming framework can be presented in Part III for any NL. Hence, if a new NL L is to be included in the interlingua MT system, the developers (programmers, linguists, lexicographers, etc.) could concentrate on L alone without much knowledge of other NLs—a great advantage. This language independence is built on the foundation of Interlingua, the IL and IG, which are presented below.

With the above background in mind, the embodiment designs the Interlingua by closely mimicking the NL development. Thus the concrete nouns are designed first, then the prototypical group of adjectives is designed, followed by the prototypical sentences (clauses) to introduce the verbs, where property clause is designed first, then the relation clause, the dynamic clause, and so on, as presented in the following. Note that, linguistics is a discipline with voluminous references, and references about NL grammars are everywhere. Therefore the following presentation concentrates on teaching how the embodiment is to be implemented by one skilled in the art of linguistics and programming.

1 General Lexicon of the Interlingua Lexicon

Referring to FIG. 3 to FIG. 5 of the first embodiment, for the GL of the IL, words are represented by classification codes. The important thing is, the codes should not be arbitrary like serial number. It should be able to correspond to meanings, so that different NLs can have a meaningful common ground. It should allow the language workers who are working to build the matching electronic lexicon of a particular NL to be able to do their job easily, correctly, and intuitively without much linguistic study which needs to be done only once in Interlingua. It should also allow programmers to concentrate on program logic, not on language detail which is left for linguists. Therefore, correct classification methods are the key to the success of the IM. In the present embodiment, different POS words have different classification methods, especially for the three main types of content words: noun, adjective, and verb. They are introduced below for each type of words. Additionally, to deal with the all pervasive 'family resemblance' phenomenon as stated in the fourth source of ambiguity, the embodiment uses a 'synonymy code' which relates similar words by their feature/parameter sets and exists principally in the lexicon of each individual NL, as explained in each type of words below.

1.1 Feature/Parameter Set

Feature/parameter set is another major tool, besides classification code, of the embodiment. One of its use is to handle the language-specific 'family resemblance' phenomenon as mentioned in [1005] above. Another use is to handle the uneven variations to the main classification. For example, in the classification of adjectives, some adjectives form polar pairs, some form opposite pair plus occasionally a neutral one, some form graded sets, etc. Therefore, a feature set {polar, opposite, grade, ... } is a better way to handle the case. The third use is to handle the 'cross-classification' case: it is the case that a group of items can be classified in several ways which are equally effective, say, A way is {A1, A2, A3}, B way is {B1, B2}, C way is {C1, C2, C3, C4}, then use the feature set {A, B, C} to classify them, called feature classification in the embodiment—a such case is in the syntactic level classification of the two-argument dynamic clause/verb (see [1209]). A special importance of feature/parameter set is that feature/parameters can be weighted—an important tool to handle ambiguity: Ambiguity means multiple possibilities, hence multiple choices; if the possibilities can be weighted, then the top choice is the one with highest weight.

Most times, feature/parameter set may take non-numerical values. The name 'feature' is preferred for non-numerical values and 'parameter' for numerical values. Since feature is more common in NLs, hence in the following presentation the mention of parameter is omitted. The non-numerical value often takes the logic values of yes and no, or positive and negative, or marked and unmarked, and sometimes plus an additional neutral value. For each value, it can have a weight showing its frequency of occurrence or degree in collocation, etc. The weight can be determined, among other methods, by statistics on corpus of each NL. Therefore, a feature set of multiple features is generally represented by a vector data form such as:

feature f = {feature1{[value1,weight],[value2,weight],...};
feature2{[value1,weight],[value2,weight],...}; ...}.

1.2 Concrete Noun

WHOLE Group and PART Group of Concrete Nouns. This subsection generally refers to FIGS. 3A and 4A. In the natural order of NL development, the first group of GL content words designed is individual concrete nouns denoting physical objects. These nouns do not have to be defined since their meanings are the denoted objects. According to the reason stated in the fourth cause of ambiguity (vagueness, see [1005]), the denoted objects are prototypical ones. Hence the adjective 'prototypical' is often added to remind this fact in the following. These nouns are divided in two subgroups. One is the WHOLE group consisting of nouns naming objects which can exist freely and independently, so they are classified by taxonomy and represented in the GL by taxonomy codes. The other one is the PART group consisting of nouns naming parts of objects, so they are classified by meronomy and each such word is represented in the GL by a meronomy code plus its associated WHOLE's taxonomy code. 'Part' is in a broad sense, the key requirement is that 'part' cannot exist freely and independently. FIG. 4A does not show the meronomy part of classification, since it is straight-forward.

Tree Structure. Taxonomy and meronomy codes form tree-like structure, so they are sometimes called taxonomy tree and meronomy tree, or simply tree. And each code position is called a node. The terminal nodes are also called leaf nodes. Note that in FIG. 4A, as in other tree figures, only a few sample leaf nodes are listed and shown in single quotation. Note also that the nodes and the sample leaf 'words' are labeled in English for this presentation only. In GL, they are all in interlingua codes.

Meronomy trees grow 'inside' the nodes of taxonomy tree. Using the concept of inheritance of the OOP programming, a meronomy tree inside a Living thing's taxonomy node is inherited by the latter's hyponymy nodes. Hence those hyponymy nodes do not have to list the whole meronomy tree of its immediate hypernomy node, only lists those nodes which need to be renamed in a particular NL and those nodes which are on additional branches. This can make the meronomy trees of living things more logic and compact. In the taxonomy tree, the man-made objects, especially manufactured objects, form a very large and abundant structure. This is natural since the world becomes interesting because man makes so many objects. Therefore, the man-made-object part of the classification tree shown in FIG. 4A, the tree at the node NAABB, can be designed by referencing the Industry-Commerce Classification Code, or even the Bar code system. The nodes shown here just give a rough idea.

Furthermore, meronomy classification in the PART group carries a POSSESSION relation. These relations are fundamental ones in nature and in semantics of NLs. Hence the classification method in the present embodiment not only provides a classification code, but also builds into Interlingua a rudimentary semantic foundation.

Exceptions on the PART-WHOLE Division. For purpose of the embodiment, classification is a method to achieve the goal of a common representation for NLs. Hence it needs not to be rigorous. That is, exception is allowed since NLs all do this. The way to handle exception is by cross-reference and multiple listing. Note that multiple listing is not multiple use. Regarding the PART-WHOLE classification, the first such case is in the WHOLE group, where some free and independent objects can also serve as parts of other objects. For example, paper is a tool for writing letter or wrapping things, but is also used as a part of books. The second case is that not all objects in the WHOLE group are free and independent in the pure sense. In fact, only nouns in the leaf node of the WHOLE tree denote truly WHOLE objects. Nouns in the various levels of hypernym nodes above leaf nodes are actually category nouns, hence their meanings are more general; and when one of them is used to denote a WHOLE object, the denotation points to any object in all its hyponym nodes. That is, for example, 'tree' is a category noun, and the 'tree' in the sentence "I saw a bird on the tree" could be used to denote any species of trees, unless the writer (speaker) wants to identify a particular tree or a particular kind of tree. A third case is in the PART group, where parts of some objects have individual usage and exist accordingly, such as fruits, making them in the WHOLE group. Note that a word may be listed multiply, but its code is the same in its prototypical assignment.

When classification of nouns in the PART group, even in the WHOLE group, gets more and more detail, their use become less general and more professional. For the sake of efficiency, the Interlingua lexicon (IL) is organized into a general lexicon (GL) and various secondary lexicons in each professional discipline or specialized area (see FIG. 1). Multiple listing and cross-reference are used for nouns appeared in multiple lexicons. Some individual concrete nouns are treated separately for special semantic meaning and also for programming convenience, such as, referring to FIG. 4A, 'material or substance nouns' (node NAABAD), 'secreta and excreta' (node NAABAE), 'nouns denoting objects with temporary existence' (node NAABAD), such as 'footprint', etc. Note that proper nouns, such as people's name, geographical name or breed name, etc. are not concrete nouns, contrary to usual thinking (see subsection 1.4.2).

Collective Noun. This paragraph refers to FIG. 3A, node NAB. Besides individual concrete nouns there are also collective nouns which are defined as sets naturally. There are basically two kinds: one with members of same category, another with members of mixed category. Although sets can be formed arbitrarily, humans make them frugally and sparsely. Furthermore, majority of them are shared across languages. Hence, for same category ones, GL lists them under their corresponding classification node plus a 'collective' marking For mixed category ones which are not readily classified under NAA branch, they are listed under the node NAB 'other collective concrete noun of mixed category', but efforts are made in GL to list collective nouns under NAA branch as much as possible. Hence the node NAB serves as a last resort node to catch those language-specific collective nouns. Care should be taken to differentiate nouns as denoting collective, taxonomic or plural, since their differences or boundaries are sometimes vague. For example, the English word 'furniture' can be a collective noun or a category noun, depending on the organization of the taxonomy tree.

Derived Word and Virtual Node. This paragraph refers to FIGS. 3A and 4A, nodes NAC to NAE. Some groups of concrete nouns normally are not designed in GL. These are nouns denoting objects specified linguistically, i.e., they are derived from existing words. For example, a 'killer' is someone who kills other people, a 'beauty1' (the numerical subscript means the word has multiple senses across category; for 'beauty2', see [1511].) is someone/something which is beautiful, 'the rich' is someone who is rich, etc. They are derived from verbs and adjectives respectively, hence they are called VERB-NOUN (CONCRETE) and ADJECTIVE-NOUN (CONCRETE) respectively in the embodiment—an example of recursive word derivation (see subsection 6.2 for more). Later another group of such recursive derived concrete noun is introduced when the ATTACHED-PROPERTY-NOUN (CONCRETE) is presented (see [1148]). Since many of them can be formed by affixation or other linguistic methods in a NL, their representations in the GL, when IE is running, are the classification codes of their original stem words, with features as their derivation purposes. For use by IE, there is a virtual node in the GL reserved for each kind of derived words, i.e. a virtual node for VERB-NOUN (CONCRETE) (node NAC), a virtual node for ADJECTIVE-NOUN (CONCRETE)(node NAD), etc. Some of these nouns are commonly used in a particular language and hence listed in that language's lexicon, especially if their derivations are irregular.

In translation, the virtual node works like this: if a word w in a source language SL has a classification code which indicates it matches to a virtual node in GL, or if w is a derived word in SL, then in translating w into a target language TL, the code of the stem word of w is first used to check to see whether there is a corresponding word w' in the lexicon of TL. If not, then the derivation procedure in TL is invoked to derive w' from the matching stem word in TL. The derivation procedure is language-specific, such as affixation. For other virtual nodes in GL introduced later, they all work in this way. Note that the virtual node is a mechanism adopted in the embodiment to handle the derived words. There can be other mechanisms or procedures to achieve the same purpose.

1.3 Synonymous Noun

Synonym. There are nouns, in the lexicon of each individual NL, denoting the same object, such as colloquial or slang nouns, so they share the same taxonomy code (or plus the same meronomy code if in the PART group). And 'colloquial', 'slang', etc. are examples of their differentiating features. They are true synonyms. There are also nouns denoting similar objects, i.e., objects of family-resemblance. For example, in English, the nouns 'cup' and 'mug' are similar, but other NLs may not have the same corresponding similar nouns. For the family-resemblant nouns, efforts are made in the GL to group the similar nouns under a hypernym node which may or may not have an existing noun to name it in some NLs—then it is called a phrasal node in that NL—i.e. a description phrase is served as a label. For example, 'drinking utensil' could be used to label the hypernym node of 'cup' and 'mug' (and glass, etc.) in English, and this applies to other NLs, then only the node 'drinking utensil' (or a more generally defined node, see [1135]) exists in GL of IL. These nouns all use the code of the hypernym's node as their codes. They are also called synonyms in the embodiment. This kind of synonyms (not only for noun words) is very popular and widespread in NLs, so that there are special dictionaries for them, sometimes called thesaurus. To distinguish these synonymous nouns, their differentiating features are used. Therefore, in the embodiment, synonymous nouns of a specific NL have an additional classification code, called synonymy code, which refers to the feature set.

Synonymy code, with its feature set, is a very important tool in the embodiment so as to deal with the pervasive ambiguities. For true synonyms, the synonymy feature and value are language-specific. In converting such a word into GL code, its synonymy features and values are carried over. When later translated into another NL, these synonymy features are consulted to help the translation: for example, if there is no corresponding word of the same feature in TL, the synonymy feature and its value still can be used in later semantic analysis or rhetoric composing, etc. One example is the gender feature in French words. In translating into English words, if there is a corresponding gender feature, such as 'goose/geese', it is translated accordingly. If there is not, then the gender feature, like in French abstract nouns, either ignored or a female/masculine adjective is added.

For the family-resemblant synonyms, the synonymy codes are fixed and used for all NLs in the system. In other words, these synonyms and their synonymy codes are carefully chosen to improve the design of the GL, so as to make it more logic, more compact and more semantic-rich. For example, every animal has a gender feature. When denoting animal names, some NL takes account of gender, some not; and in the same NL, some animal's name takes account of gender, some not. And some NL takes account of gender by using different words, such as 'mare' for female horse in English, or using affix, such as '-ess' indicating feminine feature in English, or using modifier (adjective), such as in Chinese. But for the GL of IL, gender is only indicated in the feature codes of animal words. Similarly, every animal has an age feature which also reflects in different NLs and in different forms. And so on.

It can be said that the more a type of objects is close to human's daily life, the finer its classifications could be and the more its synonymous nouns exist. The famous example is the 18 different names for snow in the Eskimo language. The problem is how to handle this in the GL. Since every object has various properties, properties become an object's basic features, and the embodiment collects properties into an universal COMMON SENSE database (see in Part II 'Interlingua MT System'). Therefore, for those objects with properties in the COMMON SENSE database, the GL only list the general (prototypical) name and let individual NL's lexicon list the featured names.

Synonymy is just an opposite view of prototype. NLs are developed by popular acceptance, not by scientific design. By the fourth cause of ambiguity (vagueness), words are developed as prototypical points in the word continuum. But this prototypical selection is not scientifically precise, hence alternative selections are made. Or viewed in another angle, in the early days, life is simple, the prototypical selected words are enough for daily expression use. When society grew and/or different communities merged or interacted, more words became available. In short, in NLs, due to scarcity of symbols, prototypical words are made; and due to arbitrariness of selection, synonymous words are developed. However, in GL, words (tree nodes) are designed as systematic as possible, one method is the tree-like classification, and another is scientific definition to the nodes. For example, 'cup', 'mug', and the likes are defined under a node labeled as 'a liquid container with opening at the top, its size fits in a human's hand, and used for drinking, etc.' with weighted features such as fl={shape: circular column 9, tapered circular column 9, etc.; material make: ceramic 9, porcelain 8, glass 8, etc.; handle: yes 8, no 5; ... etc.}. In this way, there needs only one node in GL and all this kind of objects in a particular NL have the same code with different value of fl.

To sum up, for groups of synonymous nouns in a particular NL, the GL designs their nodes as general and systematical as possible, which should be a common representation for all NLs, and let the lexicon of the NL concerned list those synonymous nouns with their synonymy feature values. Besides true synonyms, the embodiment takes the definition of synonymy broadly to include the phenomenon of family resemblance as much as possible so as to make the classification tree of the IL compact, scientific, and systematic as much as possible. In this way, each node in the GL of IL is a code with a description, in Interlingua code. For the purpose of this presentation, the code is rendered in alphabets and the description is in English, usually simplified as a typical English word.

There is a compromise to be made for how far a family resemblance tree system should go. For example, CONTAINER is a very broad concept—a very large set of man-made objects can be classified under a CONTAINER node, including the above mentioned objects 'cup' and 'mug'. Then it would be ideal to have three branches under the node, as container for gas, for liquid, and for solid respectively. But these three branches are not mutually exclusive, since gas container can be used for liquid and solid, and liquid container can be used for solid. So instead, the embodiment uses a supplementary Semantic Code Groups (see next paragraph) to build the inherent semantic information into the classification tree. In short, to build the semantic information of family resemblance into the concrete noun tree directly or to use a supplementary semantic tree is a choice or a compromise to be judged and decided case by case and coordinated with the IE programmers, but this needs only be done once in the GL and then served for all NLs.

Semantic Code Group. This paragraph will be used in Part III, Interlingua Engine (IE). Besides the classification codes which are used to match nouns between NLs, the embodiment further designs various supplementary code groups, mainly used in the IE in order to help the IE's semantic processing, so as to encode more semantic information into the concrete nouns—call them Semantic Code Group (SCG), they are generally stored in a SCG database (see subsection 9.3 for more). Note that SCGs are not part of the GL. The most important kind of such code groups is the Collocation Code Group (Collocation is an important semantic subject which is presented in later sections). Another kind of such code groups is the Association Code Group. For example, all the clothing nouns (hat, glove, shoe, garment, trouser, hosiery, etc.), jewelry nouns, etc. are associated with humans who are tailor, jeweler, shoe smith, etc. Another such association is with various places, such as factory with factory head, worker, foreman, engineer, manager, raw material, equipment, etc.; and school with student, teacher, class, class room, library, etc. Note that Association Code Group in essence can be viewed as a kind of PART-WHOLE relation—a broad-sense membership relation. A further kind of important SCG is the Tool Code Group which warrants its own supplementary classification tree where each node is additionally weighted according to its degree of closeness to the Tool concept (see [1936]).

1.4 Adjective, Property Noun, and Abstract Noun

This subsection generally refers to FIGS. 3B, 4B, and 4C.

1.4.1 Object-Property-Adjective Triad

Before proceeding to design other noun words, the next group of words to be designed in the natural order are adjectives. Adjectives are originally used in the NLs to describe properties of concrete objects, sometimes called attributes, such as "The box is small/large" (describing the property of size) and "The rope is short/long" (describing the property of length), these are prototypical adjectives. Hence there are three elements in the use of adjectives: the object, the property and the adjective. The object is the possessor of the property. The adjective is the value of the property. Since a property can have many adjectives as its values, it can be seen that the property is then just the name of this group of adjectives. Therefore, adjectives and properties are designed together with the associated objects as a triad in the GL according to the embodiment—the object-property-adjective triad classification. Because of this triad relationship, the terms, property, adjective and property value, are loosely used interchangeably in the following. Further, the classifications of property and adjective are in correspondence and hence the later is often not indicated separately in the following. The set of adjectives under a property is similar to a set of synonyms, but more broadly defined to include those of opposite ones (antonyms, polar pairs, etc.). Hence some of them are differentiated by features of degree, grade, polarity, etc.

Property nouns are collectively called abstract noun—the first type of abstract nouns. Note that, in a particular NL, the same property word can belong to objects of different categories and the same adjective word can be values of different properties—all are cases of multiple use of the same word. Fortunately, the former situation is not as elusive as the later one. So in the GL, in which such multiple use is un-necessary and avoided, a group of adjectives, as values of a particular property, are designed by associating them with that property, and then properties are designed by associating them with objects. This means that classification of adjectives is not done by themselves but through the classification of their properties first, and the classification of properties is closely associated with the classification of objects. Therefore FIG. 4B, node NBBA, showing properties with some sample adjectives in single quotation, is a rough mirror image of FIG. 4A, with the exception of human's properties (node NBBAC) which is shown in FIG. 5A in expanded form (see subsection 1.5). In this way, the hierarchy of objects is passed on to properties and then to adjectives.

Note that the classification of objects in this triad is very general and coarse, mostly are higher level concrete nouns (see FIG. 4B, node NBBA), except for human. Also it is to remind again that, since the presentation here is in English, all the nodes, labels, and sample words in GL are 'represented back' in English. Hence care should be taken to make the distinguish. For example, the property 'taste', in English, has its prototype as the feeling for food or drink (see FIG. 4B, node NBBAABB). However it should be subscripted as 'taste1' for this English prototypical sense, since it also has an extended sense 'taste2', in English, as feeling for particular object such as clothes, and a metaphorical sense 'taste3', again in English, as feeling for particular abstract thing such as life. If the presentation is in Chinese, then 'taste1', 'taste2', and 'taste3' have different Chinese words.

1.4.2 Intrinsic Property

Referring to FIG. 4B, node NBB, there are generally two kinds of properties for a concrete object: intrinsic properties and attached properties. Intrinsic properties are intimately associated with a concrete object. Hence, in general, value of intrinsic property can be used as predicate and as modifier. Properties are also either measurable or un-measurable. 'Measure' here means that some measuring standards can be agreed on and they are mostly relative. Un-measurable ones generally contain some elements of human's propensity and hence their values are somewhat subjective, such as 'beautiful'.

Intrinsic properties are the most fundamental ones and they and their values are almost universal and across languages, hence they are sometimes called attributes or attributive adjectives. Intrinsic properties and their values for human are most numerous, complex, and involved. FIG. 5A gives a rough idea of such human property words—they are modeled after classification in Chinese (see subsection 1.5 for more). But note that FIGS. 4B and 5A are for the purpose of presentation only, the actual classification trees are in the form of object-property-adjective triad. Sometimes to emphasize this fact in the figures, specific class of objects is indicated in square bracket and put in front of the property, such as '[solid]shape1' at node NBBAAAC. Note also that the sample words are mostly values, i.e. adjectives, not property nouns, showing the triad character.

1.4.3 Attached Property

Referring to FIG. 4B, node NBBB, attached properties are ones created and associated by human activity, hence they are like attached labels, such as a person's name, nationality, profession, or title; a dog's breed; a door's material-make (steer door); or a house's style ('Tudor' house); etc. Since they act like labels, their values are not used predicatively (i.e. they are not used to describe), instead used as modifiers. If they are to be used to describe, some linguistic methods are used, such as using an adjective phrase to describe the property of make, as in "The door is made of steel" or "The door is of steel type"; or with suffix such as '-made' to form combined adjective word, e.g. 'steel-made'. The values of attached property are mostly borrowed directly from concrete noun, like 'steel' in 'steel door'. But this process is language specific and uneven. For example, 'wood door' is also written 'wooden door' in English. Hence, like ADJECTIVE-NOUN (CONCRETE) and VERB-NOUN (CONCRETE) in [1128], there are also NOUN-ADJECTIVE and VERB-ADJECTIVE (some are called participles in English; others are derived ones, also see subsection 6.2), and they are likewise not designed in GL, but virtual nodes are assigned for them (nodes AD and AE respectively, see FIG. 3C). Also in individual NL, if they have specific words, such as 'wooden' and 'naval' in English, they are listed in the lexicon of that particular NL.

FIG. 5B shows expanded classification of human's attached properties. Like FIG. 5A of human's intrinsic property, human's attached properties are also very numerous, but not so complex and involved. However some of them are quite language-specific as shown in node NBBBCAB (relative name), or cultural-specific as shown in node NBBBCAE (folk name).

In [1128], it is mentioned that a group of concrete nouns is derived from property nouns. These are the attached property nouns as abstract nouns. Since they function like attached labels, the labeled objects become denoted and over times humans want to shorten the naming. Hence an 'American person' becomes an 'American', or a person of nurse profession becomes a 'nurse', etc. This process is also uneven and language specific. For GL, no such concrete nouns are designed, but instead they are associated with the virtual node of ATTACHED-PROPERTY-NOUN (CONCRETE) (see FIG. 3A, node NAE), and they themselves form a very large set and warrant their separate classification (see FIG. 4E, node NBBBCA). Note that the two nodes NBBB and NAE are in correspondence and with the same English name, so the later has a '(CONCRETE)' subscript.

For example, there are hundreds of nouns for relative names in Chinese—their classification is made in Chinese lexicon and then featurized into synonymy code. Another example is the names for various professions and titles and positions—these classifications even can be made in the GL of IL since they are becoming universal with some feature differences. All these nouns are of property origin and hence listed under abstract nouns linked with the virtual node ATTACHED-PROPERTY-NOUN (CONCRETE) under concrete nouns in GL (see FIG. 4A, node NAE). Note also that they are not collective nouns either, contrary to the thinking in traditional grammars.

1.5 Human Property Noun and Property Value

This subsection generally refers to FIGS. 4B and 5A to 5C. The classification of human's property noun (and value) (see FIGS. 4B and 5A, node NBBAC) summarizes the various idiosyncratic features of object-property-adjective classification well. Since property noun reflects human's point of view on the objects of the world, hence human's property noun (and value) reflects human's point of view on humans—on oneself or others or humans in general. The properties of 'humans in general' are partly inherited from the properties of concrete objects in general (see FIG. 4B, node NBBAA) and properties of living things in general (see FIG. 4B, node NBBAB), hence most not shown in FIG. 5A.

The properties reflecting 'human's point of view on oneself or others' are obviously different from those non-human property nouns (except a few applicable to animals). They are divided into two groups. The first one refers to those intrinsic human properties that humans want to describe in a more detail, more intimate manner—they are listed under the node labeled (human's) 'direct property' (see FIG. 5A, node NBBACA). Under this node, there are four sub-nodes. The first one (node NBBACAA) is an expansion of concrete noun properties—but they are more subjective. The remaining three sub-nodes are specific to humans. The second one (node NBBACAB) and the third one (node NBBACAC) can be extended to animals, but the fourth one (node NBBACAD) can only be applied to human.

The classification shown in FIG. 5A is modeled after Chinese that has a large amount of property noun words for human. In contrast, in English, there are relatively small amounts of property noun words for human, but a relatively large amount of adjective words. FIG. 5C reflects the later fact, where the property at the node of 'human personality and behavior' is further grouped into 16 synonymy groups, with a total of near 4000 adjectives as property values (for a complete list of the adjectives, see Stephen Glazier, "Random House Word Menu", Chapter 22, Random House, New York, 1992). Note that the groups are labeled by English adjectives, not nouns, showing the lack of suitable English property nouns. Also, the adjective lists are considered as group of synonyms and so featurized in the English GL. Because of the quantity of words and the language-specific character of property-adjective cross-classification, the classification shown in FIG. 5A gives only a rough picture.

The second group of human property, the (human's) 'indirect property' (see FIG. 5A, node NBBACB), refers to the properties associated with human's activity, i.e. to describe the human properties when human interacts with other objects (mostly humans) of the world. These properties tend to have time frames. They are further divided in two groups. The first group has an indefinite time frame, mostly a long one. The second has a short time frame, principally associated with events, hence can be called a 'dynamic property' (see [1514] for more)—they are closely associated with verb-nouns.

1.6 Derived Word from Adjective and Related Virtual Node

It is stated in [1141] that "the property is then just the name of [this] group of adjectives", the implication is that the existence of adjectives precedes their naming (the property noun). This is a general phenomena in NLs. In fact, many common adjectives do not have a specific 'group name', their name is improvised with the nominalization of one of their members, usually the prominent one. For example, in English, the property of long/short is called 'length', high/low is 'height', wide/narrow is 'width', and so on; a parallel case exists in Chinese that even has an alternative method of naming, i.e. use the combined word such as '[CHANGDUAN]'—literally 'long-short'. This is a kind of derived words, called ADJECTIVE-NOUN (ABSTRACT). However, not like derived words before (see [1128]), they are bona fide property nouns and so have nodes in GL, but the virtual node ADJECTIVE-NOUN (ABSTRACT) is still preserved for the boundary cases. Later on, another kind of such derived words, called ADJECTIVE-NOUN (SPECIFIC), is presented, which is assigned virtual node and not listed in GL (see [1541]). It is therefore not surprising that some groups of adjectives even do not have a property name, such as the prominent fit-all adjective pair 'good/bad', or they can be associated with many kinds of objects, and hence their property names are vague, especially for adjectives related to humans or influenced by human propensity.

Like some adjectives which do not have a property name, some properties also do not have values (adjectives). This does not contradict the above statement that "the existence of adjectives precedes their naming", since for these kinds of properties there is no suitable adjective to be found in the first place (except for the fit-all adjectives). Or, in another perspective, these properties came along not by direct observation like physical properties but by human's cognition, such as English words 'morality', 'stamina', etc. Hence they occur mostly in human's properties (see FIGS. 5A and 5C). Since properties belong to objects, another way to describe an object with a property, especially for no-value properties, is to use the possession expression HAVE, such as "He has courage".

1.7 Ontological noun, property, and adjective

This subsection refers to FIG. 3A. The last groups of nouns designed under the root noun node and their corresponding properties (and adjectives) to be designed are the ontological ones, see FIG. 3A, node NC. These groups of nouns have two main categories, the SPACE noun (node NCA) and TIME noun (node NCB). Note that the TIME noun and the direction noun (node NCAA) of the SPACE noun are commonly treated as abstract noun which the embodiment classifies instead as ontological noun. However, the location noun (node NCAB) of the space noun, especially the specific location noun, is generally considered as concrete and they are cross-referenced to landscape (node NAABAB) and building and construction (node NAABBC) under concrete noun node. Likewise, the ontological nouns in general (node NCC) are listed separately for their philosophical significance and some are cross-referenced to node NAABAA.

The ontological property noun (node NCD) is listed not under property noun node NBB but under the ontological noun node NC for conceptual consistency. Many have no property names and hence they are listed as adjective groups, such as 'empty/full' and 'real/virtual'. Some ontological properties may be interesting, such as 'vacuum', and some may be confused with event properties (see [1532]), but these are beyond the presentation as the subject of ontology. The important thing is, the GL of IL is designed to contain as much semantic information as possible. This is done only once in IL and then shared by all NLs in the Interlingua system. If later there are changes in classification, perception, or philosophy, it needs to be made in IL only.

2 Interlingua Grammar

This section generally refers to FIG. 3C.

2.0 Clause and Argument

Clause. After most nouns and adjectives are designed for the GL of IL, the next class of words to be designed, in the natural order, are verbs which are used to make expressions. In other words, a verb denotes an expression. Hence to design verbs it is necessary to first design sentences representing expressions, i.e. to design the Interlingua Grammar (IG). The word 'grammar' in the presentation refers to the composition of sentence—a central ingredient in IG. The other subject matters normally presented in traditional grammar or linguistics, such as phonology, morphology, lexicology, etc., are generally subjects of individual NL—called NL grammar here. Following the natural way of language development, sentence here initially refers to simple sentence, or called atomic sentence or clause, i.e. the basic unit of expression, then later to be expanded as language builds up. In the following, 'clause' is used to refer to simple sentence.

Clause Structure or Composition. Since, as mentioned, a verb denotes an expression, and clause is the basic unit of expression, it is then evident that a clause comprises one verb word and its participants (called arguments) generally designated by noun words. In NL grammar, the relative position of these words in a clause structure is an integral part of the structure rules—called syntactic rules or syntax. In IG, no structure is needed, hence these rules are replaced by specific designations to these words, and syntax plays a supplementary or feature role in IG. And factors of TIME, SPACE (see [1203] below), and ADVERB (see section 4.1) are also treated as features of clause in the embodiment. Thus, clause structure in NL grammar becomes clause composition in IG grammar. Lastly, some words such as pronouns, although prominent in the NL grammar, also play a supplementary role in IG and hence omitted in the presentation.

TIME and SPACE Features. Clause has many closely associated factors, such as the omnipresent TIME and SPACE factors, which manifest themselves in different ways in different NLs. SPACE factor is three dimensional and arbitrary, hence its association with verb takes many forms and is language-specific. TIME factor is one dimensional but 'continuously moving', hence its association with verb has similarity with, and borrows terms from, SPACE factor (in one dimension) but is more intimately bonded with verb in tense and aspect because of the 'continuously moving' character—their exact forms are also very language-specific. Therefore, the embodiment designs the verb's TIME and SPACE factors by association with the verb—more precisely with the clause—a TIME feature set and a SPACE feature set. In other words, all factors associated with TIME and SPACE are classified and coded, and then grouped into these two sets respectively. Note that the TIME feature includes tense and aspect—the two important sentence features of all NLs. As such, these two feature sets are very rich in elements and structure, especially TIME.

Prototypical Clause and C/V Classification. As mentioned, a clause comprises a verb word and its arguments generally designated by noun words. In NLs, for a particular verb, different clauses can be formed in many ways: with different participants; with different TIME, SPACE, and ADVERB features; with different structures; and all different combinations of the above three. The embodiment treats this family of clauses as a family of resemblant clauses around a common verb. As such, one of them (usually the simplest one) is selected as its prototypical clause and the rest are treated as variational clauses. The selected prototypical clause in the embodiment is 'the declarative clause in active voice with TIME, SPACE, and ADVERB feature sets collected separately'. Thereby, the embodiment designs the classification of verb as the same classification of its prototypical clause. In other words, a verb and its prototypical clause, hence its family of resemblant clauses, share the same classification code—called clause/verb classification code (abbreviated as C/V code) in the embodiment, with the variational clauses differentiated by feature codes, called CL-STR feature, to be presented later (mainly see section 9). To summarize, since Interlingua is a computer representation, the verb word in IL is represented by the C/V code which also represents a family of clauses in IG, in which any one member clause has the general data type:

```
clause = {C/V code;
    argument[i]={noun, case marker, weight}; //i is not limited by 2.
    TIME feature, SPACE feature, ADVERB feature;
    CL-STR feature; //for variational clause
    ...; //other particular data}
```

Argument. In almost all NLs, it can be said that those clause participants without separate case markers (mostly prepositions; marker in general is further and formally presented in [1982]) are called arguments in the related clause, and this is also the definition of arguments in the grammars of NLs by the embodiment. But in IG of the embodiment, all participants have case markers, i.e. case designations, and they are weighted according to their degree of prominence in the family of clauses expressed by the same verb. Because of the linearity constraint for NL5 (see [1002]), a clause in NLs can have only up to two arguments, i.e., two participants without case markers (with three arguments as special case, for example, dative clause). If more arguments are needed in the expression, two ways are used in NLs. One is to use case markers, such as preposition in English, to introduce them. The other is to use additional clauses, dependent or independent. The above fact is automatically taken into consideration in IG by case designations on all participants, so they can all be called argument in IG grammar in the embodiment. But for the purpose of the embodiment, the arguments with case markers in NL are called supplementary arguments in IG.

The S and O Arguments. Since arguments in NL grammars are generally limited by two, the two-argument clause is naturally most interesting. Traditionally, the two arguments in the two-argument clause are called subject and object, but in the embodiment they are simply labeled as S and O. Note that, in IG of the embodiment, the clause refers to prototypical clause and the S and O arguments refer to prototypical arguments of the prototypical clause, while in NL grammars no such distinguish is indicated, thereby becoming a major cause for the confusion, hence the failure, of computer processing. For one-argument clause, only one label is needed and it is generally labeled as S in the embodiment. There are six linear combinations of positions of S, O, and V (the verb) in the prototypical two-argument clause structure in NLs: SOV, SVO, VSO, OSV, OVS, and VOS. Also because of the linearity constraint, any particular NL can take only one of them as its over-all two-argument clause structure, which is then called that NL's {V,S,O} type. Hence, when programming a NL's input and output modules, the first thing is to record its {V,S,O} type—a structure type per {V,S,O} position. That is to say, for example, in this presentation, all examples are in English which is a type SVO language, hence a prototypical two-argument clause is in the form S+V+O in English (the +sign indicates to write in sequence); in other words, S labels the argument positioned before V, and O labels the argument positioned after V. Similarly for other types of language, such as SOV type takes the prototypical form S+O+V. But in IG, linearity is no longer a bondage, hence no {V,S,O} type is needed and only the labeling is needed to differentiate the two arguments, in fact all arguments, in a clause—all clauses in a family, i.e. not limited to the prototypical one.

The S Arguments. The significance of the S argument manifests in dynamic clauses. A clause expresses about world affairs which can be broadly classifies as static or dynamic. A dynamic clause means there is time change or force involved, or both. Also S is the initiator, called agent in linguistics, of the dynamic affair. NLs invariably recognize human, animal, and natural force (such as wind, gravitation, etc) as qualified to be the initiator of some dynamic affairs and assign them the role of S argument accordingly. The embodiment also includes entity with human participation (called human organization in the following), object having mechanical force or power, and object of human character in imagination or personification as qualified to be S argument in some particular dynamic affairs.

There is a well established case grammar in linguistic theory that studies the case designation to arguments. However, there are several differences between the case defined in the embodiment and the case grammar. First, the case designation in the embodiment is always referenced to the prototypical dynamic clause, especially prototypical two-argument dynamic clause. Also, case in static clause is not significant. Second, although the S argument of dynamic clause in the embodiment is assigned the agent case as in case grammar, because of the prototypicality, this assignment is fixed—this will be clear when semantic analysis is presented later (see section 9.4); and the 0 argument is generally not assigned case, instead it is associated with the verb by collocation—a subject to be presented later (see [1702]). Third, since TIME and SPACE factors are treated as features, they are excluded in the case consideration, hence the embodiment can simplify other arguments, which are normally introduced or marked by prepositions, as a T argument for 'Tool/Material/Method/Manner', a C argument for 'Co-participant', and an Other argument to catch the other cases. Fourth, the case assignments therefore correspond to argument designations in broad sense, such as T argument for 'Tool/Material/Method/Manner', which further means T can be divided into four sub-categories. Fifth, by limiting argument types (designations) to S, O, T, C and Other, thereby limiting case assignments also, the embodiment avoids the controversy about the number of cases in case grammar. More importantly, it simplifies computer processing of clause structure in NLs. Note also that, the five types of arguments has un-equal status in dynamic clauses, with an order of prominence as S>O>T>C>Other.

With the above elements of clause laid out, FIG. 3C presents the higher levels of CN classification in the embodiment. Note that the first level is classified generally according to static or dynamic type and the second level is then classified generally according to one or two arguments; the other way around, i.e. argument first then type, has equal effect—a cross-classification case (see [1111]). Note also that this is a general classification, there are exceptions in types, arguments, etc. The following presents a detailed description, where clauses and arguments are prototypical ones.

2.1 Property/State Clause

Property Clause. Referring to FIG. 3C/1, node VAA, the property clause is the simplest clause. It expresses an object's property value, i.e. the object is being described, as already mentioned before in [1141], hence in IG it is represented in a simplified prototypical form, i.e. with feature codes omitted, as:

---

Property clause = {C/V code of property-clause,
   noun code = argument = object being expressed on,
   adjective code = property value of the object expressed}.

---

Note that in traditional NL grammar the adjective (property value) is associated with the verb to form predicate part of the clause, this layer of structure is not needed in the embodiment. Also note that in Chinese there is no verb word for the property clause, the argument and the adjective are just placed side by side to form the clause. In English the property verb 'be' is actually borrowed from the relation verb 'be', since there is a fuzzy boundary between a description of an object's property and a judgment on an object's property. Many times a translation of a property clause from English to Chinese falls into this concept trap and incorrectly inserts the Chinese verb [be] into the translated Chinese property clause.

State Clause. Property clause only describes an object's static property. However, an object also has dynamic properties, i.e. it has state, which can also be described, called state clause, see node VAB. TIME factor plays a pivotal role in this kind of clause. A dynamic expression has a starting time and a stopping time, in between is its period of occurrence. A dynamic clause therefore specifies its starting time, stopping time, or a specific time as its TIME feature. If a dynamic clause instead specifies generally other time reference, such as inside or outside the period of occurrence, the expression can have two interpretations, a dynamic one and a stative one. The dynamic one gives the familiar progressive and perfect tenses respectively of the dynamic verb in standard English grammar. However, the stative one interprets the same clause as expressing a state associated with the dynamic verb. This is not explicitly described in standard grammar courses, but is perceived by the hearer/reader when the context calls for the stative interpretation. A state clause is generally represented as:

---

State clause = {C/V code of state-clause,
   noun code = argument = object being expressed on,
   adjective code or VERB-ADJECTIVE code of the state being expressed},

--- where the VERB-ADJECTIVE code denotes the derived adjective from the verb associated with the related dynamic state.

Consider the sentence:

(A) "She is sleeping."

It can be interpreted in two ways. Dynamically, 'She' is in the action of sleeping. Statically, 'She' is in the state of sleeping. Note that the English clause structure (A) gives these two ambiguous readings, while the corresponding Chinese clause structures are distinct. English does have an adjective for the 'property of state' of sleeping: 'asleep', as in "She is asleep" (there is no such corresponding Chinese adjective). This is an exception, since most of the other English one-argument dynamic verbs, such as 'sit', 'smile' and 'run', do not have corresponding adjective words. But it does show that a stative perception exists in people's mind and the concept of the 'property of state' exists in NLs. English generally uses verb's participles, present or past, as state adjectives, but other NLs may use different ways, for example, Chinese generally uses an aspect marker word ' [zhe]'.

Even in adjectives, i.e., property values, there are concepts that are difficult to judge as static or dynamic, such as 'tired' or 'broken'. In "A broken vase lay on the ground", the broken state of the vase may have happened long time ago, it should become a static property, yet English uses a past participle of a dynamic verb to describe the object, i.e., "the vase is broken". Similarly, in "He is tired", it is true that there is a dynamic period for his being tired, but this period is vague and not specified. To the speaker (writer) and the listener (reader), this period is of no concern, only the state of tiredness is of interest. Also note that past participle is used for this expression. In Chinese, there is an adjective for 'broken' and similarly for 'tired', but no corresponding verbs.

There are more variations within and among NLs about state concept, but a thorough linguistic discussion is beyond this presentation. However, IG has to reflect this fact since it has to cover all grammars of the NLs in its system. Hence a state clause is included in the first level classification of clauses. And a virtual node for VERB-ADJECTIVE (participle in English) is assigned in the adjective classification tree of GL (see FIG. 3B, node JE).

There is another issue involving the clause for expressing human's feelings, such as: "I feel cold/happy". Since 'cold/happy' are intrinsic properties, this seems to be a property clause. But 'feeling' is a dynamic state—a physiological or psychological state, making it a state clause. These questions are subjects of linguistic discussion, but the present presentation is not linguistic discussion. The point to be made here is: the present embodiment shows one way. All the other ways are different choices of implementation, some result in simple adjustments of the classification codes and related data such as feature values. The advantage of the embodiment is, all the classifications and the related data are stored in databases, so that if there are adjustments later on, they are done in databases, and the programs in language modules are not affected. Another advantage is, most adjustments are done only once in the interlingua part, and the corresponding databases of the respective NLs will adjust accordingly and automatically.

2.2 Relation Clause

Referring to FIG. 3C/1, node VB, the next kind of expression to be designed is the relation clause which expresses the relation between two arguments. Relation clause is represented in simplified form in IG as:

```
Relation clause = {C/V code of relation-clause,
    noun code1 = argument1,
    noun code2 = argument2}.
```

Further syntactic classification of relation clause first models after the classification of the relation between two objects, such as PART-WHOLE relation, SUPERORDINATE-SUB-ORDINATE relation, LOCATION relation, DIRECTION relation, TIME relation, POSSESSION relation, INCLUSION relation, CONTAINER relation, COMPARISON relation, etc. Second, there are semantic relations, such as CAUSE-EFFECT relation, DEDUCTION relation, CONDITION relation, LISTING relation, JUDGMENT relation, MATHEMATICAL relation, etc.

2.3 Dynamic Clause

This subsection generally refers to FIG. 3C, node VC. The third kind of expression, the dynamic clause, is the most interesting and involved one in linguistics. It is also the thoroughly studied one in linguistics. As such, the following presentation will concentrate on the innovations of the embodiment, omitting linguistic discussion as much as possible.

2.3.1 One-Argument Dynamic Clause

This subsection further refers to FIG. 3C/1, node VCA. The simplified IG representation of one-argument dynamic clause is:

```
one-argument dynamic clause =
    {C/V code of one-argument-dynamic-clause,
    noun code of S,
    [noun code of body-part of S]},
``` where S=object's name. The further high level classifications of node VCA is quite self-evident. Note that under self-action CN node (node VCAC), S must be agentive prototypically, hence S is mostly human or animal.

Note that the movement-of-body-part clause (node VCACC) is different from the body-action clause (node VCACB). The former has a second noun, for example, "He nodded his head approvingly.", which is equivalent to "He nodded approvingly."—a body-action clause. Should it be a two-argument clause? The movement-of-body-part clause relates to the wider PART-WHOLE concept which also relates to the POSSESSION concept—the 'part' is called cognate object in linguistics. The concept is fundamental in NLs, hence the one-argument classification is more intuitive, and putting it side-by-side with body-action clause gives a better perception. Later, after the structure variation of prototypical clause is introduced (see subsection 9.3), most of the movement-of-body-part clauses are considered a structure variation of their corresponding body-action clauses, if exist, and hence absorbed into the latter's classification. Since not all have this kind of dual clauses, and they are language specific—for example, "She sprained her ankle" cannot be absorbed as *"She sprained". Hence the classification of movement-of-body-part clause is retained.

The above movement-of-body-part clause with 'part' as cognate object is actually a subset of a larger class in Chinese and is widely used in daily life. The verb is not limited to movement verb. Most such verbs in Chinese are single character verbs, and the cognate objects are also single character nouns—the two characters have fused together into a fixed two-character word and acts as a one-argument dynamic verb (for a further discussion of two-character words, see [1331]). Although node VCACC of FIG. 3C/1 is labeled as 'movement-of-body-part C/V', it would be better labeled as 'cognate object CN'—this is a linguistic issue and hence beyond the presentation. That is, for IG, a choice is made and applies to all NLs in the MT system. If later on there is a new result from linguistic research, then adjustment is made in IG only and likewise applies to all NLs.

2.3.2 Two-Argument Dynamic Clause

This subsection further refers to FIG. 3C/2, node VCB. The simplified IG representation of two-argument dynamic clause is:

```
Two-argument dynamic clause =
    {C/V code of two-argument-dynamic-clause,
    noun code of S argument,
    noun code of O argument}.
```

The immediate further classification of node VCB is mainly based on O argument, since S argument's qualification is limited, mostly human or human organization, occasionally with animal included. Note that some classifications, especially node VCBC of the communication clause/verb, require O to be 'event' which is presented later (see section 5.1).

Chiefly based on the classification of the O argument, node VCB is further classified into seven sub-nodes, as shown in FIG. 3C/2, node VCB. Node VCBA is operation clause/verb where O is concrete noun. Node VCBB is social clause/verb where both S and O are human, sometimes S and O can be reciprocal. Node VCBC is communication clause/verb where O is event and the clause is generally dative and hence has a dative argument which is human or human organization. Node VCBD is activity clause/verb where O is abstract noun, event or property and the verb is generally packed since an activity involves a complex of forces, such as "He implemented the plan" and "He maintained silence/order/dignity/posture". Node VCBE is sense clause/verb where S is human and animal, O is general noun, concrete or abstract. Node VCBF is mental clause/verb where O is abstract noun. Node VCBG is psyche clause/verb where S is human and animal, O is general noun, concrete or abstract.

3 Feature Classification and Some Semantic Classifications of Clause/Verb

This section still refers to FIG. 3C, in particular FIG. 3C/2, node VCB. Although NLs use verbs to label clauses, this labeling is not systematic and transparent. For example, even the three basic level classifications of property/state CN, relation C/V and dynamic C/V are not clearly differentiated in NLs. This section presents an important part of C/V classification, the feature classifications, so as to further clarify the clause classifications. Most of them are associated with dynamic Clause/Verb, especially the two-argument dynamic Clause/Verb which is the most colorful and involved case in the Clause/Verb system and hence the most studied one in linguistics.

3.1 Forward and Backward Feature

The first feature divides two-argument dynamic clauses into two groups, according to the behavior of the initiator S. If S's behavior causes the state of the 0 argument to be affected, statically or dynamically, this group is called forward clause group, including nodes VCBA to VCBD. The other group is called backward clause group since S's behavior causes its own state being affected, statically or dynamically, and O's state is not affected at all—it includes nodes VCBE to VCBG. (The use of the terminology 'forward/backward' in the embodiment is simply to make a distinction from the traditional 'transitive/intransitive' or 'accusative/non-accusative' terms.) This division is mentioned in the study of linguistics, but not reflected in general grammars. That is, traditionally there is no such division, O is generally called object and the verb is said to be transitive or accusative. However, for the present embodiment to design the IG to be the super-ordinate grammar of all grammars of NLs, this division becomes a logical and natural part of the verb's classification code. Naturally, the verbs used in the two kinds of clauses are called forward verbs and backward verbs respectively in the embodiment. However, since this division generally is not reflected in the syntax, hence it is a feature code. That is, under node VCB, the first four sub-nodes—VCBA, VCBB, VCBC, and VCBD—have forward feature and the remaining three sub-nodes—VCBE, VCBF, and VCBG—have backward feature.

3.2 Action and Cause-Effect Feature

Clues from Chinese Word Formation. Chinese words are basically in two levels—initially in single-character level, then expanded to double-character level (words of more than two characters exist, but have very limited significance yet). This is a logical development since the number of characters is limited—commonly used ones are around several thousands. As society becomes more complex, vocabulary (and language) grows accordingly. Doubling the character increases the availability of symbols to millions. This expansion is a natural process, not a process dictated or planned by some individuals. Two details of this process are important for the present embodiment. First, the single characters carry the essential information for the early humans. For example, for nouns, they are the denotations of the early objects associated with human's living; for adjectives, most are the basic attributive adjectives; and for verbs, they are closely associated with human's daily life and constitute a set of building blocks for the later more complex verb system. This fact has been taken account of in the classifications. Second, the formation of double-characters is not a random combination, but follows some basic rules which have been well studied in Chinese linguistics. From clues of this doubling process, the embodiment further distinguishes the two-argument dynamic clauses, besides the forward and backward division presented above, in two groups, as follows.

Action Clause. The first group is the action clause. That is, S initiates a dynamic state involving O, whether forward or backward, but no indication of the then state of S or O is expressed in the same clause (it may be expressed in the context) explicitly. The further simplified IG representation of this group of clause is:

action clause={C/V code, S, O}.

Cause-effect Clause. The other group is the cause-effect clause. This group is at the heart of the difficulties with sentence structure. If S initiates a dynamic state and involves O, whether forward or backward—the cause part, there bounds to have something to be expressed on either S or O and it is here expressed explicitly in the same clause—the effect part, E. This means that E must be tightly integrated with the cause part, hence the clause, so that no other marker is used to identify E. Let E represent such an expression on S or O, i.e., E is the effect part in a broad sense, then the IG representation of this group of clause is:

cause-effect clause={C/V code, S, O, E}.

Note that the action clause and cause-effect clause division is a clause division, i.e. the same two-argument dynamic verb V (or C/V code) can have three possibilities: it can only form an action clause; it can only form a cause-effect clause (a rare case); or it can form both types of clauses (such as the English verb 'pound'). Hence the three cases are a feature value of V. This feature is a clause feature, not a verb feature, and it is language-specific.

It is important to note that E is itself a clause sharing an argument with S or O which is not repeated and hence omitted. Thus the effect part is a clause fragment and can be represented by its own C/V code—more about E later (see paragraphs below and section 6.1). Note that 'effect' here is in general sense, it is just a name for the E part. That is, E can be any kind of clause fragment sharing an argument with the main clause. Therefore, the traditional linguistic unit, called complement, includes the E expression, but now E gives it a more logical interpretation. More about the complement are presented later (see [1326], [1353], and [1931]). Secondly, although forward verb affects O, its cause-effect clause can have the effect part expressed on either S or O. Therefore, the action/cause-effect division is a clause division only, no corresponding verb division. Thirdly, although backward verb does not affect O, it can still have a cause-effect clause, such as the verb 'consider' in the sentence "I consider Bob to be smart": 'I' initiates an action 'consider' focusing on Bob, and the effect is that 'smart' is expressed on Bob in a property clause (fragment). Note that the effect verb 'to be' can be omitted: "I consider Bob smart", where 'smart' is what called complement in traditional grammar. Also, the effect clause (fragment) can be a relation clause (fragment) in "I consider Bob to be my friend" or "I consider Bob my friend". Fourthly, in most cases the effect part is on O, but there are cases where the effect part is on S, especially in Chinese (see [1325] and [1331]).

One-argument Cause-effect Dynamic Clause. Although the one-argument dynamic verbs seem having no effect argument O to be expressed on, there does exist the possibility that an effect can be expressed on the initiator S itself. Therefore, an additional feature classification of one-argument dynamic clause is possible:

One-argument cause-effect dynamic clause={C/V code, S, E}

For example, in Chinese, it can be said, as literally in English, "*The baby cried awake"—a form of S+V+E, which in English is not legal and has to be corrected as "The baby cried himself/herself awake"—a form of S+V+O+E (required in English, see [1333] below), where O is a reflexive pronoun. Note that the cause-effect clause, whether one-argument or two-argument clause, is a variation of the prototypical clause only, i.e. the same verb can label both kinds of clauses, so it is not reflected on the clause/verb classification tree. That is, this is a feature classification. Its use is shown on the CLAUSE STRUCTURE LIST (see [1932]).

The E Clause (Fragment) in Other Clauses. In [1324], the E part has already been broadened beyond the 'effect' meaning Therefore, even in property clause there can also be an E part. For example, in the English sentence, "She is clever enough not to be fooled by his words.", the E part "not to be fooled by his words" can be interpreted in many ways, such as to add to her cleverness, or to be a condition for her cleverness, etc. State clause can also have an E part, such as in "She was startled to be speechless." But state clause more often has a cause part which takes many forms, not just an E fragment, such as a preposition phrase in "She was startled by his sudden appearance." These are linguistic discussions and hence beyond the presentation. The important thing is that most prototypical clauses can have a variational clause with an E part in their respective clause families. The requirement is that the E part is an integral part of the clause, not joining in with clause markers.

3.3 Bare and Packed Features

This subsection still refers to FIG. 3C/2, node VCB. In Chinese, the majority of two-argument single-character dynamic verbs (let them be represented by 1V) are action verbs. Hence they have a very interesting cause-effect clause structure:

Chinese cause-effect clause for single-character verb=S+1V+E+O.

The effect part E simply expresses the dynamic or static state of either S or O. Hence E can be a static expression or a one-argument dynamic expression for either S or O. Since E shares with 1V either S or O, E reduces to mostly a single-character expression, as an adjective (for property expression or change-of-state expression) or a verb (one-argument dynamic verb). Over time, the two characters, 1V and E, have fused into a fixed word, and such a double-characterization has become the majority of the Chinese vocabulary, people grew accustomed to the 1V+E formation and took them as just another double-character word. This evolution has a natural consequence. That is, Chinese single-character verb 1V is able to keep the cause role, and if an effect role is needed it concatenates with E to play. Hence the 1V+E formation is a very productive and more flexible word formation than the double-characterization formation implies: if the double-character formation uses frequently, it fuses into a double-character word; otherwise, it is just a freely formed 1V+E use. From another angle, this means that the Chinese single-character verb system effectively decomposes a group of two-argument dynamic verbs into cause and effect parts. Let these single-character verbs be called bare verbs. When the dynamic state is complex, i.e., there are plural causes and effects involved in the state, let the corresponding verb be called packed verb. Note that this bare/packed division is for verb only, it is not necessary to apply to clause, hence it is a verb feature classification.

From the above, it can be seen that, the packed double-character action verbs are made of two single-character action verbs in concatenation. Also, there are two constructions of cause-effect clause in Chinese, one is the already mentioned S+V+E+O with V mostly as 1V; the other one is S+V+O+E with the majority of V as two-character verbs—but this later construction is not as prolific as the former one. In other words, the same single-character Chinese verb generally labels two kinds of clauses, the action clause (for its bare form) and the cause-effect clause (when it concatenates with an E)—the action/cause-effect feature of section 3.2.

Internal Decomposition of English Verbs. However, in English, the cause-effect structure is almost exclusively in the form of S+V+O+E. Furthermore, the effect is mostly on O, rarely on S. Looking back at the action clauses, English does have some bare action verbs (such as eat, hit) or bare action clauses. However, these bare verbs do not have the S+V+E+O construction. This is a logical result of the English grammar, where the word in the E position should be a modifier for V (as adverb) or O (as adjective), it cannot be an expression on O, let alone on S. The question is then asked: what is the corresponding English verb to the Chinese 1V+E construction? It turns out that many times the corresponding English verb Ve has an internal construction of a bare verb VO plus E. In other words, Ve can be decomposed into VO and E. So Ve can be used as VO or E alone or VO+E combined. An example of some complexity is the verb 'break' which has the internal construction of ' [HIT]+broken' (i.e., 'cause O to become broken'), where the square parenthesis around HIT means the exact 'action' is vague—it can be 'hit', 'strike', 'bat', 'hammer', etc. and it is the effect E that counts mostly. Hence 'break' can be used in clauses like "He broke the bottle" (=He [HIT] the bottle and it became broken—a VO+E use), "The bottle broke" (=The bottle was broken—an E use). If there is no corresponding Ve word, then two clauses are needed to translate the Chinese S+1V+E+O clause.

From the above perspective, the embodiment designs the two-argument dynamic verbs of Interlingua by modeling after Chinese verb system, i.e., adding a bare/packed feature. Note that the bare/packed feature has some verb decomposition characteristics. However, this verb decomposition is different from the well studied subject of verb decomposition in linguistics and in natural language processing. Also, each NL has its own idiosyncratic way of verb composition. What is different in the embodiment is that there is no artificial 'verb primitives' in the decomposition. Instead, the embodiment treats the bare/packed 'decomposition' as a multiple-use case, see 'break' example in the last paragraph.

In summary, the two-argument dynamic clause/verb has three sets of intrinsic and distinguishing features: forward/backward, action/cause-effect, and bare/packed. These three features comprise a feature classification as part of the syntactic classification of the two-argument dynamic verbs. As indicated in paragraph [1111], feature classification does not provide a tree-like picture, hence it is not shown in the verb tree. Hence in FIG. 3C/2, node VCB, the seven further syntactic classifications are a mixed bag of feature and syntactic classifications. For example, since the forward/backward feature is both clause and verb based, hence the first four classifications can be distinguished by the forward feature and the last three classifications can be distinguished by the backward feature. Note that this level of classification is omitted in FIG. 3C/2. Since the action/cause-effect feature is clause based, they cannot be such distinguished—this feature is used in the clause structure, i.e., used in the CLAUSE STRUCTURE LIST and the CL-STR feature of paragraph [1932] below. And since the bare/packed feature is verb based, they also can not be such distinguished since inside each classification some are bare verbs, some are packed verbs, and some are both, hence it is a feature for individual verbs to distinguish their multiple senses. There are other clause/verb features that may be used in classification, such as the 'telic', 'continuity', and 'ergative' features. The 'telic' and 'continuity' features are more semantic oriented and the 'ergative' feature can be handled in the variational clauses presented later (see section 9).

3.4 Semantic Classification of Two-argument Dynamic Verbs

This subsection refers to FIG. 3C/2, node VCBA. Up to now, the classification of two-argument dynamic verbs is at the clause level, i.e. more syntactic and language universal. When the classification gets finer, it's the verb itself being further distinguished. As such it becomes more verb-specific and language-specific. In the last paragraph, there shows a syntactic level feature classification. Below this level, there are other syntactic level classifications. For example, under the operation verb node VCBA, the present embodiment first distinguishes the verbs by the 'tools' used (in a general sense). This is logical, since if O is being affected, there has to be something touching it—hence this level is universal and can be considered as syntactic. Tools can be first divided as 'human-body-part' (refer to node VCBAA) and 'non-human-body-part' (refer to node VCBAB). This is natural since human's body action is most intimately involved with human's life and closely reflected in the language—hence this division is still considered as syntactic. Note that the third node VCBAC 'No definite tool involved' is a catch-all case, which may not have many verbs belong to.

Then the classification of body-tool verbs gets more semantic. For example, in Chinese there are over a hundred such body-tool operation verbs—single character alone. These Chinese verbs can be further divided among 'tool of body part' as part-of-head, upper-limb, lower-limb, etc. And part-of-head can be further divided as pate (top of head) and mouth (but note that verbs involving eye, nose, and ear are generally backward verbs); and mouth verbs can be divided by teeth, tongue, lip, etc.; and so on. These fine-grained semantic divisions are Chinese specific. For example, English doesn't have so many body-part operation verbs. But English does have over two hundred movement verbs (one-argument or two argument) which can be further distinguished by a rough feature set {mood, pace, direction}. For 'tool of non-body-part' operation verbs, the tools are in general senses (mostly are primal ones, such as 'hoe', 'spade', 'spear', etc.). Only a few modern tools get to be reflected or even coined into verbs, such as 'staple', 'Xerox', etc. in English—again language-specific.

As the above presentation shows, when the classification in GL of IL gets more language-specific, at some point the further classification then shifts to the GL of respective NLs, becomes semantic, and synonymy code with feature set again becomes the method used. The general guideline for the design of the GL of IL by the embodiment is, the verb tree in the GL of IL collects syntactic classification nodes as much as possible, and let the verb tree of the GL of respective NL collect nodes—or more precisely synonymy features—of fine-grained semantic classifications or synonyms.

Although the use of 'verb primitives' can be one way to achieve this goal of fine-grained semantic classification, it is too much an artificial method and difficult to design. The present embodiment prefers the natural method, i.e. finding classification ways by examining and organizing actual verbs/clauses in NLs, and unifying all these classifications in the Interlingua. In other words, higher level classification codes are syntactic and language-universal and reside in GL of IL, while more fine-grained lower level classification codes (feature code) are more semantic and language-specific and reside in the GL of respective NLs. In this way the fine-grained lower level verbs in a source text, during input processing, carry over their language-specific features into their Interlingua representation, and these features are used or consulted during output processing to find the optimal matching verbs, with modifying phrases if necessary, in the target text.

3.5 Special Clause/Verb

This subsection generally refers to FIG. 3C/2, node VE. A few kinds of clauses/verbs may be better treated as special cases, even though they can be brought into the general classification system, for example, the zero-argument clause (of natural phenomenon), the three-argument clause (dative sentence), clause of serial verb construction, etc. Among them, the EVENT clause/verb has a particular character and hence is assigned a high-level node (see FIG. 3C/2, node VD). This is the type of clause/verb which specifically expresses the TIME or SPACE factor of an event, such as the English verbs 'start', 'stop', 'occur', etc., for example, as in the English sentences, "The meeting starts at 9 o'clock." or "The accident occurred there." Note that the TIME or SPACE 'arguments' are generally introduced by prepositions in English, but not necessarily so in Chinese for the event clause. It is in one sense also a two-argument dynamic clause/verb, such as "We started a new project." or "He stopped the work abruptly." However, they all can be in such sentences as "The meeting started/stopped/occurred just a moment ago." which looks like a one-argument dynamic clause but is not, since the one-argument is not the required agent noun. There are further linguistic charactistics to justify its special clause classification by the embodiment, which are beyond the present presentation.

A large group of clauses/verbs, called CAUSE clause, is better to be treated as special clauses, such as the 'make' clause in English, for example "He made (or caused) her cry". This group of clause is itself a subset of a larger group of clause, called 'pseudo-verb' clause in the embodiment (some called 'support verb' or 'light verb' in English linguistics and some called 'virtual verb' in Chinese linguistics). These verbs per se typically play a support, light, or virtual roles in the meanings of the clauses; and the meanings are mostly carried by the associated arguments (mainly abstract argument which is introduced later), or E part. An example of such associated argument is: "He gave a bad speech"—the meaning is carried by 'bad speech'. This type of clause/verb is a quite universal case and listed in IG. For purpose of the embodiment, such special clause is assigned the interlingua classification code of its 'pseudo-verb' plus a meaning feature.

The property/state clause also has an interesting clause construction that merits a special treatment. Normally, the property/state clause is used to describe its subject. However, in many occasions, the description needs to be qualified or specific. For example, simply describing a person as "He is good" is not complete, unless there is a context to make it clear what he is good at. Hence this property clause has an alternative structure with a 'complement phrase' often introduced by a preposition, such as "He is good at singing". Similarly for the state clause, such as "He is interested in learning Chinese". Note that this 'complement' construction is different from the E part presented in [1326] above, since it is not a clause fragment. Another way to treat this clause construction is to consider it as a variation of the prototypical property/state clause (see variational clause in section 9).

There are also useful clauses which belong to the normal classification but are worth to treat as special cases. One example is the EXISTENCE/APPEARANCE clauses which are those that having SPACE or TIME nouns as one of the arguments. Note that there is a slight overlap between the EXISTENCE/APPEARANCE clause and the EVENT clause—the later specifically deals with event noun. Another one is the reciprocal clause (such as with verbs 'meet', 'converse', etc.), many of them belong to the class of social clause/verb (see FIG. 3C/2, node VCBAB). Then there are the catch-all cases where the determination of classification is in the boundary case. For example, is the verb 'need' static? Then it is a relation clause/verb, such as in "The car needs a new tire". Or is it dynamic? Then it is a psyche clause/verb (see FIG. 3C/2, node VCBG), such as in "The child needs his/her mother". As long as the number of cases is small, put them in special clause category is a temporary but feasible solution before a good classification is determined. In individual languages, there are also language-specific special clauses and they are listed in the NL concerned, but linked to related classification in IG.

4 Adverb and Other POS Words 4.1 Adverb

This subsection briefly refers to FIG. 3D. There is a remaining feature of the clause to be considered—the adverb. Adverb is traditionally taught as modifiers of verb, adjective, and sentence, i.e., they are modifiers of expressions. For the purpose of the embodiment, adverbs originating from adjectives are treated as derived words from adjectives, i.e., not listed separately in GL but linked with a virtual node ADJECTIVE-ADVERB (see FIG. 3D, node MA), especially the large number of human's 'psychological' adjectives, since their semantic referents are actually the related human arguments. For the remaining adverbs, their classification is simple, basically as DEGREE, RANGE, SPEED, FREQUENCY, TIME (besides TIME feature), MOOD, MANNER (excluding human's 'psychological' manner), and SENTENCE ADVERB. The present embodiment groups adverbs in a third feature set, the ADVERB feature set. The reason of doing this is the same as that of TIME and SPACE features—many adverbs are language-specific and sometimes they need special handling during translation. For the same reason, the MOOD feature, including subjunctive mood, of an expression is also included in this feature set. Note that space related adverbs in traditional grammar are included in the SPACE feature set. Also note that the adverb tree in FIG. 3D is a simple classification of adverb words, where the present presentation does not elaborate, but the ADVERB feature set also includes other linguistic units such as adverbial phrases.

4.2 Other POS Words

This subsection also briefly refers to FIG. 2. For the purpose of the embodiment, words of POS of noun, adjective, verb, and adverb are called content words, all other words are called functional words. Among functional words, those of POS of conjunction, pronoun, and preposition are called major functional words since they serve key functional roles and their existence is universal. Their usage and semantics are well studied in linguistics, and their numbers are small, each type around several tens, so their classifications are easily achieved, hence they are not presented in detail. But they play a major role in Interlingua engine (IE).

Another functional words are called minor functional words, such as articles and PRO-words (other than pronouns). Although they are not universal, they serve particular grammatical functions which may be carried out in specific means in respective NLs, hence they are programmed in the IE and not specifically designed in the GL. The rest of GL words are supplementary words, since they serve small and supplementary roles, such as interjection, exclamation, sound-simulation, courtesy, etc., the GL and IG treat them by listing, either in the Interlingua or in the NL concerned. There are also language-specific words, such as 'words of unit of measure' widely used in Chinese. Each NL also has words borrowed from other NLs. For such special words, since their number and usage are limited, the GL and IG treat them case by case, mostly by listing, either in the Interlingua or IE or in the NL concerned.

5 From Concrete to Abstract

This section refers to FIGS. 3B and 3C again.

5.1 Event and Event Noun

Up to now the arguments are assumed to be concrete objects, where intuition guides the development of clauses. That is, at the ground level the world consists of objects, and then adjectives and clauses are developed on the objects, by which humans start to describe the world and its basic affairs. This is human language's natural formation process. One level up, adjectives are grouped and named as properties, and sentences are collectively called events. In the above, the symbol E is already used to denote event/clause as a fragment for the effect part. E now has two mnemonic meanings—effect part and event. Event, in NLs, can be labeled as event nouns. For simplest event, i.e., one clause (sentence) event, if it is to be used as an argument, NLs almost all use its verb as label—called event-noun in the embodiment. This is logical. In English, as in many Indo-European languages, when the S argument is to be omitted, inflecting this verb as event label is required (called gerund in English), so as to differentiate it with its main verb use. In Chinese, no inflection or other explicit markers exist, causing great problems in disambiguation in MT, but native speakers of Chinese make the distinction intuitively. However computer has to be taught (programmed) to make the distinction.

VERB-NOUN. There are also other nouns specifically to denote events. The simplest one is the verb itself, with form change if necessary, such as 'action', 'comparison'. To distinguish from the previous event-noun, this is called VERB-NOUN (GENERIC) and the previous one is called VERB-NOUN (GERUND) in the embodiment. Note that there is a difference between VERB-NOUN (GERUND) and VERB-NOUN (GENERIC). The former denotes a specific event, and the latter is a general reference. Like before, these derived nouns are not listed in GL, but virtual nodes are reserved on the classification trees for them to link to the listed words in the lexicons of respective NL5 (see FIG. 3B, node NBAAA and NBAAB respectively). Note that the distinction between VERB-NOUN (GERUND) and VERB-NOUN (GENERIC) is semantic and hence not language universal syntactically. There are also collective event nouns which do not have a single specific and identifiable verb behind them, such as 'flood', 'war', 'game', 'affair', 'story', etc.—they may be made up of many sub-events. Naturally, they are classified and listed in GL (see FIG. 3B, node NBAB)—note that this is a large branch and can be further classified as personal event, family event, social event, national event, international event, military event, historical event, etc.

Verb-noun as Property. Not all verb-nouns are event noun, some are property noun, such as 'intention' from 'intent'. Clearly human or human organization, as agent of the related clause/verb, is the possessor of this kind of property. Therefore, these verb-nouns are not associated with a virtual node, they are bona fide property nouns. Hence in FIG. 4C of human property noun, there is a branch for this kind of property, called 'dynamic property' (see FIG. 5A, node NBBACBBBA and [1154]), since the property appears with events and exists dynamically. In extension, other agentive nouns, such as animal or object having mechanical force or power, etc., can have verb-noun properties, such as 'development' in "The development of battery-powered car is slow". Note that the boundary between verb-noun as property and verb-noun as event is sometimes vague, depending on usage—a subject worth further study (see [1622] for a brief discussion).

5.2 Abstract Noun as Argument

This subsection generally refers again to FIG. 3C/2, node VCB. Further level up, properties and the above-mentioned event nouns are collectively called abstract nouns. Humans then use them to describe more complicated world affairs. That is, a parallel construction of clauses involving abstract nouns as arguments is developed. Briefly, for example, instead of describing "The cloth is red", the property of cloth is described, as "The color (of the cloth) is red". Or an event is expressed about, such as the property clause, "The story is untrue"; or the one-argument dynamic event clause, "The ceremony starts early". And so on.

Prototypical Two-argument Dynamic Clause with Prototypical Abstract Argument. Referring to FIG. 3C/2, node VCB, there exist several kinds of prototypical two-argument dynamic clauses/verbs involving abstract noun as prototypical argument. First, the argument S of these clauses still needs to be an agent noun as broadly defined above, so as to satisfy its dynamic character. This leaves only O to be the case of abstract noun as argument. The most prominent group of such clauses is the communication clause/verb (see node VCBC) which has dative prototypical construction with its O argument as abstract noun (mainly an event noun, E) and a dative argument O' which is generally human noun, such as "He told her a story". Another group of such clause is the activity clause/verb (see node VCBD), where O is event noun such as in "He implemented the plan", or property noun such as in "He fulfilled his duty". Among prototypical backward dynamic clauses, the mental clause/verb has mainly an abstract argument O (see node VCBF) such as in "He understood her concern", and the psyche clause/verb can have either concrete or abstract argument O (see node VCBG) such as in "She hates Bob/smoking".

Non-prototypical Two-argument Dynamic Clause with Abstract Argument. In other cases of forward two-argument dynamic clause with prototypical concrete argument O, when O is instead filled by a general abstract noun, the clause then becomes non-prototypical, and the action part of the dynamic verb is in a metaphorical sense, i.e., no physical force is exerted on O, but an effect is expressed on the abstract argument O. For example, in the sentence "He destroyed her trust", due to some unspoken actions of the agent 'He', the abstract argument 'her trust' becomes non-existence or disappears, may be in a dramatic or violent manner metaphorically. Except for a specific group of EVENT clause/verbs (see FIG. 3C/2, node VD), such as 'start', 'continue', and 'stop' in English, for other prototypical construction but non-prototypical use of two-argument dynamic clauses/verbs, not only the manner is metaphorical, but the action itself is metaphorical also. This is one way that a NL can express on an abstract noun. Otherwise, the NL has to define, explicitly but not intuitively, a new verb for such abstract occasion which is in a multi-dimensional continuum and hence quite impossible. Even if it can be done, the results end up similar to the multiplely using of dynamic verbs.

Variational Clause. But if the position of S of the prototypical two-argument dynamic clause with prototypical concrete arguments is filled by a non-agent concrete noun and O is abstract, such as in the sentence "The evidence destroyed the suspect's last resistance", then not only the clause is metaphorical but also it is variational—a subject to be presented later (see section 9). Similarly, if the position of S is filled by an abstract noun and O is concrete, the related verb is also in a metaphorical sense and no physical force is exerted on O, but an effect occurs on the argument O. For example, in the clause "His betrayal devastated her", his betrayal is the cause of her being devastated. Since an abstract noun doesn't have agency, it cannot play the role of S and this clause is also a variational clause to be presented later.

Finally, if both S and O of a clause of two-argument dynamic verb V with prototypical concrete arguments are filled by abstract nouns, then V loses its dynamic sense and only retains a static sense—the clause effectively becomes a relation clause metaphorically. NLs do this both to multiplely use the limited symbols but also, more importantly, to multiplely use the static meanings of a dynamic verb. The reason, or the advantage, of using the static sense of dynamic verbs to make relation clauses is to create a CAUSE-EFFECT type of relation clauses. For example, in the clause "His action destroyed her trust.", 'His action' is an event which is the cause of 'her trust' being non-existence or disappears, may be in a dramatic or violent manner metaphorically. Note that this kind of clause can also be analyzed by variational clause construction, but using the analysis of relation clause construction, by the computer, is simpler for IE processing. This concrete-to-abstract variation of two-argument dynamic clause/verb also applies to one-argument dynamic clause/verb. Since there is another variation—the collocation variation—to be presented later (see section 9), both are then presented together.

5.3 Event Property

Events also can be described, i.e., can have property values, often in pairs, such as easy/difficult, correct/wrong, true/false, early/late, etc. But these values usually do not have specific property nouns to denote or to name them since there is no concrete object to associate with, or to observe physically, i.e. to form object-property-adjective triad. However, 'event' is their general 'object', so the name 'triad' is still used for event-property-adjective, although 'property' may be a blank. If there is a need to express on the property values, then they still have to be denoted first, i.e. to name them, or, to have them nominalized. Most NLs do this by linguistic methods, such as inflection or affixation, e.g. 'easiness/difficulty', 'correctness', 'truth/falsehood', 'lateness', etc. in English. Then they are abstract nouns by themselves.

Referring to FIG. 3B, node NBBC, event has its own property nouns, besides the above property nouns derived from nominalization of property values. Node tree NBBC shows some rough higher level classifications. Note that some are also pure property nouns, i.e. no specific values exist. Event properties can be confused with some ontological properties and some may be cross-referenced (see [1172]). Event properties can also be confused with some human properties since human is the agent of most dynamic events, so care should be taken when compiling such words in the GL of respective NL. One prominent example is 'speed' which is the property of motion—a VERB-NOUN (GENERIC) event. Since motion is invariably associated with an object, especially transportation object, 'speed' is then indirectly used as a property of that object, such as in "The speed of the car is too fast", thereby becomes a boundary case (see [1005]).

5.4 Adjective Noun and Pure Property Noun

Adjective Noun. In fact, all adjectives can be nominalized as an abstract noun, but the nominalization results in two kinds of abstract nouns: One is called ADJECTIVE-NOUN (ABSTRACT) in the embodiment, such as 'beauty2' ('beauty1' is in [1128]), and has a virtual node (see [1128] and FIG. 3A, node NBC). The other is called ADJECTIVE-NOUN (SPECIFIC) in the embodiment, i.e. they can be expressed on as a kind of 'specific' property, such as in the clause, "The beautifulness of this vase is beyond imagination." For them, they are derived noun words and not listed in GL but assigned a virtual node (see FIG. 3B, node NBD). Again, like VERB-NOUN (see [1513] above), the distinction between ADJECTIVE-NOUN (ABSTRACT) and ADJECTIVE-NOUN (SPECIFIC) is semantic and hence not language universal syntactically. Note that 'beauty2' is a property with human propensity, 'beautiful' is one of its values, and 'beautifulness' is the name temporarily given to 'beautiful' so as to express on this particular value.

Pure Property Noun. It has been mentioned that, in a particular NL, concrete objects (concrete nouns) have various properties and a specific/particular property can belong to different objects. Over times, the property becomes the prominent argument in expressions, such as 'beauty2', while the objects possessing the property become implicit; or a group of properties are given a name—sort of a collective abstract noun—such as 'morality'. There exist also some pure properties, i.e., no adjective values available, such as 'virtue'—they mostly belong to human, some belong to event, and hence listed under the respective nodes; they also have no adjective values. But note that there are fit-all adjectives, such as 'good/bad', that can be used as values for these pure properties. For them, property clauses mainly take the form of POSSESSION relation clause. For example, the property clause "His idea is good/bad" becomes a POSSESSION relation clause "He has a good/bad idea".

5.5 Concept Noun

Referring to FIG. 3A, node NBE, there are also nouns which are a complex combination of abstract nouns and/or concrete nouns. These nouns are coined for the purpose to define, i.e., to label, a complicated concept, hence they are called concept nouns which are treated as a kind of abstract nouns in the embodiment. Naturally, concept nouns exist principally in the lexicon of professional fields since they need to be 'defined', not being able to be classified into event noun or property noun. Only a few of them get into popular use, such as 'mechanism', 'system', 'gravity', 'calculus', etc. In theory, nouns of higher level combination of concept nouns and abstract nouns, and even more complicated combination, can exist. In reality, they are all concept nouns, i.e. abstract nouns, since NLs are for popular use and ordinary people do not differentiate higher level concepts. Therefore, concept nouns in the embodiment are defined by exclusion. That is, they are those nouns which are not concrete nouns, ontological nouns, event nouns, property nouns, and first level virtual node nouns. Hence virtual node NBEA, DERIVED-PROPERTY-NOUN (see [1552] below), is under concept noun node, NBE.

Referring to FIG. 3A, node NBE, the most intuitive abstract (property) nouns are those that are derived from concrete nouns. Every concrete object has associations and relations with other concrete objects, which can be expressed in various ways. For example, a mother (as a derived concrete noun, under the node NAE, ATTACHED-PROPERTY-NOUN (CONCRETE), see [1151] and [1163]) has relations with her children and husband, and has associations with events of reproduction, care, nurture, education, etc. Hence, the further derived noun 'motherhood' carries all the information for these properties/events. These are abstract nouns on the higher levels than property and event abstract nouns. So they are also concept nouns. Every NL has its own mechanism to represent/mark this kind of derived abstract nouns, most use affix. Since language markers are part of IE, so these derived abstract nouns are not listed in the GL, but they are listed in their own language's lexicon in close association with their stem concrete nouns. When converted into Interlingua representation, they show up as this stem concrete noun code plus their abstract meaning, i.e. an ABSTRACT feature. This kind of derived property nouns are essentially pure concept nouns and a virtual node DERIVED-PROPERTY-NOUN is assigned for them (see FIG. 3A, node NBEA).

6 Recursiveness
6.1 Recursiveness on Clause Construction

This subsection does not refer to any particular figure, since E, as clause or event, is a structural feature. In subsection 3.3, [1333], a new structural element E comes into play in clause structure. E is usually an abbreviated clause—a clause fragment—where its argument, S or O, is shared with the main verb V and hence omitted. E is also mostly a one-argument clause. However, there are cases that E is a two-argument dynamic clause. Then it becomes possible that E itself is a cause-effect clause, containing another E, say E2. Theoretically, E2 can contain E3, and so on. This becomes a recursive construction.

Besides cause-effect clause, E can appear in many other clause constructions, such as in a subordinate clause and in serial verb constructions. Whether by recursive construction, or by subordinate clause, or by serial verb construction, etc., they all have clauses (or clause fragments) inside another clause—called nesting. Subordinate clause and other nesting constructions are well studied in linguistics and learned in every NLs, some are included as special clauses in subsection 3.5. It is important to note that recursive or nesting construction is a major source of ambiguity in NL processing because E is a clause (fragment) and, since every clause has a verb to label it, these verbs therefore may confuse with the main verb, hence compete with the main verb for the main sentence role. Finding which verb is the true main verb is one of the main disambiguation job in MT. This is shown in part III of the IE programming, especially subsection 3.4 of Part III.

6.2 Recursive Derivation of Word

This subsection refers to FIGS. 3 and 4A, all virtual nodes. Subsection 6.1 describes the recursiveness on clause construction, and this subsection (and in fact section 5 also) shows that words can also be derived recursively, i.e. for example, some concrete nouns are derived from abstract nouns (see [1163]), some adjectives are derived from verbs (see subsection 2.4), abstract nouns of simple event are derived from verbs (see [1513]), even some abstract nouns can be derived from adjectives (see [1541]), etc. Note that, concrete nouns generally are not derivable into verbs, except a few 'verbs of tool' (such as 'bike', 'hoe', 'hammer', etc.), otherwise they are used metaphorically. However, some abstract nouns can be derived into verbs, especially the -ize type of verbs in English (with corresponding construction in other NLs). So, as usual, they are not listed in GL, but listed in individual NLs as necessary, and a virtual node of ABSTRACT-NOUN-VERB is reserved on the GL verb tree (see FIG. 3C/2, node VF). For completeness, a CONCRETE-NOUN-VERB node (see FIG. 3C/2, node VG) is reserved in the verb tree also.

The recursiveness of derivation of words does not limit to one level, it can go on indefinitely in theory, for example in English, reason->reasonable->reasonablize->reasonablization; and with some specific affix: reason->reasonism, reasonist, reasonology, etc. In fact, recursiveness is a key design concept of the Interlingua and the procedure is called human language's natural formation process of words by the present invention. In practice, humans avoid using too high a level recursive derivation unless it fits intuition or familiarity. Note that some affixes in English are more syntactic, such as -ness, -ly; and some are more semantic, such as -ism, -ology. Therefore, in GL, the embodiment only reserves virtual nodes for derivations which are more syntactic and language-universal. For those derivations that are more semantic and language-specific, the embodiment lists them as the ground level words, including phrasal derivations. For the boundary cases, they are decided case by case. For example, the English -er derivation is both syntactic and semantic: syntactic because the affix form -er applies to verbs regularly; semantic because it results in a particular meaning. Since the derivation is universal, or the use of the derived words is universal, the embodiment decides to reserve a virtual node VERB-NOUN (CONCRETE) for the derivation.

However, word's recursive derivation is a subject not formally studied in linguistics, and it is not well explained in dictionaries either, such as the difference among the four derived nouns from the English verb 'act': act2 (as noun), acting, action, activity. Especially in Chinese which does not have a formal affix system, a proper translation of such derived words is troublesome even for human, let alone for computer. Chinese does have some words which act as affix, but this is not explicitly taught or understood. Actually, there is another method to derive new word, i.e., to use hyphen (or just a space) to concatenate words into new words, called combined words, such as 'check-up', 'cliff-hanger', 'deep-rooted', 'gas-mask', 'son-in-law', etc. in English. From this perspective, all Chinese derived words use combined word method which in many cases is also a phrasal method.

The examples of 'motherhood' and 'beauty' show, the meaning of derived words can be multifarious, some can be metaphorical. The embodiment lists the various meanings in feature set in the lexicon of the respective NL, including metaphorical features. Therefore, with derived words so designed and classified in GL, the embodiment provides a systematic solution in this area not only for the purpose of computer processing, but it can also be used for human learning (such as a new way of dictionary listing). In addition, a formal study of recursive derivation of words in respective NLs is required and it even could be a side product of the present invention since there are many issues involved beyond traditional lexicology and beyond this brief presentation.

Most of the time, derived word has a different POS from that of the original word, or it changes category between concreteness and abstractness. It even can have many different senses which are often metaphorical. Therefore, the meaning of the derived word is not as clear as its original word since it loses prototypicality. For example, 'youth' is the derived noun, i.e. ADJECTIVE-NOUN (SPECIFIC) of the adjective 'young' whose prototypical property name is actually 'age'. Hence 'youth' has many senses: a specific period of age of being young—main sense; the condition of being young—metaphorical sense; characteristics of being young—extended sense; young persons (mostly a collective noun)—sense with abstract-to-concrete change (it can be considered another derivation, but it's too involved, and hence list this sense in English lexicon would be more efficient); etc. Therefore, there are many complications involved in word derivation—ambiguous, metaphorical, category-change, etc. This is language reality, one that DT method of MT fails to recognize and is unable to solve.

With the Interlingua method of MT, word derivation is treated in several fronts. In GL, virtual nodes are reserved for derivations which are more syntactic and language-universal. In the lexicon of every respective NL, derivations that are more semantic and language-specific are listed as ground level words; hence derived words of known senses, especially metaphorical ones, such as the above 'youth', are listed to guide analysis and to aid program efficiency. They are generally not linked to virtual nodes in GL. In the Interlingua engine, for every category of derivation and for every exceptional cases, there is a corresponding 'metaphor processing procedure' (see [1811] for more) to seek the true sense and its meaning of the derived word, especially for newly derived ones.

7 From Syntax to Semantics

This section does not refer to any figure, as it mainly concerns grammar, especially semantics, and hence serves as base for Part III, the IE programming.

Syntax is about symbols and their combinations to make linguistic units (LU5); Semantics is about meanings of LUs, which concern human's cognition. For example, a concrete noun's meaning is its denoted object which human can see, recognize its attributes, associate its relations with other objects, understand its functions, make distinctions, etc. However, computer doesn't have cognition, all the meanings have to be taught, i.e., programmed, into the computer. Therefore, as computer processing is concerned, the more specific the information can be represented in the GL or programmed through IG, the more semantic that information is. The embodiment uses a system of classifications not only to code the representation of LUs but also to build semantics into the representation in as high level as possible, one example is in subsection 2.2 where fundamental semantic relations between concrete objects are indicated, such as PART-WHOLE relation, INHERITANCE relation, POSSESSION relation, etc. Another example is in subsection 1.3 where adjective is defined as an object-property-adjective triad. The third example is the system of the derived words (see subsection 6.2). On the other hand, the embodiment also builds lower level semantic information into the system. One example is the verb's fine-grained semantic classification. Also, the recursive design of the GL has semantic implications. Later on, when the database of common-sense information is introduced in Part II, it makes more semantic information of objects to be stored for computer use, such as the Semantic Code Groups presented in [1138].

Collocation. At the clause level, traditional linguistics consider basic clause structures as in the syntax area. However, with the way the embodiment classifies clauses, even the three basic-level types of clauses carry particular semantic information. When clause structures become more and more in detail, their arguments and verbs become more and more restricted in category, i.e., specific verb requires specific arguments—in linguistics, this is called collocation. In other words, the finer the clause classification is, the more semantic the verb and arguments become. Roughly speaking, for clauses of the same structure, i.e., of the same syntax, their further classification is more semantic oriented. Hence, for semantic classification of clause (verb), the embodiment also makes use of category code and synonymy code (see subsection 9.4 later). Therefore, for the purpose of the embodiment, clause (verb) classification is called syntactic when it is more structure oriented and language universal, it is called semantic when it is more meaning oriented and language-specific—but note that the dividing line is not clearly delimited. More about collocation is presented later.

8 From Prototypical Sense to Metaphorical Sense

This section also does not refer to any figure, as it mainly concerns meaning, especially metaphorical meaning, and hence serves as base for Part III. However, the description in this section will later contributes in the construction of the rules in FIG. 6.

8.1 From Prototypical Sense of a Word to its Metaphorical Sense

Violation of Collocation in Clause. Metaphorical sense has been mentioned already in the above presentation. For concrete nouns, it is not their senses being metaphorical, it is that they act or are used metaphorically. For un-measurable adjectives, they are metaphorical in nature since they are used as property value and value is a scale metaphorically—this metaphorical character of adjective is taken care of by the object-property-adjective triad classification. But note that property nouns are not used metaphorically in general, except verb-noun as property. Derived words are generally metaphorical by nature of derivation. These leave mostly verb word as the true subject of metaphorical use. In other words, metaphor is generally a phenomenon caused by the violation of collocation in a clause—a subject already presented and more in the next section.

Metaphor Processing Procedure. Metaphor is a subject well studied in linguistics, rhetoric, writing course, natural language processing, etc. Also it is language-specific, i.e. a metaphorical sense of a word in language A may not have a corresponding metaphorical sense of the corresponding word in language B. This is said, things are however not so much in despair. First, many metaphorical senses have precipitated into common use and collected in dictionaries. The prominent example is words related to TIME, since TIME borrows its related words from SPACE, in one dimension, as its metaphor in almost all NLs, such as the adjectives 'long/short': 'a long time/a short period'. Second, as metaphor is well studied, it is also well used, even intuitively, therefore many kinds of metaphors are shared by many NLs in their daily use, such as metonymy. This means, among well-established NLs, there are correspondences of known metaphors between and among NLs, such as simile, trope, metonymy, metaphor, etc., hence these metaphors can be classified and translated by rules collected in a database of Metaphor Processing Procedure (MPP). Third, a text should use new or new kind of metaphors prudently, unless it is intended to be very figurative or even poetic. This means MPP in the embodiment deals with new or new kind of metaphor as a last resort; in most of the time, it simply converts one language's use of existing metaphor into another language's use by calculating features and weights. This is said, however, MPP is indispensable in natural language processing, since otherwise the computer will claim fault and stop processing by new metaphor's violation of collocation rules.

The Semantic Code Group presented in [1138] also contributes to the solution of metaphors, since NLs often describe or compare objects by using similar objects in different semantic groups. Therefore, the embodiment collects all the tools and methods, old or new, in the MPP database to deal with the metaphor problem which the DT method of MT has not successfully solved.

8.2 From Verb's Prototypical Sense to its Extended Sense to Its Metaphorical Sense Verb's sense variations (prototypical, extended, metaphorical, and multiple use) are most significant for dynamic verbs—the sense variations of static verbs are rather simple and straightforward. And in dynamic verbs, two-argument ones are the most interesting—one-argument ones are also straightforward. Generally speaking, for purpose of the embodiment, a dynamic verb's prototypical sense applies to its collocated concrete argument, its extended sense applies to concrete argument without collocation, and its abstract sense applies to the case when prototypical concrete argument positions are filled by abstract nouns, which results in CAUSE-EFFECT relation clause or metaphorical clause, as presented below (see 'variational clauses' of next section). Note that the case when prototypical abstract argument positions are filled by concrete nouns is rare and can be treated as special case. The extended sense gives rise to metaphorical clauses (verbs) which are well studied in linguistics. However, for efficiency sake, some extended senses in a particular NL are well learned and collected in its lexicon, so they are reflected in the GL of that NL as features of metaphor sets which are actually existed in that NL's lexicon. Over times, these extended senses become fixed because their derivations are too involved or the uses are popular. Then they are better treated as their own words or as cases of multiple use, and listed in their NL's lexicons as such.

In summary, a verb's prototypical sense applies to its prototypical clause, including its prototypical collocated arguments (especially concrete arguments) and collocated predicative adjective (for property clause). A verb's extended sense in essence is metaphorical since it applies to its clause when collocation is violated. It is listed as extended sense if it becomes fixed, i.e. in popular use and collected in dictionary. Hence this sense is written as E/M (i.e. Extended/Metaphorical) to cover both cases in FIG. 6(see also subsection 9.4). If the extended sense is too involved, it is better to treat this sense as a multiple use case, i.e. a different word. Lastly, a verb's metaphorical sense applies to its clause when the position of the prototypical concrete argument is filled by abstract noun (the other way around is rare, see FIG. 6).

9 From Prototypical Clause to Variational Clause

This section generally does not refer to any figure related to lexicons, it refers to FIG. 6 and is used in Part III.

Up to now, the presentation centers on the prototypical clauses. To review, "... prototypical clause specifically refers to declarative clause in active voice with feature sets collected separately" (see [1239]). Roughly speaking, a prototypical clause mainly concerns with the verb V (C/V code) and its collocated arguments and its basic structure in respective NL, together with the TIME, SPACE, and ADVERB feature sets. Therefore, any other structure, in respective NL, with the same 'CN code', is a variation to the prototypical one. In a sense, the prototypical clause presented above, in respective NL, actually is only about the fundamental structure, in respective NL, of V, S and O, since the construction with TIME, SPACE, and ADVERB features is language specific and left for each individual NL.

9.1 TIME Feature Variation

The first and most intimate variations of a prototypical clause are its TIME feature variations, since TIME is part and parcel of a clause. But these variations are language specific and hence coded in the TIME feature set, so they do not show up directly in the clause construction in IG. In other words, for a particular TIME feature in IG, every NL in the Interlingua system has a corresponding construction 'rule' to construct its clause which is recorded in CLAUSE STRUCTURE LIST (see [1932] below)]. For example, if the TIME feature is 'past time', then the corresponding English clause rule is 'to use the past tense form of the verb'. Note that there is no corresponding SPACE feature variation, since SPACE feature manifests in many forms (see [1238]) and is generally not related to clause structure.

9.2 Usage Variation

Next are the four usage variations: declarative, interrogative, imperative, and interjective clauses. There are basic grammar rules in each NL for the four clause constructions and also recorded in CLAUSE STRUCTURE LIST. Note that there are also minor and language specific variations, such as subjunctive case and courtesy usage. In IG, usage variation is represented as USAGE feature.

9.3 Structure Variation

The third variation is the structure variation: since every NL has its chosen {V,S,O} type, any rearrangement or change of its prototypical sequence, including the omission of arguments or addition of other type of arguments or E type words or complement words, signals a different focus, emphasis, or viewpoint by the speaker/writer, or signals a different form made possible by syntactic and/or semantic coincidence of the arguments. The most familiar one in English is the passive voice variation where the arguments S and O exchange their relative positions. Another is the dative variation. Topical or thematic head structure is a third example, which belongs to pragmatics and is a major research subject in linguistics of each respective NL. A fourth and important example is the addition of complement, including the E part. Also included are variations due to the involvement of supplementary arguments, such as the T or C argument presented below. It is to be noted that structure variation is highly language-specific, but it is also the very flavor of a particular NL. But the purpose of each structure variation is generally language universal, hence it is collected as the feature of that variation.

CLAUSE STRUCTURE LIST and CLAUSE-STRUCTURE feature set. The concept of structure variation is one of the key innovations of the present invention. Its role is most important in the IE part, as shown later in Part III (see subsections 3.4 and 3.5 of Part III). It is implemented in IG in two steps: first, for each NL, for each C/V code, compile all its clause structure variations in a database called CLAUSE STRUCTURE LIST (CSL), with each variation having a corresponding linguistic feature called CLAUSE-STRUCTURE (CL-STR in short) feature; second, include the CL-STR feature set in the clause composition of the C/V code in IG. Note that these CL-STR features, such as 'passive voice', 'dative', 'topic S', etc. are mostly shared among NLs, hence the CL-STR feature set can be optimized by including all possible structure variations of all NLs in the interlingua system, thereby making it a common feature set. These features can be weighted (see [1936]), they can also have synonyms. For any CL-STR feature, there is a corresponding construction rule in every NL. For example, for the feature 'passive voice', the corresponding construction rule in English is 'O+[be]+V[past participle]+by +S'. In IE, when programming the input module of a particular NL, one task is to compile the CSL database of such construction rules. Since the TIME, SPACE, ADVERB, USAGE, and CL-STR features are all related to clause, and are all further associated to the structure of clause of a particular verb (C/V code), therefore, for the purpose of IE programming, they can all be incorporated in the CL-STR set, for example as a subset, with corresponding structures also stored in the CSL database.

If only the two arguments, S and O, are involved in the clause construction, compiling the CSL database would be rather simple. However, a clause can involve other cases of arguments. In [1205], it is mentioned that "In IG, all participants have case markers and are weighted according to their degree of prominence in the expression." A simple prototypical two-argument dynamic clause has two prototypical participants (arguments), S and O. All other participants are supplementary arguments. Note that the embodiment treats the omnipresent TIME and SPACE factors as feature set, but they are sometimes manifested as S or O arguments and hence generally considered as special clause, see [1353]. Also, TIME or SPACE, as kinds of supplementary argument, may not need case marker in some NLs, such as Chinese, since they themselves serve as their own marker. If a clause has supplementary arguments, then it is a structure variational clause.

The embodiment treats the difference of arguments by weighting the arguments according to the general order: S, O, 'Tool/Material/Method/Manner' (abbreviated above as T already), 'Co-participant' (abbreviated above as C already), and Others. Note that, like T argument being associated with a kind of SCG group (see [1138]), nouns of the C argument type can also form a kind of SCG group. However, human nouns have the predominant weight for the C argument, and the C argument itself has much less weight than the T argument, the 'Other' arguments have further less weight.

For example, the prototypical OPEN clause, "He opened the door", has an implicit T argument, here the 'key' for the 'open door' action. In the clause, "The key [cannot] open the door" (words in square bracket here mean they belong to feature set of ADVERB), the 'key' is not S, as required by the embodiment to be agentive. By treating this clause as a variation of "He [cannot] open the door with the key" which is itself a variation of the prototypical one, "He [cannot] open the door", coupled with the concrete-abstract variation presented in subsection 5.2, the embodiment thus completes the semantic rule of structure of the two-argument dynamic clause, see FIG. 6(also see [1936] and [1937] for further presentations). Likewise, for the C argument, here is a simple example: "He carried the bag with his brother." Note that, many times the C argument has the same agency as the S argument, then it can occupy the S position and becomes a reciprocal case.

It is stated in [1932] that the CL-STR features can be weighted. Consider the USE-clause in English, "He used the key". Although the clause is in prototypical two-argument form, its meaning is somehow not complete. Hence it is of less weight than its serial verb variation, "He used the key to open the door." In other words, in the CSL of the USE-clause, the construction {CN code (of USE), S, O, E} has more weight than the construction {CN code (of USE), S, O}. A more profound example is in the daily common phenomenon, such as the verb 'melt'. Its prototypical clause in English is in the form: "The sun melted the ice". However, its variational clause "The ice melted" (called 'middle variation' in linguistics, and verbs like 'melt' are called ergative) has more weight since it is used more often. By the methods of distinguishing prototypical clause and variational clause, and weighting, the embodiment provides a systematic method for the computer processing of this type of verbs for their clause variations.

T argument. 'Tool/Material/Method/Manner' is in the third order of importance after the S and O arguments, so it's called T argument in the embodiment. When T is concrete, it is Tool or Material (or Instrument) in a broad sense; if it is abstract, it is Method or Manner (or Cause) in a broad sense. Material can be used as a tool in a broad sense, such as "He made the box with recycled papers." Manner is considered as a T argument since it is often used with the preposition 'with' which is typically used to introduce the T argument, such as in "He opened the door with great force." In many times, T is explicitly appeared in the expression, making it a variational clause, and sometimes T is even put in the position of the S argument (see the example above, "The key opened the door"). Therefore in traditional grammars, it gets confused with S and treated, together with S, as 'subject' of the clause. The embodiment clarifies their relations, thereby together with the case of abstract argument (see subsection 5.2 and [1822]), provides a rule map for the semantic processing of NLs (see FIG. 6). That is, in many two-argument dynamic clauses, especially in operation clause, there is actually a third argument, the T argument, manifesting explicitly or implicitly in the expression. Similar analysis applies to the C argument and other supplementary arguments but they have less weight and omitted in the presentation. Hence the structure variations of the two-argument dynamic clauses are the most interesting and involved ones.

This paragraph gives a slightly detailed but still brief presentation of the structure variation in English. It should belong to English linguistics which is generally omitted in the presentation, it is added here since the method of prototypical/variational clause is such a key element of the embodiment. Some of the examples used are referenced from "English Verb Classes and Alternations: A Preliminary Investigation" by Beth Leven, 1993, University of Chicago Press, Chicago, Ill. A prototypical two-argument dynamic clause in English is simply in the form S+V+O. For the case of forward clause with concrete arguments alone, there are already many possibilities to generate variational clauses. The immediate one is to 'reduce' to one-argument clause, in two cases: S+V and O+V. For S+V, the variation is generally due to the omission of O when: (a) O is unspecified, such as in "He already ate (the breakfast)"; (b) O is an understood body-part, such as in "He nodded (his head)"; (c) O is a reflexive pronoun, such as in "She dressed (herself) hurriedly"; (d) O is a reciprocal object and is absorbed into S, such as in "He and she met"="He met her"; (e) O is a generic object, such as in "That movie always shocks (people)"; (f) O is omitted because the action V is a characteristic of S, such as in "The dog bites (people)"; etc. For O+V, the variation is generally due to the need to focus on the relation between O and V, where: (a) the relation lacks a specific time reference, such as in "The meat cuts easily" from "He cuts the meat"; (b) the two-argument-V has the meaning of 'causing O to one-argument-V', such as in "The bell rang" from "The visitor rang the bell" or "The bottle broke" from "He broke the bottle"; etc. Similarly, a prototypical one-argument dynamic clause S+V can 'expand' to two-argument clause to take advantage of the un-used argument position, such as in *"He slept the sofa" (illegal in English but legal in Chinese). If there is a third argument introduced by a preposition (case marker), the possibilities of combinatorial variation increased subsequently; similarly for other cases. All these variations are language-specific, the important thing is, they can be listed systematically and exhaustively in the CSL database, featurized by descriptions or other features (CL-STR set), and weighted.

9.4 Semantic Rule of Structure of Dynamic Clause/Verb

FIG. 6 summarizes the semantic rule of structure of dynamic clause/verb as explained in the above sections and paragraphs, especially in the following parts: (a) [1206] to [1208], which deal with the agency requirement of the S argument—a fundamental basis for the dynamic clause; (b) most of section 3, which deal with the most involved dynamic clause, the two-argument dynamic clause; (c) subsection 3.4, which gives the guideline dividing the syntactic classification of verbs in the GL of Interlingua and the semantic classification of verbs in the GL of respective NL; (d) [1521] to [1523], which introduce the abstract noun argument; (e) [1524] and [1525], which introduce the variational clause; (f) [1702], which introduces collocation of arguments with the verb; (g) [1811] to [1822], which discuss metaphorical sense and metaphor processing procedure; and (h) section 9.3, which further presents the variational clause.

There are several points to be noted about FIG. 6. First, the rule is numbered for use in the later presentation about IE programming (see [3353]). Second, the rule shown is for the basic level ones for majority cases (the minority cases can be handled as exceptions), the complete rule (including minority cases) is detailed to individual verbs and stored in a database, called SEMANTIC RULE OF STRUCTURE (SRS) by the embodiment, and hence used by rule matching instead of the 'IF-THEN' selection shown. That is, for example, in the case of social verb, S is not only agent noun, but further restricted to human noun. Moreover, collocation is highly semantic, hence the rule can be refined according to the collocation requirements and other semantic meaning of specific verbs. However, collocation feature is on a boundary line between syntactic and semantic features: some collocation requirements are syntactic and universal and hence can be collected in the IG part of the SRS database and mostly treated as metaphorical, but some are semantic and language-specific and hence compiled in the respective NL part of the database and mostly treated as extended sense. In summary, there are actually three levels of the SRS rules: the first is the prototypical level; the second is the abstract level where concrete argument is replaced by abstract argument (the reverse case is rare); the third is the collocation level (for concrete argument).

Since group 1 clause (verb) of FIG. 6 is the most complicated and interesting case of the SRS rules, the following gives a tabulated presentation of group 1, where A=agentive, Ab=Abstract, Cn=concrete, Cl=collocated, E=Extended, P=prototypical; M=metaphorical; V=variational; R=relational; TCn=tool/material; TAb=method/manner/cause; and '−'=NOT operator:

| | S position | O position | Clause | Group1 | Rule-level |
|---|---|---|---|---|---|
| 1111 | A | Cn + Cl | P | P | level 1 |
| 1112 | A | Cn − Cl | M | E/M | level 3 |
| 1120 | A | Ab + Cl | M | M | level 2 + 3 |
| 1120 | A | Ab − Cl | M | M | level 2 + 3 |
| 1212 | −A(TCn) | Cn + Cl | V | P | level 1 |
| 1216 | −A(TCn) | Cn − Cl | V + M | E/M | level 3 |
| 1222 | −A(TCn) | Ab + Cl | V + M | E/M | level 2 |
| 1226 | −A(TCn) | Ab − Cl | V + M | M | level 2 + 3 |
| 1311 | −A(TAb) | Cn + Cl | V + M | M | level 2 |
| 1312 | −A(TAb) | Cn − Cl | V + M | E/M | level 2 + 3 |
| 1320 | −A(TAb) | Ab + Cl | V + M + R | M | level 2 + 3 |
| 1320 | −A(TAb) | Ab − Cl | V + M + R | M | level 2 + 3 |

Therefore, the SRS rule for group 1 clause (verb) can be summarized as:

Level 1 (prototypical) case—both S and O are Cn, O is Cl, then verb is P, and
(a) if S is A, then clause is P;
(b) if S is not A, then S is TCn, and clause is V.

Level 2 (concrete-abstract) case—at least one of S and O is Ab, then clause and verb are M, and
(a) if S is not A, then S is TCn or TAb, clause is V;
(b) if both S and O are Ab, then S is TAb, clause is M and V or R, verb is M.

level 3 (collocation) case—O is not Cl, then clause and verb are M, and
(a) if O is Cn, then verb is E or M;
(b) if S is not A, then S is TCn or TAb, and clause is V;
(c) if S is not A, O is not Cn, then S is TCn or TAb, and clause is M and V or R.

The three-level rule works as follows: the clause first passes through level 1 test (both S and O are Cn, and O is Cl), if it satisfies the test, then get the result and return; otherwise it passes through the level 2 test (at least one of S and O is Ab), if it satisfies the test, then get the result and pass through level 3 test (O is not Cl), or it doesn't satisfy the level 2 test, then it passes through level 3 test directly; after the level 2 plus level 3 test, or level 3 test alone, combine the results and return. A programmer has the option to use either the rule or the above table to do the semantic processing. However, a close examination reveals that the stated rule can also apply to other groups of clause/verb, with necessary adjustments. In fact, the three level process—prototypical, concrete-abstract, and collocation—is the fundamental semantic rule of structure for all clauses/verbs, including static ones and one-argument ones.

The third point to be noted is, as usual, there are minor exceptions, many are in the collocation area. Fourth, clauses (verbs) with prototypical abstract argument, such as communication clause (verb) or event clause (verb), are generally un-suitable to be replaced directly with concrete noun argument, even metaphorically, as shown in FIG. 6/2, group 2, where most cases are rare. One way to treat them is as exceptions, i.e. as special clause/verb. But clearly each NL has its specific ways to treat them, which belong to each linguistics and so the embodiment also collects these linguistic results in the SRS database to help IE processing. As an example, English uses 'about' to introduce or mark an abstract matter; so in "I told him about her", the preposition phrase 'about her' is being marked as an event to satisfy the structure requirement of the verb 'tell'. A similar construction exists in Chinese. Fifth, similarly, in some relation clauses, the two related arguments should be of equal status in prototypical form, such as both are concrete nouns or abstract nouns. When un-equal status occurs in the arguments of a relation clause requiring equal status, it becomes non-prototypical and signals special rules are required to consult for resolving its semantic meaning. For example, in COMPARISON clause such as, "Her car is bigger than his", a possessive pronoun is used to substitute the possessed noun.

Although the Semantic Code Group (SCG) introduced in [1138] concerns mainly with the semantic association of concrete nouns, when working with verbs to form clauses, nouns in a particular SCG often share the same collocation relation with a particular verb, including collocation with supplementary arguments. Therefore, the database for SCGs and the SRS database can be combined or work closely together.

9.5 Synonymous Variation

The fourth variations of the prototypical clause are the synonymous ones. Synonymous variation is also one of the innovations of the embodiment and it is a very broad variation. The other three variations—time, usage, and structure—refer to the same verb (C/V code) and its collocated arguments, hence they are more like syntactic variation. Synonymous variation refers to both synonymous verbs and synonymous clauses, both are extended application of the family resemblance phenomenon, hence they are basically semantic variation. There is a database called SYNONYMOUS CLAUSE LIST (SCL) in the embodiment, which collects a verb's synonymous clauses with synonymous features. The SCL database is language specific, hence it exists in the respective NL module.

Examples of Synonymous Variation. There are already many examples of the fourth variation given in the above presentation. For example, the state clauses "She is sleeping" and "She is asleep" are synonymous. Another example, the two different types of clauses "He is courageous" and "He has courage" are synonymous; here is an additional one, "He is a courageous man", or even with a synonymous adjective as "He is brave", etc. This example points to an important subject on the conversion between synonymous clauses—here, a conversion due to a word's different derived POS use. Likewise, verbs of different stem also make synonymous clauses, such as in "He cut the bread into slices1" and "He sliced2 the bread". Note that 'bread' and 'slices1' form a PART-WHOLE relationship which is a source of many kinds of synonymous clauses. A further example is "He kicked the man's leg" and "He kicked the man at his leg"—another example of synonymous clause conversion due to word's PART-WHOLE relationship. A similar case is POSSESSION relation, such as the two clauses, "He stole her money" and "He stole money from her". Note that the above two cases are also structure variations. There is indeed vagueness between some structure variation and synonymous variation, such as the examples in paragraphs [1934] and [1935]: "He opened the door with the key" and "He used the key to open the door". Idiomatic construction is another source of synonymous clauses, such as "He killed himself" and "He committed suicide."

Paraphrasing Clause. Perhaps the broadest group of synonymous clauses is the paraphrasing one, including metaphorical constructions. For example, the simple clause "He is a teacher" can be paraphrased as "His job/profession is teaching", "He is in teaching job/profession", "He works as a teacher", "He teaches [in the school]", etc. They are all synonymous and yet expressed in different constructions (i.e. in different clause label or verb), in different manner and flavor, and in different degree of resemblance. Another significant example is that of 'verb pair', such as the pair 'give/receive' in "A gave a book to B/B received a book from A". A further significant example is in the use of T or C argument. For example, the T argument as manner: "He opened the door with great force." can be paraphrased as "He opened the door forcefully." However, all these differences can be captured by synonymy code, i.e., by feature set. And some features are generated by arguments' relations in the taxonomy tree (inheritance) or meronymy tree (part-whole), by their intrinsic and attached properties, by their object-property-adjective triads, by their derived property nouns, etc. The embodiment designs the fourth variation both by the feature set and by collections such as idiomatic constructions. Like word's synonymy, clause synonymy has many language-specific features, hence synonymous clauses are collected in a SCL database for respective NLs.

10 From Clause to More Complicated Sentence

This section does not refer to any particular figure. Clauses (Simple sentences) are building blocks for more complicated sentences, and also for bigger text structures outside sentence arena. There are two basic types of build-up: compound (parallel) and complex (subordinate). As this subject is well studied in linguistics and in writing courses, a detailed presentation is omitted here. For the embodiment, the following presentation is important.

MARKER system. Up to now, only words and clauses are presented. The term 'language unit (LU)' is occasionally used (see [1006]) but without specific definition. The embodiment defines LU in NLs as words and any meaningful combination of words identifiable with markers. However, it is important to note that, except prepositions and conjunctions, marker words are not well defined and hence not designed in GL—they exist in respective NL only. That is, in the Interlingua, since a text is in computer code, all LUs are automatically identified by their data type. For the purpose of the presentation of this section, LU ranges from word to phrase then to clause, where phrase includes noun phrase and adjective phrase. Note that verb phrase and adverb phrase are not used since verb is a sentence label and adverb is absorbed into the ADVERB feature set. In other words, a sentence is made of meaningful combinations of words, noun and adjective phrases, and clauses, which in respective NL are identified by markers. Therefore, the embodiment considers markers as an integral part of NL and thereby should be used as an essential tool for the input module program to be presented later. However, due to the language realities set out by the seven causes of ambiguity in section 0, the marker system of any NL is never able to be perfect, thereby making computer processing of NL so much intractable and being the main task of the embodiment.

Markers and Marker Words. For convenience of presentation, markers and marker words in NLs are presented here instead of in Part III. Markers have many types and some are language-specific: (1) marker words, including word's inflections; (2) affix or affix words; (3) implicit marker, such as a word's POS type which is recognized by the language user's knowledge of the word and recorded in the GL; (4) punctuation marks, such as period which is almost universally adopted as a sentence marker; (5) position, for example, adjective in English is in front of its modified noun but reversely in French; (6) empty marker, due to omission, such as 'that' omission; and (7) others, such as 'space' to separate words in English but lacking in Chinese. Note that markers/marker words can be ambiguous, i.e. the same marker word can serve for different language units—multiple uses, such as 'of' in English, which can be both an argument marker and an adjective phrase marker. Therefore, marker words, like other LUs, also have ambiguity problems.

Conjunctions. As presented in above, marker words are not designed in GL but in IE, except for prepositions and conjunctions which are universal and hence designed in GL. Most conjunctions are used to connect any same type of LUs, especially the two basic ones—'and' and 'or'. As such, if there exist ambiguities in LUs, conjunctions may not provide much help in disambiguation in computer processing. Since the number of conjunctions is small, less than a hundred, hence their classification is quite easy, especially for LUs lower than clause. When used for clauses, there is also a little complication, that is, to add some semantic considerations, such as cause and effect, pre and post conditions, etc. Thus conjunctions can connect clauses to create semantic-rich compound sentences.

The markers for adjective phrase, and hence also for complex sentence, are not universal. For example, Chinese doesn't have relative pronouns. Therefore, as indicated above, they are not designed in GL of Interlingua, but in IE of respective NLs. However, it is important to note that, as language-specific as these markers are, the use of adjective phrase is universal, i.e., it is a tool for NLs to make expressions compact and focused. Unfortunately, making compact is also creating ambiguity, and adjective phrase disambiguation is a major task in MT.

Part II Interlingua Machine Translation System

1 Application of Interlingua

Besides being used for MT, Interlingua itself has many applications. The simplest one is to use its lexicon to build a multimedia electronic mono-lingual dictionary where its classification code, especially its taxonomy code, serves as a foundation to replace the traditional indexing method such as alphabetical order. And its meronomy code serves as the basis for a pictorial representation of objects, i.e. exploded view of parts and constructions of objects. And its synonymy code on the side of respective NLs serves the need to learn word in all its synonyms, and its family-resemblance design of classification trees, especially for concrete nouns, serves as a logic way to learn related words.

More usefully, the lexicon can be used as a multi-lingual electronic dictionary where words are arranged and matched by classification. A hidden advantage of this application is that a bi-lingual dictionary of any language pair incorporated in the IL system can be generated automatically. Secondly, Interlingua can be used to build a writing/editor tool based on IG. A third application is to do internet-based multimedia and interactive teaching/learning of languages based on IG. The advantage is that the teaching/learning materials are prepared in Interlingua format (code) only once, then they are used for teaching/learning any languages in the system. Also, a grammar guided by IG provides students a unified and systematic view of languages, whether of mother tongue or foreign. In other words, a student learning a foreign language will be able to avoid the confusion or even shock caused by a different NL grammar. But possibly the most interesting application is to build a semantic search engine in internet, mono-lingual and multi-lingual, based on the Interlingua representation with its built-in semantic information and the IG.

Referring to FIG. 7, for Interlingua to be used for its full potential, it needs a computer program to first convert a source language (SL) text ST into its Interlingua representation—this part of the related system is called the input module of SL. Again, the input module itself has many applications. For example, it can be used to build an enhanced editor tool where assistance at semantic level can be provided. Other applications include computer learning, automatic abstracting, and enhancing the accuracy of optical-character-recognition (OCR) program and voice-recognition (VOR) program (for the OCR and VOR use, the input module program works mainly as a disambiguation tool to enhance the accuracy). Of course, with a corresponding output module for a target language (TL) added (which is much easier to build than input module), i.e. a computer program to generate a TL text TT from any 'text' of Interlingua representation ('Interlingua text'), a MT system of ST to TT via the Interlingua as an intermediate is provided. If there are n NLs incorporated in this MT system, i.e. all have input and output modules ready, then the system can do translation between any two of the n NLs in both directions. After equipping with appropriate input and output devices, a complete n-language Interlingua MT system is built. FIG. 7 gives a schematic diagram of such a system, wherein input devices (means) include computer keyboard to type in text, scanner with OCR software to scan in and recognize text, microphone to receive speech and to use VOR software to recognize its text, and internet connection to download text; and output devices (means) include printer to print out text, computer screen to display text, internet connection to transmit text to the web, and speaker to broadcast speech synthesized by software from the text. The program part of the system, including the Interlingua and the IG, is called Interlingua Engine (IE) and presented in Part III.

2 Six Parties of Communication

Before designing the IE, it needs first to specify what elements, or parties, are involved in a MT program. In a simple one language communication (in written form), there are six parties involved: the two sides—the writer (W1) and the reader (R2), the content (C3), the language (L4), the knowledge (K5) and the context (C6). For example, when W1, using English (L4), wrote the sentence "He ate the apple" (C3) to R2, both W1 and R2 have to have the knowledge of what 'apple' is (K5), and they have to know which apple is being talked about (C6). If R2 doesn't know what and which 'apple' is, the communication fails. Hence K5 and C2 are essential to a successful communication. K5 contains the static information that already exists before the communication, while C3 and C6 contain the dynamic information that occurs with the communication—C3 is the content of the communication itself, C6 is the information generated, or derived, from C3. For example, if the previous sentence becomes "He ate his lunch", then both C3 and C6 changed, where, for C6, it can be deduced that he was not hungry, etc.

Knowledge Databases. There is a question: how wide or deep the knowledge K5 needs to be? The present embodiment designs the knowledge database (K5) in four levels. The first level consists of the essential information about objects in the world—mainly their intrinsic properties or attributes and semantic relations (see Semantic Code Groups in [1134])—call it COMMON SENSE database. The second level consists of the information and variations of language not listed in the lexicon and IG, such as idioms, quotations, customs, cultural things (including attached properties), etc, call it CULTURAL database. The third level is the ENCYCLOPEDIC database, mainly comprising events (historical, social, cultural, national, international, etc.) and proper nouns (of people and geography, etc.). The fourth level is the various PROFESSIONAL databases in each discipline or field. These databases are called on whenever needed, especially during the semantic analysis stage. Note that the design of knowledge databases in the embodiment is Interlingua based so that they can be used for all NLs in the Interlingua system.

Three Build-up Databases. If W1 and R2 use different NLs, L4 splits into L4-1 and L4-2; in between there needs the MT program, otherwise the communication is blocked. For the purpose of presentation, W1 and L4-1 combines into the ST, and R2 and L4-2 combines into the TT. For IM of MT, C3 equals the Interlingua text, since it is a common representation. K5 is basically the same except for the CULTURAL databases. It is advantageous, and also for the purpose of the embodiment, that the CULTURAL database of a particular NL be adapted into part of the lexicon of that NL. Lastly, there are three temporary build-up databases associated with the running of the program, which account for the context C6: the first one is the ROLE database which records all the arguments, especially concrete nouns, occurred in the text; the second one is the AMBIGUITY database which records, step by step, the ambiguities resolved in each step and to be resolved in later steps; the third one is the SEQUENCE database which records the relationship between and among sentences and arguments.

3 Preparation of Lexicon and Grammar

With the six parties in MT identified, various knowledge databases prepared, and the Interlingua and IG established, the remaining thing before programming the input modules and output modules for each NL to be included in the MT system is to prepare the matching lexicon and grammar of the NLs. For the DT method of MT, these jobs are repeated for each translating pair of NLs. Also, bilingual lexicon has a fundamental weakness: word senses cannot match exactly, especially in different uses. However, with 1M, things become simplified and regularized. First, one of the two NLs is always the Interlingua. Hence the lexicon of each NL is 'matched' to the lexicon of IL, mainly the GL, once for all, independent of any other NL, i.e. no need to repeat pair-wise matching for each bi-lingual lexicon. And matching of words between NLs is helped by features. Similarly, since the IG is a super-ordinate set of all NLs, the grammar (i.e. the construction of sentences) of each NLs is also 'matched' to the IG through the CL-STR feature and CLAUSE STRUCTURE LIST once for all, independent of any other NL. This two processes are standardized, even better, only the respective language is involved and the work of building the NL lexicon and related databases is done with software tools so that a person who is skilled in one's own language can do the job easily and efficiently.

Compiling the Lexicon of Each NL. Referring to Part I, the process of compiling the lexicon of the respective NL can be briefly summarized as: with a lexicon-compiling software tool running and using the respective language's mono-lingual dictionary as a reference or guide, for each word and for each sense, match it to the GL, i.e. assign it the corresponding classification code—most time this process is semi-automatic, i.e. the language worker just click on the identified node of the relevant tree shown on the computer screen and the related code is automatically assigned by the computer. If there are particular features, fill them in. Several details are to be noted in the following.

(1) The description of the nodes shown on the screen is in a popular language, for example English, which is already in the Interlingua system. So the language worker initially has to have the knowledge of an existing descriptive language. However, this knowledge is not as rigorous as required for a bi-lingual lexicographer. Also, later on when the first draft of the input module is done, the description can be converted into that NL for the benefit of later improvement.

(2) Since dictionaries list word's senses by the order of their frequency-of-occurrence, this order is to be preserved in that language's master index which is simultaneously compiled by the working software tool. This is the initial sense order which will be continuously refined by statistics on the accumulated corpus of the language's data, including refining the weight of each sense.

(3) Every sense can be one of four cases as prototypical, extended, metaphoric, and multiple use and is so indicated. The first three cases are generally assigned the same classification code of the prototypical case, otherwise it is the fourth case and assigned different code, since it is treated as a different word from the prototypical one. Note that extended and metaphoric senses are listed for popular and fixed ones, then they are similar to multiple use and can be optionally treated as such.

(4) For those words not designed in GL, if they are derived words, see related presentation in Part I—that is, derived word is generally assigned the same code as its stem word and then listed under a virtual node of its POS tree with its sense featurized, otherwise it is a case of multiple use; if they are marker words, they are generally programmed directly in the module program.

(5) After initial dictionary work is finished, check with the GL trees of the IL to see whether there are empty nodes, then translate the nodes into phrases or coin new words; or check the GL trees of the NL to see whether there are nodes with multiple words, then prepare its synonymy feature set.

Compiling the IG databases. After the lexicon compiling job, the clause part of the grammar of respective NL is 'compiled' in accordance to IG's specification. There are four types of main databases for the clause grammar. The first is the Clause Structure List (CSL) database which, in addition to the CL-STR feature, includes the TIME, SPACE, ADVERB, and USAGE features as subsets (see [1954]). This work is also aided with a software tool and hence semi-automatic, i.e. the structure variations can be initially generated by the computer for the language worker to make the selection. The second is the Semantic Rule of Structure (SRS) database with the 'collocation' features (see subsection 9.4) and the Semantic Code Group (SCG) database (see [1943])—the two databases are mostly language-universal and hence the work of the respective NL is focused on exceptions of that NL. The third is the Synonymous Clause List (SCL) database (see [1951]). Note that the synonymous clause feature set and the corresponding clause structures are language-specific. The fourth is the database for the Metaphor Processing Procedures (MPP) (see [1811]) which is generally language-universal and the work is on language-specific adjustment.

In addition, some useful phrases, such as idioms, are also compiled into phrase databases and converted into Interlingua representation. The conversion process needs human intervention since many phrases are metaphorical. Most of the remaining part of the grammar, the NL grammar part, such as word agreements for inflectional NLs, is programmed into the respective input and output module program.

Part III Interlingua Engine

1 Input Module

Traditionally, the input part of Interlingua Engine (IE) is at the heart of the problem in MT. What makes the input part so intractable is the ambiguity problem which permeates all NLs. Here ambiguity is taken for its broad sense, i.e., including ambiguities caused by the phenomena summarized in the seven causes of ambiguity on vagueness, multiple-use, compactness, and exception (see Part I, section 0). Therefore, in a broad sense, disambiguation or programming the input module, is the main job of IE. If the input module of a source language SL does its job perfectly, i.e. produces an Interlingua 'text' free of ambiguity, then the output module of a target language TL simply converts the Interlingua 'text' into TL text in a 1-to-1 correspondence manner. Otherwise, if there are some ambiguities remaining, then the output module of TL either produces all the ambiguous possibilities or chooses those possibilities above a preset threshold of weight.

2 General Framework for Programming the Input Module

Despite the language-specific nature of programming the input modules of NLs, the present embodiment still can provide a general framework for the programming of all NLs because of the Interlingua approach and the design of the GL and IG shown above. Also, the general framework separates out the minor irregularities from the majority of regularities, while the DT approach mixes the two and hence bogs down by the minor irregularities. Similarly, the embodiment treats the syntactic and semantic division in a graded way, while the DT approach is confused with the issue. More profoundly, the embodiment treats the grammars of NLs, hence the programming of their input modules, as consisting of three levels—syntactic, semantic and pragmatic. Therefore, in analyzing a sentence by the input module, the first step is to check its syntactic correctness, then to check its semantic reasonableness, lastly to check its pragmatic plausibility. The pragmatic information is saved for use by the output module. At the end of input processing, the source language text is transformed or converted into the Interlingua 'text', i.e., a coded representation of words and sentences in Interlingua format with a rich set of supplementary information produced during the transformation process, including the three supplementary databases.

FIG. 8 is a flow chart showing the general framework of the IE. The following is a description of the program flow.

3 Description of the Program Flow of the Input module 3.0 General Remark

First, programming is an art. For example, a skilled programmer can always choose whether the program is in a breadth-first way or depth-first way, or the two ways are used in a mixed manner. For another example, the program flow can choose 'GO TO' or 'IF THEN' or 'DO CASE' or, if the selection is in a long list, use list matching via databases. So the following program flow is for presentation only, its purpose is to give skilled programmers the program logic, i.e. the algorithm, and then they will decide how to design the program flow in their own optimal choosing.

Second, a programmer for IE needs to recognize that, at every step of every stage of the input module, there invariably exists ambiguities—ambiguities because of multiple use, vagueness, sharing of one form, omission, exception, and so on; therefore, disambiguation is the key to the success of the program. However, this framework shows that, by taking advantage of the Interlingua representation, the majority of disambiguation works are handled in a unified and standard manner. Also, ambiguities are featurized as much as possible, such as synonymy feature, so that they are collected by language workers into databases and the programmers are separated from the detailed language work.

Third, a programmer needs to recognize that, to do disambiguation, it often needs extra-sentential information, including static one from the knowledge databases and dynamic one from the three supplementary databases—ROLE, AMBIGUITY, and SEQUENCE databases mentioned in [2203]—which are built up through the process of analyzing the input text.

Fourth, individual or language specific disambiguation works can be handled by the exception handling mechanism of C++. Therefore, for the sake of brevity, disambiguation procedure of such cases is omitted in the presentation. It is important to note that the whole programming itself is oriented and designed toward disambiguation, especially syntactic and semantic disambiguation at the sentence level that are the central themes of the fourth and fifth stages in the following presentation of the framework. Therefore, for universal disambiguation cases, the information needed for disambiguation are stored in the lexicons, in the CL-STR feature set and Clause Structure List database of IG, in the knowledge databases which are already compiled, in the three build-up databases which are built up during the input analysis process, etc.

Lastly, a programmer only needs to concentrate on the program logic and flow, and leaves all the language detail to the grammarians and/or linguists, this is the gist of the framework of the IE.

3.1 Stage One—Initialization

For the purpose of the framework and by the convention of object oriented programming (OOP) such as C++, this stage defines a virtual function, Initialization( ). Besides the standard initialization procedures contained in Initialization( ), such as loading various databases of lexicons and IG, and/or databases of common sense, cultural, encyclopedic, and professional, etc., if needed, the embodiment includes the initialization of the three supplementary databases.

3.2 Stage Two—Word Level Processing

Virtual functions Word_Analysis( ) and Lexical_Analysis ( ) are defined in the framework for this stage. There are also language specific functions, such as, for example for English, Morphological_Analysis( ) which includes Inflection_Processing( ) and Affix_Processing( ).

This stage includes, for example for English, morphological analysis such as inflections and affix processing and lexical analysis such as loading lexical information from lexicon and checking idiomatic uses. These virtual functions are hence specified, i.e. over-loaded, in the input module of each NL. Affix processing is itself a very involved subject of the embodiment (see section 6.2 of Part I). It is also part of the larger subject of the derived word processing. Also included are processing numbers, punctuations, proper nouns, etc. and they are all defined and programmed as much as possible in the framework, and if necessary they can be 'over-loaded' in the input modules of respective NLs.

One innovation of the embodiment is the treatment of high frequency word (HFW) which includes all functional words. HFWs, besides functional words, are recognized by the embodiment as to be able to act as very useful supplementary markers, so as to be better to reside in the internal memory (RAM) to aid processing efficiency. But note that a particular HFW may still have lexical ambiguities—again the language reality, although of minor significance.

At the end of this stage, all HFWs are identified and loaded into memory and all other words have their lexical information of each sense loaded into memory, and all are made initial disambiguation as much as possible. Therefore, for un-ambiguous words or words with only one sense having weight above a preset threshold, they are replaced by their corresponding Interlingua code. Known phrases, such as idioms, are identified and converted into Interlingua code as much as possible. Also, during the lexical analysis, some information on the features of TIME, SPACE, ADVERB, USAGE, etc. are starting to be generated, and they are recorded in related feature sets accordingly. If there are unresolved ambiguities, they are recorded in the AMBIGUITY database to be resolved in later stages.

3.3 Stage Three—Phrase Level Processing

The concept and use of markers to identify and mark out phrases in this stage, as an universal way, are an important innovation of the embodiment, thereby making phrasal processing systematic and standardized for all NLs. The grammarians and/or linguists provide the programmers the list of and information about markers for noun phrases, adjective phrases, and clauses (see [1962]-[1965]).

It is important to note that clauses, together with phrases, are also identified and marked as much as possible in this stage. In fact, the embodiment marks clauses first, since their markers (conjunctions) are the least ambiguous (the most troublesome conjunctions are the empty or omitted ones), then the adjective phrases are marked, lastly marked are the noun phrases which are the most troublesome ones since the noun phrases for argument normally do not have other markers besides noun's own POS. In the process, unresolved ambiguous words from previous stage are further disambiguated as much as possible.

At the end of this stage, most sentences are able to have all words identified properly, phrases (including clauses) marked and features recorded—the reason is simple: if a text has too many hard-to-resolve ambiguities, it loses its communication effectiveness and becomes an art, like poem. The remaining sentences have unresolved ambiguities of words and phrases, and they are disambiguated step by step in the following stages.

3.4 Stage Four—Sentence Level Syntactic Processing

This subsection further refers to FIG. 9. First, for the unambiguous sentences of stage three, their sentence features (TIME, SPACE, ADVERB, USAGE, etc) are extracted and adjective phrases are marked out and then their structures are checked with the Clause Structure List (CSL) and assigned the corresponding CL-STR feature and clause code (C/V code) of IG. Afterward, they are passed to the next stage for further semantic processing.

Second, for ambiguous sentences, their syntactic disambiguation is one of the major tasks in MT. For the DT method of MT, this part is highly language-specific with respect to both NLs of the translation pair, and the programming is almost a sentence by sentence pair-wise job. For the Interlingua method of the embodiment, the task has a standardized framework for every NL and involves only one NL at a time. The framework uses mainly the CSL database to check the sentence structure and is summarized briefly in the following for those ambiguous sentences not involving sentence conjunctions, i.e. for clauses with possible subordinate clauses only (for sentences involving sentence conjunctions, add an extra level of conjunction disambiguation). So in the following presentation, the word 'sentence' is close to 'clause' and it is so used interchangeably, i.e. no attempt is made to clarify the difference.

An ambiguous sentence not involving sentence conjunctions, after features (TIME, SPACE, ADVERB, USAGE, etc.) extracted, non-content words processed, and adjective phrases marked off, consists mainly of nouns and verbs. If not for the reason that there are possible unidentified subordinate clauses, mainly caused by missing markers but may have other causes which are language-specific, the disambiguation task would be a much simpler procedure of eliminating illegal combinations. The following gives a closer look.

Let w[i], i=1 to w, be the words of such an ambiguous sentence A (note that the marked-off words, except the prepositions, are omitted), let w[i][j] be the un-resolved senses of w[i] with its number of senses=s[i]. If from each word w[i], pick a sense w[i][j] to form a possible sentence combination, then there are a total Tw=s[1]×s[2]×s[3]× . . . ×s[w] possible sentences. Such a candidate sentence looks like At below, t=1 to Tw, where the subscript [.] means 'one of the sense numbers':

$$At=\{w[1][.], w[2][.], w[3][.], \ldots, w[w][.]\}$$

It should not be alarmed, as many researchers in natural language processing like to say, that Tw can be exponentially large. The present framework teaches that disambiguation steps are taken at every opportunity afforded by the NL concerned. So when processing reaches stage four, there should not remain too many hard-to-resolve syntactic (and some semantic) ambiguities lest it lose communication effectiveness, so Tw should usually be manageable. So what really makes the input program difficult is semantic processing in the next stage—a stage often neglected, or confused with the present syntactic processing, by the DT method. The current stage of syntactic processing is to prepare grounds for the following semantic one. Coupled with the way the lexicons are organized in the embodiment, these two stages are clarified and should work together closely. Nevertheless whether Tw is large or small, the accompanied program flow of subroutine in FIG. 9 is a straightforward procedure to check various At combinations to make out possible legal sentence structures. Since all w[i][j] are weighted, At can also be weighted and are assumed to be listed from highest weight to lowest weight. The next paragraph [3346] gives a brief step-by-step explanation of the program flow. Note that in the program steps, words after '//' are for comments—a C++ convention.

Explanation of FIG. 9: subroutine to check various At combinations to make out possible legal sentence structures.

001 For each At, do:
002 If no more At to process, stop and exit the procedure.
003 Otherwise, if the weight of At is below a pre-set threshold, stop and exit the procedure.
004 Otherwise, let n=number of verb candidates in At.
005 If n=0, then return 'noun phrase fragment' and go to 002 for next At.
006 Otherwise, for each verb candidate Vij=w[i][j],
007 if no more Vij, go to 002 for next At.
008 Otherwise, make Vij the main verb and the other verbs either the verb of a subordinate clause or an E clause;
  //Note that if a subordinate clause is formed, it is usually an adjective phrase.
  //If so, then it is marked off. For E clause, most often it is an effect clause,
  //or a serial verb clause, or in some special sentence constructions such as
  //communication clause.
009 call up the corresponding CSL of the verb and compare with the so formed sentence Sij to see whether there is a match.
  //Note that the main verb controls the structure of the sentence.
010 If there is no match, delete the sentence and go to 007 for next verb candidate.
  //The program can set up an option to pre-set the number of verb candidates being
  //allowed to process. If the number is over the set one, then delete At and go to
  //next At. This option is not shown here.
011 Otherwise, there is a match, then assign the sentence the corresponding CL-STR feature and CN code of IG, calculate its degree of match as a weight (may be different from the previous one depending on weighting method used), convert all words (with the identified senses) into IL codes, and pass the result to the next stage for further semantic processing, together with all the information about features already gathered in the previous stages; then go to 007 for next Vij.
  //Note that each successful run creates a weighted sentence candidate and the list
  //of them, if more than one member, is disambiguated in later stages.

After the subroutine procedure, most {At} list will be reduced to a single candidate sentence above a set threshold weight. Some have multiple candidates. They all have to pass through the next stage which not only to disambiguate the lists with multiple candidates, but more importantly to check the proper semantic meaning for all sentences.

3.5 Stage Five—Sentence Level Semantic Processing

This subsection further refers to FIG. 10. In the previous stage, each list of weighted sentence candidates is of syntactically correct ones. Most lists in that stage are reduced to only one candidate. But whether a list is of single member or multiple members, they are all checked for their semantic correctness and hence semantic meaning in this stage, and for multiple-member lists they are usually disambiguated into single member ones. Below is a brief summary of the process shown in the accompanied flow chart of FIG. 10.

This paragraph is a step-by-step explanation of the flow chart in FIG. 10:

101 For each sentence candidate S:
102 If no more sentence candidate to process, stop and exit the procedure.
103 Otherwise, do CASE of C/V code:
  //Note that the order of the cases and how many cases listed in this level are
  //important for program efficiency and are somewhat language specific,
  //shown here are just the usual ones for demonstration.
104 Case of C/V code is property sentence, then check the object-property-adjective triad between the classification codes (CCs) of the head words of the argument and the adjective phrase.
  If there is a match, then go to 120 'Normal Procedure' (NP) for further processing.
  Otherwise, the triad is a miss-match, then go to 130 'Metaphor Processing Procedure' (MPP) for further processing.
    //Note that, 'head word of the argument' here means just the concerned w[i][j] in
    //noun sense. Also, although all adjective phrases are marked off, they are still
    //available for processing.
105 Case of C/V code is for state sentence, then check the collocation between the CCs of the head words of the argument and the verb-adjective (see [1702]).
  If collocation is satisfied, then go to 120 NP for further processing.
  Otherwise, collocation is not satisfied, then go to 130 MPP for further processing.
  //Note that the state sentence is intimately related with the TIME feature and very
  //much language specific. Hence the above presentation is a general outline.
106 Case of C/V code is for relation sentence, then check the relationship between the two arguments.
  If the CCs of the head words of the two arguments match with a particular relationship, then go to 120 NP for further processing.
  Otherwise, the two arguments don't match with the relationship, then go to 130 MPP for further processing.
107 Case of C/V code is for one-argument dynamic sentence, then check collocation between the CCs of the head words of the verb and the argument.
  If collocation is a match, then go to 120 NP for further processing.
  Otherwise, collocation doesn't match, then go to 130 MPP for further processing.
108 Case of C/V code is for two-argument dynamic sentence, then check collocation among the C/V code and the CCs of the head words of the verb and the two arguments.
  If collocation is a match, then go to 120 NP for further processing.
  Otherwise, collocation doesn't match, then go to 130 MPP for further processing.
109 Case of C/V code is for special sentence, then go to 110 'Special Sentence Procedure' for further processing.
110 'Special Sentence Procedure': Use the particular procedure of handling the special sentence concerned to check its semantic correctness. Afterward go to 102 for next sentence candidate.
  //Note that each special sentence has its own semantic handling procedure. Detail is
  //omitted in the presentation.
120 'Normal Procedure': Assign the sentence the feature NORMAL, adjust its weight (higher for NORMAL case), store all information such as features, and then go to 102 for next sentence candidate.
130 'Metaphor Processing Procedure': Assign the sentence the feature METAPHOR, adjust its weight (lower for METAPHOR case), use 'Metaphor Processing Procedure' to seek the semantic meaning of the verb and the sense of the argument, and then go to 102 for next sentence candidate.

For simplification of presentation, this program flow doesn't show the detail of every procedure to check the verb (C/V code) with its arguments. Also the special sentence case is a catch-all one—sentences belong to this category are somewhat language specific, but their total number is comparatively small. Also note that, as mentioned in [3342], sentences here do not involve sentence conjunctions for simplifying presentation, so that each sentence has one C/V code, i.e. they are like clauses.

However, the above program is very simplified. The checking of C/V code with the CC (s) of the argument (s), including the CC of adjective, actually has three main parts, one is the normal collocation part, another two are the concrete-abstract replacement part and the variational structure part shown in FIG. 6, principally for two-argument dynamic clause. The Semantic Rule of Structure (SRS) of the dynamic clause in [1942] is the basis to check and determine the meaning of the dynamic clause. If the rule is not very complicated, then the above program can simply use the 'IF THEN' or 'DO CASE' procedure to follow the rule. That is, for example, for the group 1 clauses of FIG. 6, which corresponds to step 108 of the above program, an expanded step 108 could go like the steps shown in Group 1 of FIG. 6. However, as described in [1942] and [1943], since the collocation requirement can be detailed to individual verbs and hence normally stored in the SRS database, the program in practice uses database matching to do the semantic checking more efficiently. A side advantage of using database matching is that many semantic information are also stored in the SRS database (plus the SCG database, see [1138] and [1943]), which means that after this semantic processing stage, each sentence has acquired enough semantic information to have its meaning fully explicated.

3.6 Stage Six—Sentence Level Pragmatic Processing

For most sentences this stage is not needed. But there are cases that pragmatic processing is needed, such as missing arguments, unresolved anaphora, etc. Their resolution also depends on the information stored in the three supplementary databases, especially the ROLE database. Note that after the problem is resolved, the related arguments or referents are not inserted into the sentence directly but are only linked to, so as to preserve the style of the source text (ST). They are used for the target text (TT) generation and rhetoric processing of the output module.

An important job of this stage is to check the consistency of the TIME and SPACE factors, which are stored in the TIME and SPACE feature sets of each sentences. Note that there are normally three kinds of TIME and SPACE references: the global or background one, the outside sentence one, and the inside sentence one. After this stage, the ST is processed into an interlingua representation and saved as an Interlingua 'text', together with all related information including the three supplementary databases. This completes the input module part.

4 Description of the Program Flow of the Output Module 4.1 Stage Seven—Target Text Generation As stated before, if there is no ambiguity, then the target text (TT) generation is a routine procedure of converting the Interlingua text into the TT, because the matching of Interlingua codes to words and phrases of any NL is in a 1-to-1 correspondence. If there still are ambiguities in the Interlingua 'text' (for example, because there is not enough context information), then the TT either produces all the ambiguous possibilities or chooses those possibilities above a preset threshold, normally chooses the top weighted one.

Nevertheless, no matter whether there are ambiguities or not, the above TT generation is very coarse and straightforward. It produces texts which give reader a dry reading. This is because the 1-to-1 correspondence only produces a result in standard format of Interlingua representation. However, in the course of processing the ST, many supplementary information are produced and recorded in various places. First, many words have synonyms, the actual corresponding words used in the TT are carefully selected by consulting with their synonymy features in both the ST and the TT (see also [1364]). Second, although the TIME, SPACE, ADVERB, and USAGE features are already used to produce the standard format TT, they can still be referenced later in adjusting the TT.

To adjust the style of the TT, the CL-STR feature and the CSL of the TL are used, which preserves the stylistic information of the ST and transfers to the TT. After the adjustment, the TT is ready for output since all sentences are translated as close to the ST as possible. This is also where the DT method of MT terminates processing.

4.2 Stage Eight—Rhetoric Processing

Unlike the DT method of MT, the embodiment has resources and ability to do rhetoric processing of the TT. It has many resources which are stored in the many databases presented above and linked by the TT as a result of the foregoing processing. The most useful information to adjust the sentences in TT is stored in the SCL database which is very rich in semantic information (see [1951] and [1953]), just like the word is adjusted by its synonymy code and feature set (see section 1.3 of Part I for noun word). Additionally, the design of the GL, not like the traditional dictionary, can also contribute to the rhetoric processing. The embodiment has ability to do rhetoric processing because the three built-up supplementary databases, especially the SEQUENCE database, carry the structural information of the ST. Also, the various feature sets, especially the TIME and SPACE feature sets, can be consulted for rhetoric processing.

Pragmatic Processing (PP). As implied in [3361], PP actually belongs to the output module, but in the stage six of the input module, some works in this regard have been done, such as anaphora resolution. In the output module, PP is considered as part of the rhetoric processing. The embodiment designs the three built-up supplementary databases also partly for the purpose of coping with pragmatics, since they provide the important C6 context (see [2201]). Aided by the other information from the GL and IG databases and the knowledge databases, there are enough resources to do PP, where rules in this area are collected from research results just like rule-collection for MPP database (see [1811]). The difference is, the rules for MPP are word or sentence based, while rules for PP are text based. Another difference is, many pragmatic topics exist principally in colloquial text (speech text). The third difference between PP in input module and PP in output module is that, the former is language-independent and comes from ST directly, and the later takes account of TL environment.

After rhetoric processing, a TT is produced and the translation process for the TL is completed. Note that eventually there are three kinds of texts preserved in the Interlingua MT system: the ST, the Interlingua 'text' (IT), and the TT, where the TT has different forms for different NLs. Since all the produced information can be preserved in the computer, in particular those preserved with the IT in database format, and they are much richer than those carried by the original ST itself, hence there are abilities to do many other things, such as text summary, text filtering, semantic search, etc., some only need to be done once directly with IT.

Description—Other Embodiments

In the presentation of the first embodiment for the Interlingua part, possibilities of variations or alternatives for other embodiments are mentioned or can be envisioned. For example, in the taxonomic classification tree of concrete nouns (see FIG. 4A), the human node (node NAAAA) can be further elevated to the level just under node NAAA, 'living thing', so as to strongly emphasize the human-centric nature of NLs; or it can be put under the animal node to fit into its scientific proper position. Likewise, the classification trees of human property and attached human property are very abundant, at least for the Chinese words. As more NLs are incorporated in the Interlingua system, the trees will be optimized. In other words, when the classification trees grow into more branches, more variations can be envisioned. This applies to classifications of other POS words. The guideline is, the Interlingua trees should be universal, i.e. language-neutral, should be compact for programming efficiency of IE, and should be easy to use by linguists or language workers for compiling the lexicons of other NLs.

Similarly, there are possibilities of variations or alternatives in the compilation of IG, different from the first embodiment. For example, the class of special clause/verb in subsection 3.5 is a catch-all category. As more linguistic results available, some of the special clauses/verbs may be able to find more suitable classification nodes. Also, the boundary between the second (syntactic) level and the third (semantic) level of clause/verb classification is adjustable, see [1702] for a discussion on the collocation boundary. The guideline is, more clauses/verbs should be put under proper second (syntactic) level nodes with linguistic features and less clauses/verbs be put under the third (semantic) level nodes with semantic and synonymy features. Furthermore, the treatment of known phrases, such as idioms, can be expanded.

As already indicated in subsection 3.0 of Part III, the general framework of the IE is subject to programmer's choice, such as to process each sentence from stage one all the way to stage six in the depth-first manner, while the first embodiment presents it in a breadth-first manner; a third choice is to mix the two ways. Similar programmer's choices exist in all the stages shown. Therefore, the embodiment teaches not about programming but the logic and the algorithm of the invention as well as the essential components of the IE. One particular point is, all the data, which are voluminous, variable, and subject to update, are put into databases as much as possible. Since they are indexed, principally by an unique system of word classification code—the Interlingua representation, including the shared code between verb and clause, these databases are not only important programming tools, but themselves are having tremendous potential in other applications.

Summary of the Presentation for the Description of the Embodiments

Part I presents the Interlingua that forms the foundation of the IE (Part III) and the interlingua MT system (Part II). The Interlingua consists of its lexicon system (IL) and grammar system (IG). The core part of IL is its general lexicon (GL) where the presentation concentrates on the four main types of words: noun, adjective, verb, and adverb. Since Interlingua is to be a common representation of NLs, its GL (and IG) has to deal with the common problem in NLs of using limited symbols to represent or express on continuums, so that a bridge can be built to transform the essentially field-to-field correspondence between words of NLs into a manageable correspondence.

The first tool used is prototyping, i.e. a prototypical word or a prototypical clause is a prototypical 'point in the continuum'. Since different NL selects different prototypical points, the second tool to deal with this common problem is synonymy for word and associated feature set on the side of respective NLs. For clause, the meaning of prototype is threefold: first, for the same verb word, a family of variational clauses with variation features is defined around the prototypical clause; second, the classification code of the prototypical clause, hence its family, is shared with the verb word; third, synonymous clauses comes from many areas, including synonymous verb, syntactic or semantic variation, idiom, paraphrasing, etc. Note that the clause representation in IG includes only the various feature sets, the associated clause structures are compiled into databases on the respective NL side.

A specifically designed system of classification codes is the tool to make the GL of IL systematic, compact, and linguistic rich. This tool includes taxonomy and meronymy codes for concrete noun word, object-property-adjective triad code for the intrinsic adjective word and abstract word of property noun, and innovative three-level classification code for verb word and shared by prototypical clause in IG. And the classification of abstract noun word is also a significant innovation. Its first level classification of event noun, property noun, and concept noun gives the meanings of abstract noun a clear understanding. Similarly, the identification and classification of attached property clarify many misunderstandings in these areas. Furthermore, the inter-relationship and interchangeability between property and its value (adjective) are not only important concept, but also very useful semantic tool. Lastly, the large amount of property words related to human, noun and adjective, are often overlooked in the DT method of MT, and their classification in the embodiment is a first serious effort to get hold of them in MT or in NL processing.

And then there are derived words. For them, a system of virtual code is used on the side of IL, since different NL treat derived word differently. Not only different words can be derived from a particular word, but also different meaning can be extended from a word's prototypical meaning. However these different meanings, called extended senses in the embodiment, all share the same word and which meaning is used can only be determined in the sentence it is in. Only when a meaning become popular and thus fixed, then it is listed as a multiple sense of that word in the GL of the respective NL the word is in. Therefore a system of word senses—prototypical, extended, metaphorical, and multiple use—is established in section 8 of Part I, all on the respective NL side, and to be used in the sentence analysis by the IE in subsection 3.5 of Part III to determine the correct sense of the word. Note that whether a sense of a word is extended, fixed extended, or multiple use is sometimes subjective—they are all basically metaphorical. For the purpose of the embodiment, fixed extended sense and multiple use sense are those that have generally been collected in the GL of a NL, where the former retains a perceptible shade of its original sense and the latter does not. The extended sense in general can only be determined by using a metaphor processing procedure.

Word meaning is a serious subject in linguistics, and the embodiment deals with them in several ways. For prototypical word, its meaning is mainly carried by its classification code. Among them, the abstract noun is most interesting, for which the embodiment first classifies it into property noun, event noun, and concept noun. The first two are the basic type and their meaning becomes clear by their type. The third one, the concept noun, is built up, i.e. defined, on other existing words, including abstract nouns—a kind of recursive derivation, and its meaning is its definition. Among property nouns, the attached property noun is an innovation by the embodiment, whereby many English adjectives become apparent that they are actually noun-adjectives, such as 'muddy', 'naval', and 'wooden'. The embodiment especially points out the large number of attached property nouns related to human (see FIG. 5B), just like there are a large number of human property nouns (see FIGS. 5A and 5C).

As already mentioned, the embodiment designs the clause, the basic building block of the IG, by sharing with the verb the same classification code. This is an important innovation. First, it allows the fundamental classification of clause into property/state clause, relation clause, and dynamic clause. Second, it makes possible to separate out the feature sets of TIME, SPACE, ADVERB, and USAGE. Third, it lays ground for clarifying the prototypical clause, the non-prototypical (metaphorical) clause, and the variational clause, all are labeled by the same verb, i.e. the same code (C/V code), thereby making computer processing of clause feasible and systematic.

Among clauses, the two-argument dynamic clause is most interesting and involved, and the embodiment deals with it in detail in section 3. It first clarifies the two arguments, S and O, and specifically requires S to be agentive, even sometimes only human, thereby laying the ground for the later design of variational structure and the semantic rule of structure in section 9. Second, it carefully analyzes three syntactic features of the clause (verb), thereby designs a second level syntactic classification of this important class of clause (verb), including a {bare, packed} feature giving out the internal composition of verbs and a {action, cause-effect} feature giving out the two alternative clause structures for the same verb. Then in section 5, abstract noun as argument is introduced, and the case for two-argument dynamic clause is again focused on, thereby further laying ground for the later design of variational structure and the semantic rule of structure in section 9. In the process, collocation is introduced; and the two important databases, the CSL and the SRS, are formed. Note that they are all indexed by the verb (C/V code) and compiled for the respective NLs, although their feature sets are shared and in the IG. It is slightly different for the SCL database where the feature set is a synonymy feature and hence not necessarily shared.

Part II presents some applications of the Interlingua and the input module programs. Then the IE and the interlingua MT system are introduced. The preparation works of building the input and output modules, i.e. compiling the GL and the grammar databases for the respective NL, are noted. Part III teaches a general framework of programming for the IE, thereby shows the power of the interlingua approach. Several points are worth noting. First, the framework is clearly independent of other NLs. Second, the framework separates the linguistic work from the programming work. Third, all linguistic data are organized in database format as much as possible, making constant improving and updating possible and easy. Fourth, the framework gives the essence of the program in clearly defined stages, each stage presents its logic or algorithm for processing. A programmer has the option of choosing his own program flow.

Conclusion, Ramifications, and Scope

The first embodiment of the present invention gives a detailed description showing how to construct the interlingua lexicon and grammar, and how to construct the matching lexicon and the grammar for any NL to be incorporated in the interlingua MT system, and presents a general framework for the programming of the input and output modules of that NL. Thus an interlingua representation is clearly and completely defined and its construction is taught in this invention. With such an interlingua representation in hand, an interlingua MT system is readily to be built since the heart of the interlingua representation is geared to solving the disambiguation problem.

More than that, the embodiment also endeavors to provide many bases to do semantic analysis of the source text and rhetoric improvement of the resulting translated text. These bases include: (a) the specifically designed Interlingua lexicon wherein taxonomy and meronomy codes of concrete noun carry semantic information such as part-whole relation, possession relation, inheritance, etc.; the object-property-adjective triad code gives precise meanings of adjective and property noun; the shared code of clause and verb provides the foundation for an unified system of lexicon and grammar of Interlingua and NLs; the composition of abstract noun by event noun, property noun and concept noun makes the definition and meaning of abstract noun clear and workable; the use of virtual code (node) gives flexibility needed for the meaning of derived word; and so on, (b) the three level classification and construction of clause (verb) of Interlingua grammar, together with the feature codes of TIME, SPACE, ADVERB, USAGE, CL-STR, and SYNONYMY, where data are stored in databases, such as the CSL database, (c) the three levels of prototypical, concrete-abstract and collocation in the rule for semantic analysis of the meanings of sentence and word, where data are stored in databases, such as the SRS database, (d) the metaphor processing procedure, where data are stored in the MPP database, (e) the supplementary knowledge databases, and (f) the three build-up databases—ROLE, AMBIGUITY, and SEQUENCE.

While the description of the first embodiment contains many specificities, these should not be construed as limitations on the scope of the invention, but rather as an exemplification of one preferred embodiment thereof. Many other variations are possible. Accordingly, the scope of the invention should be determined not by the embodiment illustrated, but by the appended claims and their legal equivalents.

The invention claimed is:

1. A system for representing natural languages in a common machine-readable form, called interlingua, comprising a lexicon and a grammar, where:
   a. said lexicon comprises:
      1. a system of specifically designed classification codes for prototypical words of noun, adjective, verb, and adverb respectively,
      2. virtual codes for each kind of derived words,
      3. a system of synonymous feature set for synonymous word and metaphorical feature set for metaphorical sense of word,
   b. said grammar comprises:
      1. a system of classification code and composition for prototypical clause,
      2. a system of time feature set, space feature set, and adverb feature set,
      3. a system of variational feature set for variational clause and synonymous feature set for synonymous clause, and
      4. a system of metaphor processing procedure, and
   c. said prototypical verb word and said prototypical clause comprising said prototypical verb word share the same classification code,
   whereby a sense of a word of a language will be:
      a. matched to a unique interlingua classification code if it is prototypical, or
      b. if it is synonymous to a prototypical word then matched to the same classification code of said prototypical word plus a feature of synonymy, or
      c. if it is a derived word then matched to a virtual code plus the interlingua classification code of its stem word and a feature of derivation, or
      d. if it is a fixed extended sense then matched to an interlingua classification code of a word corresponding to said extended sense plus a feature of extension, or
      e. if it is a multiple use case then matched to an interlingua classification code of a word corresponding to said multiple use plus a feature of multiple use, or
      f. if it is used in a special clause or idiom then treated according to the corresponding rule governing said special clause or idiom respectively, and
   whereby a clause of a language will be:
      a. matched to a unique interlingua classification code of its comprised verb if both said clause and said verb are prototypical, or
      b. if said clause is variational and its comprised verb is prototypical then matched to the same interlingua classification code of its associated prototypical clause plus a feature of variation, or
      c. if said clause is prototypical and its comprised verb is not prototypical then matched to an interlingua classification code of a verb corresponding to said verb according to said verb being derived, fixed extended, or multiple use plus a corresponding feature of said verb, or
      d. if said clause is variational and its comprised verb is not prototypical then matched to an interlingua classification code of a verb corresponding to said verb according to said verb being derived, fixed extended, or multiple use plus a corresponding feature of said verb and a variational feature of said clause, or
      e. if said clause is a special clause then matched to an interlingua classification code for special clause plus a feature of special clause.

2. An interlingua system of claim 1, wherein:
   a. said prototypical noun comprises concrete noun, abstract noun, and ontological noun,
      where said abstract noun further comprises event noun, property noun, and concept noun,
         where said property noun further comprises intrinsic property noun, attached property noun, and event property noun, and
   b. said prototypical adjective, being value of said property noun, comprises intrinsic adjective, attached adjective, and event adjective.

3. An interlingua system of claim 2, wherein:
   a. said classification code for said concrete noun comprises taxonomy code denoting concrete whole object and meronomy code denoting concrete part object,
   b. said classification code for said intrinsic adjective and said attached adjective comprises a triad code of object-property-adjective, and
   c. said shared classification code for said prototypical verb and said prototypical clause comprising said prototypical verb comprises a three-level code, where:
      1. the first-level code of said three-level code is based on the fundamental prototypical clause classification of property and state clause, relation clause, and dynamic clause,
      2. the second-level code of said three-level code is based on syntactic classification, and
      3. the third-level code of said three-level code is based on semantic classification.

4. An interlingua system of claim 3, wherein said second level syntactic classification code for the one-argument dynamic clause of said prototypical dynamic clause comprises codes for prototypical clauses of change of property, change of state, and self-action, and the one argument of said prototypical change of state clause and self-action clause is prototypically agentive.

5. An interlingua system of claim 3, wherein said second level syntactic classification code for the two-argument dynamic clause of said prototypical dynamic clause comprises feature codes including features of {forward, backward}, {bare, packed}, and {action, cause-effect}, and wherein the two prototypical arguments of said prototypical two-argument dynamic clause are labeled as S and O respectively, where said S argument is agentive and said two arguments, together with the comprising verb V of said clause, correspond to the {V,S,O} typing of natural languages.

6. An interlingua system of claim 5, wherein said second level syntactic classification code for the two-argument dynamic clause of said prototypical dynamic clause further comprises codes for operation clause, social clause, communication clause, activity clause, sense clause, mental clause, and psyche clause, where:
   a. said operation clause, social clause, communication clause, and activity clause have said forward feature and said sense clause, mental clause, and psyche clause have said backward feature,
   b. prototypically, for their respective prototypical S argument:
      1. said social clause, mental clause, and psyche clause take human noun,
      2. said operation clause and sense clause take human noun and sometimes take animal noun, and
      3. said communication clause and activity clause take human noun and noun of object with human participation, and
   c. prototypically, for their respective prototypical O argument:
      1. said operation clause takes concrete noun,
      2. said social clause takes human noun,
      3. said communication clause takes event noun, with human noun and noun of object with human participation as prototypical dative argument,
      4. said activity clause and mental clause take abstract noun, and
      5. said sense clause and psyche clause take general noun.

7. An interlingua system of claim 1, wherein:
   a. said composition of prototypical clause comprises said clause classification code and zero to three arguments, while composition of non-prototypical clause comprises additionally zero to a plurality of supplementary arguments, feature values of said time feature set, space feature set, adverb feature set, variational feature set and synonymous feature set,
   b. said feature set of variational clause comprises features of time variation, usage variation, and structure variation, all being associated with variational clause in respective natural language, and
   c. said feature set of synonymous clause comprises feature of synonymy being associated with synonymous clause in respective natural language, where said synonymous clause further comprises clause paraphrasing said prototypical clause in respective natural language.

8. A system for using a computer to convert a text of a natural language into a coded text of the interlingua representation of claim 1, this part of said system called input module of said language, and conversely to convert a coded text of said interlingua representation into a text of said language, this part of said system called output module of said language, said system called interlingua engine and said language called being incorporated in said interlingua engine, comprising:
   a. a computer capable of doing word-processing of said language,
   b. said interlingua representation stored in said computer,
   c. a matching lexicon of said language compiled in accordance with said interlingua representation and stored in said computer,
   d. a database of clause structure list with respect to said feature of variation of said interlingua representation, compiled for said language and stored in said computer,
   e. a database of synonymous clause list with respect to said feature of synonymy of said interlingua representation, compiled for said language and stored in said computer,
   f. a database of semantic rule of structure, compiled for said interlingua representation, updated for said language, and stored in said computer,
   g. a database of semantic code group compiled for said interlingua representation, updated for said language, and stored in said computer,
   h. a database of metaphor processing procedure compiled for said system of metaphor processing procedure, updated for said language, and stored in said computer,
   i. supplementary knowledge databases in the format of said interlingua representation and stored in said computer, and
   j. computer programs for said input and output modules of said language, stored in said computer and based on said interlingua representation, on said databases of clause structure list, synonymous clause list, semantic rule of structure, semantic code group, and metaphor processing procedure, and on said knowledge databases,
   whereby said input module will convert a text of said language into said interlingua representation by solving the two fundamental problems of ambiguity and matching senses, where the ambiguity problem is solved with the aid of said databases, in particular said databases of clause structure list, semantic rule of structure, and semantic code group, and the problem of matching senses is solved by said interlingua representation and said databases, in particular said database of metaphor processing procedure, and said output module will convert an interlingua coded text into a text of said language by first generating a text using said database of clause structure list and then improving the readability of the text with the aid of said databases, in particular said database of synonymous clause list.

9. An interlingua engine of claim 8, wherein said knowledge databases comprising common sense database, cultural database, encyclopedic database, and professional database.

10. An interlingua machine translation system for performing translation between and among a plurality of natural languages, comprising a computer equipped with said interlingua engine of claim 8 having incorporated said languages, means for inputting speeches or texts of said languages into said computer, and means for outputting texts of said languages from said computer in the form of text or speech, whereby speeches or texts of any one of said languages are able to be translated into speeches or texts of any other one of said languages by using said translation system.

11. A method of representing natural languages in a common machine-readable form, the resulting representation called interlingua, comprising providing a lexicon and a grammar, where:
- a. said lexicon comprises:
  1. a system of specifically designed classification codes for prototypical words of noun, adjective, verb, and adverb respectively,
  2. virtual codes for each kind of derived words, and
  3. a system of synomymous feature set for synonymous word and metaphorical feature set for metaphorical sense of word,
- b. said grammar comprises:
  1. a system of classification code and composition for prototypical clause,
  2. a system of time feature set, space feature set, and adverb feature set,
  3. a system of variational feature set for variational clause and synonymous feature set for synonymous clause, and
  4. a system of metaphor processing procedure, and
- c. said prototypical verb word and said prototypical clause comprising said prototypical verb word share the same classification code, whereby a sense of a word of a language will be:
- a. matched to a unique interlingua classification code if it is prototypical, or
- b. if it is synonymous to a prototypical word then matched to the same classification code of said prototypical word plus a feature of synonymy, or
- c. if it is a derived word then matched to a virtual code plus the interlingua classification code of its stem word and a feature of derivation, or
- d. if it is a fixed extended sense then matched to an interlingua classification code of a word corresponding to said extended sense plus a feature of extension, or
- e. if it is a multiple use case then matched to an interlingua classification code of a word corresponding to said multiple use plus a feature of multiple use, or
- f. if it is used in a special clause or idiom then treated according to the corresponding rule governing said special clause or idiom respectively, and whereby a clause of a language will be:
- a. matched to a unique interlingua classification code of its comprised verb if both said clause and said verb are prototypical, or
- b. if said clause is variational and its comprised verb is prototypical then matched to the same interlingua classification code of its associated prototypical clause plus a feature of variation, or
- c. if said clause is prototypical and its comprised verb is not prototypical then matched to an interlingua classification code of a verb corresponding to said verb according to said verb being derived, fixed extended, or multiple use plus a corresponding feature of said verb, or
- d. if said clause is variational and its comprised verb is not prototypical then matched to an interlingua classification code of a verb corresponding to said verb according to said verb being derived, fixed extended, or multiple use plus a corresponding feature of said verb and a variational feature of said clause, or
- e. if said clause is a special clause then matched to an interlingua classification code for special clause plus a feature of special clause.

12. An interlingua language representation method of claim 11, wherein both lexicon and grammar constructed in a recursive way following human language's natural formation processes, where said recursive way of construction comprising:
- a. designing said classification code for prototypical concrete noun of said noun word by assigning taxonomy classification code for concrete whole object and meronomy classification code for concrete part object,
- b. designing said classification code for instrinsic adjective and attached adjective of said adjective word associated with said concrete noun by assigning classification code for adjective as in a triad of object-property-adjective,
- c. designing event noun of said noun word as label for simple event representing a single clause or for collective event representing implicitly multiple clauses,
- d. designing property noun of said noun word as comprising intrinsic property noun naming said intrinsic adjective, attached property noun naming said attached adjective, and event property noun naming event adjective for said event noun,
- e. designing concept noun of said noun word as denoting a complex combination of existing nouns, including at least one abstract noun and zero or more existing concept nouns, organized in a defining manner recursively,
- f. designing abstract noun of said noun word as comprising said event noun, said property noun, and said concept noun,
- g. designing ontological noun of said noun word as comprising space noun, time noun, and ontological noun in general,
- h. designing said prototypical noun word as comprising said concrete noun, said abstract noun, and said ontological noun,
- i. designing said classification code for said prototypical verb word as sharing the same classification code with said prototypical clause comprising said verb word,
- j. designing said classification code for word derived from already designed word by firstly assigning it a virtual code for each kind of derivation, secondly assigning it the same classification code of said already designed word as a secondary code, and thirdly assigning it a feature of its derivation,
- k. designing said prototypical clause as declarative clause of prototypical argument in active voice with feature sets of time, space, and adverb collected separately,
- l. designing said classification code for said prototypical clause by assigning a three-level classification code, where:
  1. said first-level code comprising classification codes for property and state clauses, relation clause, and dynamic clause,
  2. said second-level code being based on syntactic classification, and 3. said third-level code being based on semantic classification, m. designing the one-argument dynamic clause of said prototypical dynamic clause as comprising prototypical clauses of change of property, change of state, and self-action, with the one argument of said prototypical self-action clause as being prototypically agentive, n. designing a non-prototypical clause of said one-argument dynamic clause as its corresponding said prototypical clause having said prototypical agentive argument filled by un-collocated concrete noun or abstract noun, o. designing the two prototypical arguments of the two-argument dynamic clause of said prototypical dynamic clause as having said two arguments labeled S and O respectively, where said S argument is prototypically agentive and said two arguments, together with the comprising verb V, correspond to the {V,S,O} typing of natural languages, and p. designing a non-prototypical clause of said two-argument dynamic clause as its corresponding said prototypical clause having at least one of said two prototypical arguments replaced from collocated noun to un-collocated noun, or from concrete noun to abstract noun.

13. A method for using a computer to convert by a program a text of a natural language into a coded text of the interlingua representation of claim 11, this part of said program called input module of said language, and conversely to convert a coded text of said interlingua representation into a text of said language, this part of said program called output module of said language, said program called interlingua engine and said language called being incorporated in said interlingua engine, comprising:

a. providing a computer capable of doing word-processing of said language, b. providing said interlingua representation stored in said computer, c. providing a matching lexicon of said language compiled in accordance with said interlingua representation and stored in said computer, d. providing a database of clause structure list with respect to said feature of variation, compiled for said language, and stored in said computer, e. providing a database of synonymous clause list with respect to said feature of synonymy, compiled for said language, and stored in said computer, f. providing a database of semantic rule of structure compiled for said interlingua representation, updated for said language, and stored in said computer, g. providing a database of semantic code group compiled for said interlingua representation, updated for said language, and stored in said computer, h. providing a database of metaphor processing procedure compiled for said system of metaphor processing procedure, updated for said language, and stored in said computer, i. providing supplementary knowledge databases in the format of said interlingua representation and stored in said computer, and j. providing said computer programs of input and output modules for said language and stored in said computer, where said programs are based on said interlingua representation, on said databases of clause structure list, synonymous clause list, semantic rule of structure, semantic code group, and metaphor processing procedure, and on said knowledge databases, whereby said input module will convert a text of said language into said interlingua representation by solving the two fundamental problems of ambiguity and matching senses, where the ambiguity problem is solved with the aid of said databases, in particular said databases of clause structure list, semantic rule of structure, and semantic code group, and the problem of matching senses is solved by said interlingua representation and said databases, in particular said database of metaphor processing procedure, and the output module will convert an interlingua coded text into a text of said language by first generating a text using said database of clause structure list and then improving the readability of the text with the aid of said databases, in particular said database of synonymous clause list.

14. An interlingua engine of claim 13, wherein for said two-argument dynamic clause when both prototypical arguments S and O are concrete, said semantic rule of structure comprises a three level rule of prototypical rule, concrete-abstract rule, and collocation rule, where:

a. said prototypical rule comprising a general rule that if both S and O are concrete, and O is collocated, then verb is prototypical, and further:
  1. if S is agentive, then clause is prototypical, and
  2. if S is not agentive, then S is tool or material in broad sense and clause is variational, b. said concrete-abstract rule comprising a general rule that if at least one of S and O is abstract, then clause and verb are metaphorical, and further:
  1. if S is not agentive, then S is tool or material or method or manner or cause in broad sese, and clause is variational, and
  2. if both S and O are abstract, then S is method or manner or cause in broad sense and clause is metaphorical and variational or relational, and verb is metaphorical, and c. said collocation rule comprising a general rule that if O is not collocated, then clause and verb are metaphorical, and further:
  1. if O is concrete, then verb is extended or metaphorical,
  2. if S is not agentive, then S is tool or material or method or manner or cause in broad sense and clause is variational, and
  3. if S is not agentive, and O is not concrete, then S is tool or material or method or manner or cause in broad sense and clause is metaphorical and variational or relational.

15. An interlingua engine of claim 13, wherein said program of input module has a general programming framework which comprises the stages of:

a. initializing said computer for preparation of the start of processing, including initializing three complementary databases of role, ambiguity, and sequence to record related data produced in the processing, b. word level processing to perform lexical analysis to resolve word level ambiguities with the aid of said lexicon and grammar of said language, convert un-ambiguous words into said interlingua representation, delete useless senses of words, and prepare un-resolved senses of words for further processing, c. phrase level processing to mark out clauses, adjective phrases and noun phrases, further disambiguate un-resolved ambiguous senses of words and delete useless senses of words, convert identified phrases and words into said interlingua representation, prepare un-resolved senses of words for further processing, and prepare candidate clauses for sentence level syntactic processing, d. sentence level syntactic processing to check the syntactic correctness of candidate clauses, disambiguate ambiguous clauses with the aid of said database of clause structure list, delete useless candidate clauses, further disambiguate un-resolved senses of words and delete useless senses of words, convert indentified words into said interlingua representation, prepare un-resolved senses of words for further processing, and prepare both identified and un-resolved clauses for sentence level semantic processing, e. sentence level semantic processing to determine the semantic plausibility and meaning of identified clauses, disambiguate still un-resolved clauses with the aid of said databases of semantic rule of structure and semantic code group, delete useless candidate clauses, disambiguate still un-resolved ambiguous senses of words and delete remaining un-resolved senses of words, use said database of metaphor processing procedure to determine the meaning of metaphorically used words and clauses, convert identified clauses and words into said interlingua representation, and prepare still un-resolved clauses for sentence level pragmatic processing, f. sentence level pragmatic processing to finally resolve clauses made ambiguous due to pragmatic use with the aid of said database of clause structure list and said three built-up databases of role, ambiguity, and sequence, convert all the remaining clauses and words into said interlingua representation, and then save the converted text, together with the gathered feature information including said built-up databases, in a coded interlingua text.

16. An interlingua engine of claim 15, wherein said word level processing further comprises processing a system of high frequency word and said phrase level processing further comprises using said high frequency word to aid to mark clause, adjective phrase, and noun phrase.

17. An interlingua engine of claim 13, wherein said program of output module has a general programming framework which comprises the stages of:
  a. generating a text of said language from a stored interlingua coded text with the aid of said lexicon and grammar as well as said database of clause structure list of said language, and
  b. rhetoric processing to make said generated text more readable with the aid of said database of synonymous clause list of said language, said database of semantic code group, said three built-up databases of role, ambiguity, and sequence, and said supplementary knowledge databases.

18. An interlingua machine translation method for performing translation between and among a plurality of natural languages, comprising:
  a. providing a computer equipped with said interlingua engine of claim 13 having incorporated said languages,
  b. providing means for inputting speech or text of said languages into said computer, and
  c. providing means for outputting text of said languages from said computer in the form of text or speech, whereby said computer will translate a speech or text of any one of said languages into a speech or text of any other one of said languages.

* * * * *